United States Patent
Eichenberger et al.

(10) Patent No.: US 9,600,281 B2
(45) Date of Patent: *Mar. 21, 2017

(54) MATRIX MULTIPLICATION OPERATIONS USING PAIR-WISE LOAD AND SPLAT OPERATIONS

(75) Inventors: Alexandre E. Eichenberger, Chappaqua, NY (US); Michael K. Gschwind, Chappaqua, NY (US); John A. Gunnels, Yorktown Heights, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1913 days.

This patent is subject to a terminal disclaimer.

(21) Appl. No.: 12/834,464

(22) Filed: Jul. 12, 2010

(65) Prior Publication Data

US 2012/0011348 A1    Jan. 12, 2012

(51) Int. Cl.
  *G06F 9/30*    (2006.01)
  *G06F 9/312*    (2006.01)
  *G06F 9/38*    (2006.01)

(52) U.S. Cl.
  CPC ...... *G06F 9/30043* (2013.01); *G06F 9/30014* (2013.01); *G06F 9/30032* (2013.01); *G06F 9/30036* (2013.01); *G06F 9/30109* (2013.01); *G06F 9/30112* (2013.01); *G06F 9/30145* (2013.01); *G06F 9/3887* (2013.01)

(58) Field of Classification Search
  CPC ............. G06F 9/30032; G06F 9/30036; G06F 9/30043; G06F 9/30109

USPC ........................................................ 712/222
See application file for complete search history.

(56) References Cited

U.S. PATENT DOCUMENTS

| | | |
|---|---|---|
| 5,551,013 A | 8/1996 | Beausoleil et al. |
| 5,574,873 A | 11/1996 | Davidian |
| 5,790,825 A | 8/1998 | Traut |
| 5,923,862 A | 7/1999 | Nguyen et al. |
| 6,009,261 A | 12/1999 | Scalzi et al. |

(Continued)

OTHER PUBLICATIONS

Freescale Semiconductor, AltiVec Technology Programming Interface Manual, ALTIVECPIM/D, 1999, Rev. 0, 2 pages, See Vector Permute Instruction.*

(Continued)

*Primary Examiner* — Andrew Caldwell
*Assistant Examiner* — Yuqing Xiao
(74) *Attorney, Agent, or Firm* — Stephen J. Walder, Jr.; Jennifer R. Davis

(57) ABSTRACT

Mechanisms for performing a matrix multiplication operation are provided. A vector load operation is performed to load a first vector operand of the matrix multiplication operation to a first target vector register. A pair-wise load and splat operation is performed to load a pair of scalar values of a second vector operand and replicate the pair of scalar values within a second target vector register. An operation is performed on elements of the first target vector register and elements of the second target vector register to generate a partial product of the matrix multiplication operation. The partial product is accumulated with other partial products and a resulting accumulated partial product is stored. This operation may be repeated for a second pair of scalar values of the second vector operand.

25 Claims, 32 Drawing Sheets

(56) References Cited

U.S. PATENT DOCUMENTS

| | | | |
|---|---|---|---|
| 6,125,212 | A | 9/2000 | Kresch et al. |
| 6,308,255 | B1 | 10/2001 | Gorishek, IV et al. |
| 6,463,582 | B1 | 10/2002 | Lethin et al. |
| 6,530,011 | B1 | 3/2003 | Choquette |
| 6,857,061 | B1 | 2/2005 | Liao et al. |
| 7,302,627 | B1 | 11/2007 | Mimar |
| 7,376,812 | B1* | 5/2008 | Sanghavi et al. ............... 712/24 |
| 7,457,941 | B2 | 11/2008 | Barlow et al. |
| 7,594,102 | B2 | 9/2009 | Colavin et al. |
| 7,873,812 | B1* | 1/2011 | Mimar ............................ 712/22 |
| 7,932,910 | B2 | 4/2011 | Hansen et al. |
| 8,068,574 | B2 | 11/2011 | Norris et al. |
| 8,650,240 | B2* | 2/2014 | Eichenberger et al. ...... 708/607 |
| 2004/0073773 | A1 | 4/2004 | Demjanenko |
| 2005/0193050 | A1* | 9/2005 | Sazegari ...................... 708/607 |
| 2007/0050598 | A1 | 3/2007 | Citron et al. |
| 2007/0198815 | A1* | 8/2007 | Liu et al. ...................... 712/221 |
| 2007/0271325 | A1 | 11/2007 | Juffa et al. |
| 2008/0229066 | A1 | 9/2008 | Gschwind |
| 2009/0150615 | A1 | 6/2009 | Gustavson et al. |
| 2009/0292758 | A1 | 11/2009 | Brokenshire et al. |
| 2009/0300091 | A1 | 12/2009 | Brokenshire et al. |
| 2009/0307656 | A1 | 12/2009 | Eichenberger et al. |
| 2009/0313458 | A1 | 12/2009 | Colavin et al. |
| 2011/0040822 | A1* | 2/2011 | Eichenberger et al. ...... 708/607 |
| 2011/0055517 | A1* | 3/2011 | Eichenberger et al. .......... 712/7 |
| 2013/0179661 | A1* | 7/2013 | Sprangle ...................... 712/205 |
| 2013/0185544 | A1* | 7/2013 | Hung et al. ................... 712/225 |

OTHER PUBLICATIONS

Office Action mailed Jun. 22, 2012 for U.S. Appl. No. 12/542,255; 12 pages.
Office Action mailed Sep. 7, 2012 for U.S. Appl. No. 12/542,324; 15 pages.
Response to Office Action filed Sep. 20, 2012, U.S. Appl. No. 12/542,255, 21 pages.
Office Action mailed Feb. 19, 2013 for U.S. Appl. No. 12/542,255; 9 pages.
Response to Office Action filed with the USPTO on Dec. 5, 2012 for U.S. Appl. No. 12/542,324, 27 pages.
D'Alberto, Paolo et al., "Adaptive Strassen and ATLAS's DGEMM: A Fast Square-Matrix Multiply for Modern High-Performance Systems", Proceedings of the Eighth International Conference on High-Performance Computing in Asia-Pacific Region (HPCASIA'05), 2005, 8 pages.
U.S. Appl. No. 12/542,324.
U.S. Appl. No. 12/542,255.
Gibbs, Ben et al., "IBM eServer BladeCenter JS20 PowerPc 970 Programming Enviroment", Jan. 2005, www.redbooks.ibm.com/redpapers/pdfs/redp3890.pdf, 140 pages.
Greer, Bruce et al., "High Performance Software on Intel Pentium Pro Processors or Micro-Ops to TeraFLOPS", Proceedings of the ACM/IEEE SC97 Conference (SC'97), 1997, 13 pages.
Gustafson, John L., "Latency, Bandwidth, and Accelerators", ClearSpeed Technology, Inc., Feb. 25, 2007, 2 pages.
Whaley, R. C. et al., "Automatically Tuned Linear Algebra Software", Proceedings of the 1998 ACM/IEEE SC98 Conference (SC'98), 1998, 33 pages.
Office Action mailed Mar. 26, 2013 for U.S. Appl. No. 12/542,324; 12 pages.
Response to Office Action filed May 15, 2013, U.S. Appl. No. 12/542,255, 7 pages.
Notice of Allowance mailed Jun. 24, 2013 for U.S. Appl. No. 12/542,255, 9 pages.
Response to Office Action filed with the USPTO on Jun. 24, 2013 for U.S. Appl. No. 12/542,324, 31 pages.
Notice of Allowance mailed Sep. 27, 2013 for U.S. Appl. No. 12/542,324; 10 pages.

* cited by examiner

QUAD-VECTOR LOAD FLOATING-POINT COMPLEX DOUBLE INDEXED

X-FORM qvlfcdx      QRT,RA,RB      (X=0)
qvlfcdxa     QRT,RA,RB      (X=1)

| 31 | QRT | RA | RB | 71 | X |
|---|---|---|---|---|---|
| 0 | 6 | 11 | 16 | 21 | 31 | if RA = 0 then  b ← 0
else             b ← (RA)
EA ← MEM16 (b + (RB))
MVAL ← MEM (EA, 16)

$QRT^{0:7}$ ← DOUBLE ($MVAL^{0:7}$)
$QRT^{8:15}$ ← DOUBLE ($MVAL^{8:15}$)
$QRT^{16:23}$ ← DOUBLE ($MVAL^{0:7}$)
$QRT^{24:31}$ ← DOUBLE ($MVAL^{8:15}$)

LET THE EFFECTIVE ADDRESS (EA) BE THE SUM (RA|0)+(RB).

THE TWO DOUBLEWORDS IN STORAGE ADDRESSED BY THE 16-BYTE ALIGNED EA ARE REPLICATED INTO REGISTER QRT.

IF THE X BIT IS SET, AND THE ADDRESS IS NOT ALIGNED ON A 16-BYTE BOUNDARY, AN EXCEPTION IS RAISED.

SPECIAL REGISTERS ALTERED:
    NONE

FIG. 25

QUAD-VECTOR FLOATING DOUBLE-CROSS COMPLEX
MULTIPLY-ADD [SINGLE]                                    A-FORM qvfxxnpmadd    QRT,QRA,QRC,QRB

| 4 | QRT | QRA | QRB | QRC | 11 | / |
|---|-----|-----|-----|-----|----|---|
| 0 | 6   | 11  | 16  | 21  | 26 | 31 | qvfxxnpmadds   QRT,QRA,QRC,QRB

| 0 | QRT | QRA | QRB | QRC | 11 | / |
|---|-----|-----|-----|-----|----|---|
| 0 | 6   | 11  | 16  | 21  | 26 | 31 |

THE OPERATION $QRT^{0:7} \leftarrow - QRA^{8:15} \times_{DP} QRC^{8:15} +_{DP} QRB^{0:7}$ $QRT^{8:15} \leftarrow + QRA^{0:7} \times_{DP} QRC^{8:15} +_{DP} QRB^{8:15}$ $QRT^{16:23} \leftarrow - QRA^{24:31} \times_{DP} QRC^{24:31} +_{DP} QRB^{16:23}$ $QRT^{24:31} \leftarrow + QRA^{16:23} \times_{DP} QRC^{24:31} +_{DP} QRB^{24:31}$

IS PERFORMED IN EACH DOUBLEWORD SLOT.

FOR EACH QUAD-VECTOR ELEMENT i FROM 0 TO 3,
    DO THE FOLLOWING:

THE QUAD-VECTOR ELEMENT FLOOR (i/2)+1 IN QVR[QVA] IS MULTIPLIED WITH THE QUAD-VECTOR ELEMENT (i XOR 1) in QVR[QVC]. THE PRODUCT IS MULTIPLIED BY $(-1)^{\wedge}(i+1)$. THE QUAD-VECTOR ELEMENT i IN QVR[QVB] IS ADDED TO THE INFINITELY-PRECISE PRODUCT. THE INTERMEDIATE RESULT IS ROUNDED TO THE TARGET PRECISION UNDER CONTROL OF THE FLOATING-POINT ROUNDING CONTROL FIELD RN OF THE FPSCR.

ROUNDING NOTE:

SLOTS 0 AND 2 ARE IMPLEMENTED AS

QRT ← - ( [(QRA<slot>)x(QRC<slot>)] - (QRB<slot>))

AND SHOULD BE ROUNDED BEFORE THE FINAL NEGATION
$FPSCR_{FPRF}$ IS UNAFFECTED

SPECIAL REGISTERS ALTERED:
    NONE

FIG. 26

QUAD-VECTOR FLOATING-POINT CROSS (X) MULTIPLY-ADD [SINGLE] A-FORM
qvfxmadd QRT,QRA,QRC,QRB qvfxmadds QRT,QRA,QRC,QRB THE OPERATIONS
QRT0 ← [(QRA0)*(QRC0)] + (QRB0)
QRT1 ← [(QRA0)*(QRC1)] + (QRB1)
QRT2 ← [(QRA2)*(QRC2)] + (QRB2)
QRT3 ← [(QRA2)*(QRC3)] + (QRB3)
ARE PERFORMED.
FOR EACH VECTOR ELEMENT, THE RESULTANT SIGNIFICAND MAY REQUIRE NORMALIZATION OR DENORMALIZATION, DEPENDING ON THE VALUES OF THE TWO MOST SIGNIFICANT BITS OF THE RESULTANT SIGNIFICAND AND ON THE VALUE OF THE RESULTANT EXPONENT. THE RESULT IS ROUNDED TO THE TARGET PRECISION UNDER CONTROL OF THE FLOATING-POINT ROUNDING CONTROL FIELD RN OF THE FPSCR AND PLACED INTO REGISTER QRT. $FPSCR_{FPRF}$ IS UNAFFECTED.
SPECIAL REGISTERS ALTERED:
NONE

FIG. 31

QUAD-VECTOR FLOATING-POINT CROSS POSITIVE (XP) MULTIPLY-ADD [SINGLE] A-FORM
qvfxpmadd QRT,QRA,QRC,QRB qvfxpmadds QRT,QRA,QRC,QRB THE OPERATIONS
QRT0 ← [(QRA0)*(QRC1)] + (QRB0)
QRT1 ← [(QRA1)*(QRC1)] + (QRB1)
QRT2 ← [(QRA2)*(QRC3)] + (QRB2)
QRT3 ← [(QRA3)*(QRC3)] + (QRB3)
ARE PERFORMED.

FOR EACH VECTOR ELEMENT, THE RESULTANT SIGNIFICAND MAY REQUIRE NORMALIZATION OR DENORMALIZATION, DEPENDING ON THE VALUES OF THE TWO MOST SIGNIFICANT BITS OF THE RESULTANT SIGNIFICAND AND ON THE VALUE OF THE RESULTANT EXPONENT. THE RESULT IS ROUNDED TO THE TARGET PRECISION UNDER CONTROL OF THE FLOATING-POINT ROUNDING CONTROL FIELD RN OF THE FPSCR AND PLACED INTO REGISTER QRT. $FPSCR_{FPRF}$ IS UNAFFECTED.

SPECIAL REGISTERS ALTERED:
NONE

FIG. 32

```
    mtctr 19
._bigloopk1:
    qvlfdux 2, 20, 25
    qvfmadd 14, 0, 4, 14
    lfdux 12, 29, 25
    qvfmadd 22, 0, 8, 22
    lfdux 13, 21, 25
    qvfmadd 15, 1, 4, 15
    qvfmadd 23, 1, 8, 23
    qvlfdux 3, 20, 25
    qvfmadd 16, 0, 5, 16
    qvfmadd 17, 1, 5, 17
    lfdux 5, 29, 26
    qvfmadd 24, 0, 9, 24
    qvfmadd 25, 1, 9, 25
    lfdux 9, 21, 26
    qvfmadd 18, 0, 6, 18
    qvfmadd 19, 1, 6, 19
    lfdux 6, 29, 26
    qvfmadd 26, 0, 10, 26
    ...
```

FIG. 35

```
._bigloopk1:
qvlfcdux 11, 21, 25
qvfxmadd 23, 1, 7, 23
qvfxmadd 24, 1, 8, 24
qvfxmadd 25, 2, 7, 25
qvlfdux 4, 29, 27
qvfxmadd 26, 2, 8, 26
qvfxmadd 15, 3, 7, 15
qvlfcdux 12, 26, 25
qvfxmadd 16, 3, 8, 16
qvfxxnpmadd 23, 7, 1, 23
qvlfdux 5, 20, 27
qvfxmadd 17, 1, 9, 17
qvfxxnpmadd 24, 8, 1, 24
qvfxmadd 18, 1, 10, 18
qvlfdux 6, 29, 27
qvfxxnpmadd 25, 7, 2, 25
qvfxmadd 19, 2, 9, 19
qvfxxnpmadd 26, 8, 2, 26
qvlfcdux 13, 21, 25
qvfxmadd 20, 2, 10, 20
qvfxxnpmadd 15, 7, 3, 15
qvfxmadd 21, 3, 9, 21
qvfxxnpmadd 16, 8, 3, 16
qvlfcdux 14, 26, 25
qvfxmadd 22, 3, 10, 22
qvfxxnpmadd 17, 9, 1, 17
qvfxmadd 23, 4, 11, 23
qvfxxnpmadd 18, 10, 1, 18
qvfxmadd 24, 4, 12, 24
qvfxxnpmadd 19, 9, 2, 19
qvfxmadd 25, 5, 11, 25
...
```

FIG. 36

MATRIX MULTIPLICATION OPERATIONS USING PAIR-WISE LOAD AND SPLAT OPERATIONS

GOVERNMENT RIGHTS

This invention was made with United States Government support under Contract No. B554331 awarded by the Department of Energy. THE GOVERNMENT HAS CERTAIN RIGHTS IN THIS INVENTION.

BACKGROUND

The present application relates generally to an improved data processing apparatus and method and more specifically to mechanisms for implementing matrix multiplication operations using pair-wise load and splat operations.

In many prior art data-parallel Single Instruction Multiple Data (SIMD) vector architectures, algorithms have been developed that have either had to use data re-arrangement in the core, at the cost of increase of instruction bandwidth, or special data memory layouts, possibly including data duplication, requiring both increased data memory bandwidth (to load the duplicated values) and increased instruction bandwidth (to put initial data values in the duplicated format).

In modern SIMD vector architectures, data bandwidth is at a premium and often limits total performance. Thus it is desirable to reduce the required data bandwidth necessary to achieve the full performance potential of a microprocessor implementing a specific algorithm. Furthermore, in many modern architectures, instruction issue capability is at a premium. Thus, oftentimes, when an instruction of one type is issued, an instruction of another type cannot be issued. Thus, in one implementation, either a data reorganization instruction (such as splat or permute) can be issued, or a compute Floating Point Multiply Add (FMA) instruction can be used. Invariably, when data reorganization instructions are necessary, the microprocessor cannot achieve its full peak performance potential as expressed in FLOPS.

Furthermore, because of these significant limitations, and in particular due to the limited data layout and element-wise computation nature of SIMD vector architectures, in practice, SIMD instruction set architectures have not realized their full performance potential for complex arithmetic. While some architectures have attempted to remedy this with a paired floating point instruction set, these paired floating point instruction sets have required all-to-all communication between the floating point units, and thus, have resulted in severe limitations in their performance. The fastest paired floating point design has not been able to exceed an operational frequency of 1 GHz. Moreover, the limitations inherent in this type of architecture made the architecture unscalable due to practicality when more than two arithmetic units are to be used. In contrast, architectures with true SIMD implementations, such as the Cell Synergistic Processing Element (SPE), available from International Business Machines (IBM) Corporation of Armonk, N.Y., have exceeded well over 3 GHz.

SUMMARY

In one illustrative embodiment, a method, in a data processing system having a processor, for performing a matrix multiplication operation. The method comprises performing, by the processor, a vector load operation to load a first vector operand of the matrix multiplication operation to a first target vector register of the data processing system, the first vector operand comprising one or more values. The method further comprises performing, by the processor, a load pair and splat operation to load a pair of values of a second vector operand and replicate the pair of values within a second target vector register of the data processing system. The method also comprises performing, by the processor, an operation on elements of the first target vector register and elements of the second target vector register to generate a partial product of the matrix multiplication operation. Moreover, the method comprises accumulating, by the processor, the partial product of the matrix multiplication operation with other partial products of the matrix multiplication operation, and storing a resulting accumulated partial product in a result vector register.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 25 illustrates examples of a vector load instruction for loading complex values into vector registers in accordance with one illustrative embodiment;

FIG. 26 illustrates examples of a cross-multiply-add instructions for performing the actual cross multiplication operations between elements of the vectors 2122 and 2124, such as shown in FIGS. 21-24, in accordance with one illustrative embodiment;

FIG. 31 illustrates an example of a load pair and splat instruction in accordance with one illustrative embodiment;

FIG. 32 illustrates an example of a cross-multiply-add instruction for performing the cross multiplication operations between elements of vector registers when performing pair-wise scalar operations for performing the matrix multiplication;

FIG. 35 is an example of code generated by a compiler that utilizes the quad vector load and multiply add instructions according to an illustrative embodiment such as that illustrated in FIGS. 16-17; and FIG. 36 is an example of code generated by a compiler that utilizes the complex quad vector load and cross multiply add instructions according to an illustrative embodiment such as that illustrated in FIGS. 21-24.

Figure 1:
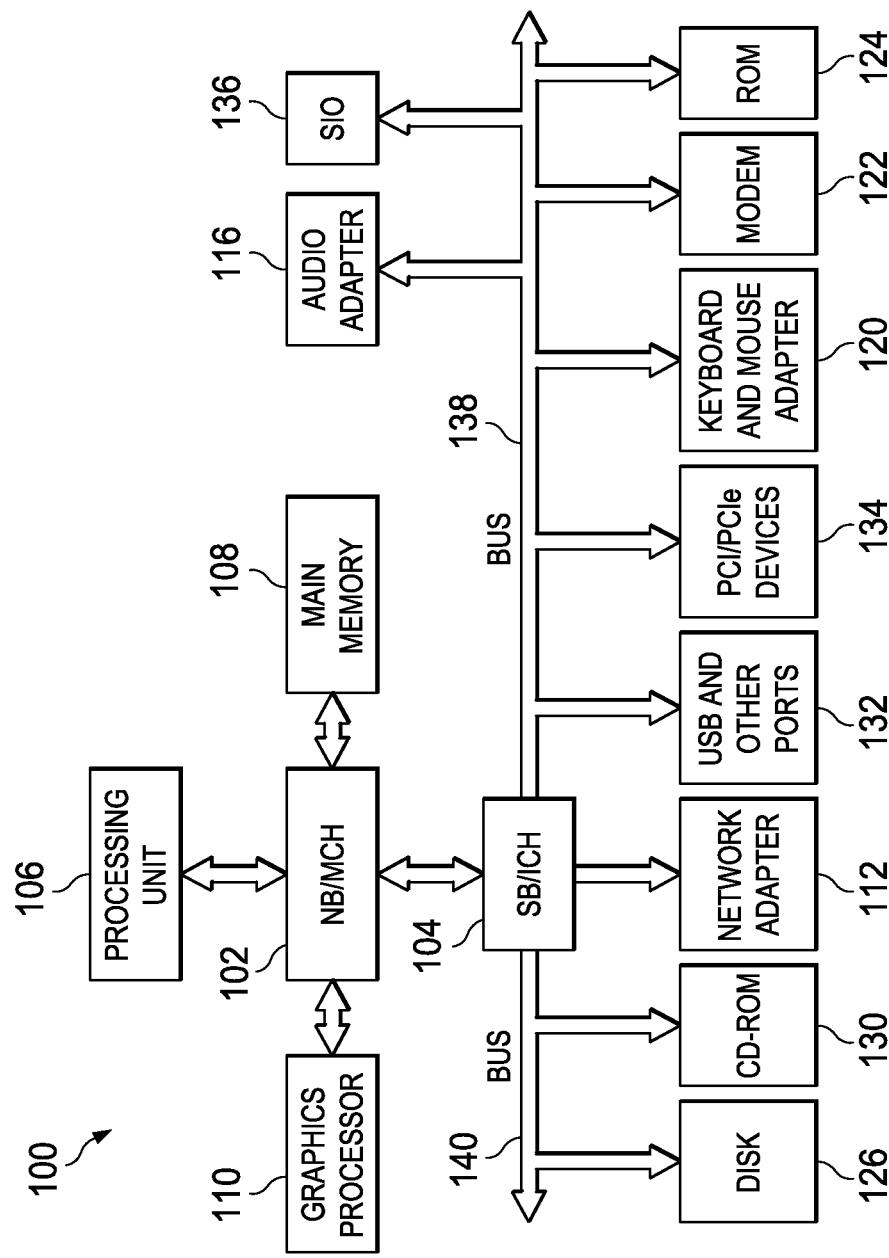
FIG. 1 is an exemplary block diagram of a data processing system in which exemplary aspects of the illustrative embodiments may be implemented.

Appendix A provides a specification for a quad-processing unit (QPU) in accordance with one illustrative embodiment.

DETAILED DESCRIPTION

In order to address some of the limitations noted above, some instruction set architectures have supported vector to scalar OP vector instructions where a vector is operated upon by combining every element with the same scalar values, and generating a new vector of elements. However, while this has been practical for traditional vector processors operating on one element at a time, it is not practical for data-parallel vector processing. It is therefore, one purpose of the present invention to provide mechanisms and data layouts associated with these mechanisms for the efficient manipulation of vectors by combining them with scalar instructions. Moreover, algorithms using these efficient mechanisms and data layouts to accomplish more complex functions such as matrix multiplication, e.g., as used in the common Double Precision General Matrix Multiplication (DGEMM) computation kernel, are provided.

Furthermore, it is another purpose of the present invention to provide mechanisms for supporting efficient vector to complex number * vector operations, optimized data layouts associated therewith, and algorithms using the efficient mechanisms and data layouts to accomplish more complex functions, such as matrix multiplication of complex numbers, e.g., as used in the common ZGEMM computation kernel (ZGEMM is a version of DGEMM that is not limited to Double Precision), as well as other numeric algorithms employing complex arithmetic.

The illustrative embodiments provide a floating-point (FP) only single instruction multiple data (SIMD) architecture. Moreover, the FP only SIMD architecture of the illustrative embodiments utilizes a SIMD instruction set architecture (ISA) that includes instructions for implementing matrix manipulation operations, e.g., matrix multiplication, with data pre-conditioning. The mechanisms of the illustrative embodiments provide a storage format of data in registers to facilitate efficient computing with scalar constants in a SIMD vector architecture where a scalar value is replicated in a vector register. Moreover, the mechanisms of the illustrative embodiments provide instructions to pre-condition in-memory values and generate the optimized data format at no extra overhead costs. Furthermore, the mechanisms of the illustrative embodiments provide an engine that exploits this storage format and instructions to achieve efficient matrix manipulation operations within a FP only SIMD architecture.

With regard to matrix manipulation operations, in one illustrative embodiment, a matrix multiply operation is performed by loading a scalar value along one dimension of a matrix and replicating that scalar value in a first register using an optimized hardware capability of the illustrative embodiments. A portion of a strided vector is loaded into a second register along another dimension of the matrix and a partial result is computed. The partial result is computed by multiplying the replicated elements of the scalar value register with the elements of the strided vector register and accumulating the result without the need for data reorganization. The matrix multiplication operation is done on a per element basis combining elements of a same vector index position.

In order to obtain an understanding of the improvements of the mechanisms of the illustrative embodiments, it is best to first understand the mechanisms and manner by which the FP only SIMD architecture of the illustrative embodiments operates. Thus, the following description, with regard to FIGS. 1-7 will focus primarily on the FP only SIMD architecture of the illustrative embodiments with a subsequent discussion of the mechanisms for implementing matrix manipulation operations within this FP only SIMD architecture.

While the instructions, algorithms, data layouts and implementations are described in the context of an FP-only SIMD architecture, those skilled in the art will be able to use the same techniques with any SIMD architecture based on the description of the illustrative embodiments set forth herein. Thus, the illustrative embodiments are only intended to represent example implementations and are not intended to limit the implementation of the present invention to FP-only SIMD architectures.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

With reference now to FIG. 1, an exemplary data processing system is shown in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 204. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 100 (Java is a trademark of Sun Microsystems, Inc. in the United States, other countries, or both).

As a server, data processing system 100 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 206. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

With the data processing system 100 of FIG. 1, the processor 106 may have facilities for processing both integer (scalar) and floating point (vector) instructions and operating on both types of data. However, in accordance with the illustrative embodiments, the processor 106 may have hardware facilities for handling SIMD instructions and data as floating point only SIMD instructions and data. The scalar facilities are used for integer processing, and in conjunction with the floating point only SIMD architecture for inter alia loop control and memory access control.

Figure 2:
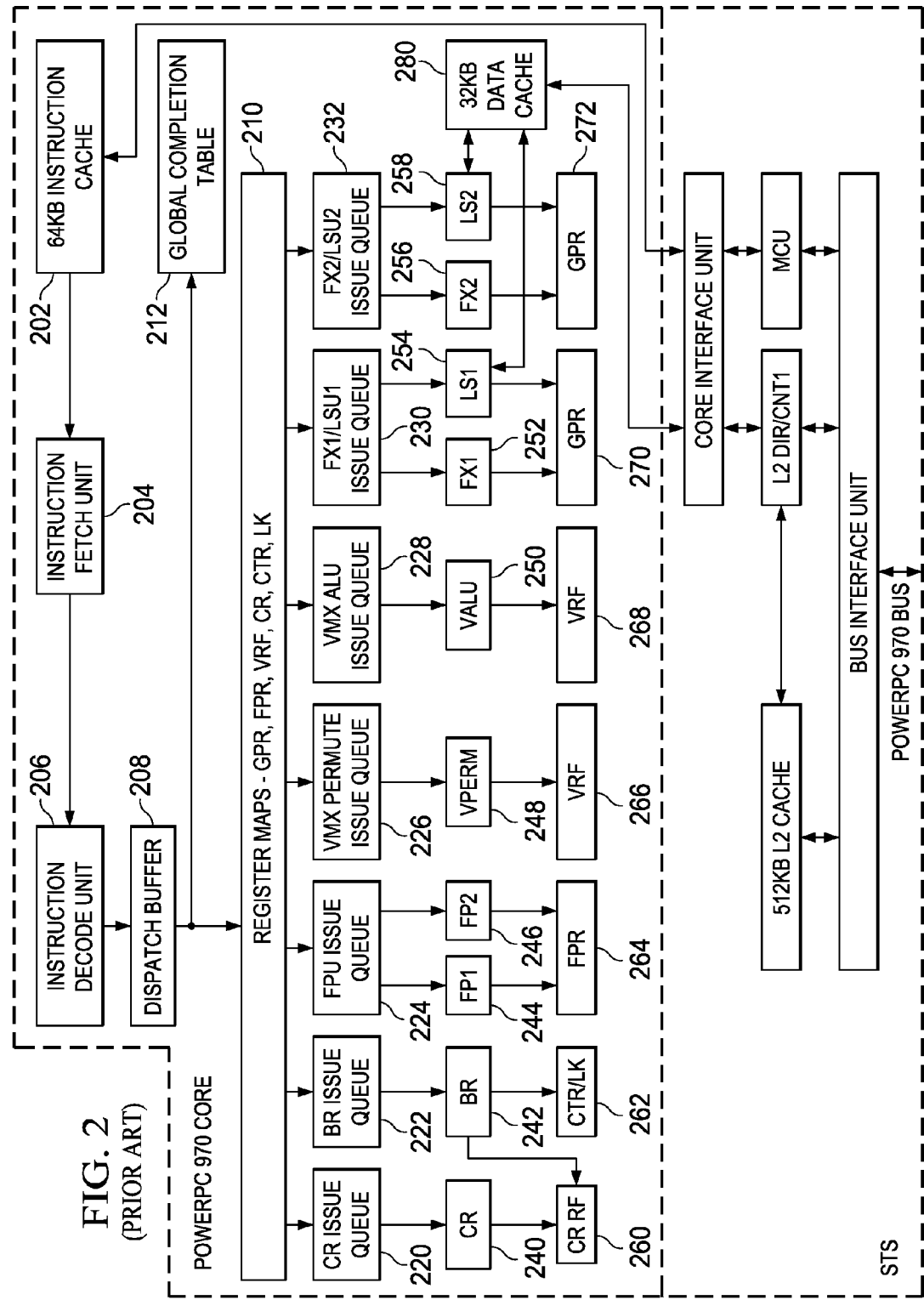
FIG. 2 is a block diagram of a known processor architecture shown for purposes of discussion of the improvements made by the floating point only single instruction multiple data (SIMD) instruction set architecture (ISA) of the illustrative embodiments.

FIG. 2 is a block diagram of a known processor architecture shown for purposes of discussion of the improvements made by the floating point only single instruction multiple data (SIMD) instruction set architecture (ISA) of the illustrative embodiments. The particular processor architecture shown in FIG. 2 is for the PowerPC™ 970 microprocessors available from International Business Machines Corporation of Armonk, N.Y. and described in the Redbook by Gibbs et al. entitled "IBM eServer BladeCenter JS20 PowerPC 970 Programming Environment," January 2005 (available at the IBM Redbooks website as red paper 3890.

As shown in FIG. 2, the processor architecture includes an instruction cache 202, an instruction fetch unit 204, an instruction decode unit 206, and a dispatch buffer 208. Instructions are fetched by the instruction fetch unit 204 from the instruction cache 202 and provided to the instruction decode unit 206. The instruction decode unit 206 decodes the instruction and provides the decoded instruction to the dispatch buffer 208. The output of the decode unit 206 is provided to both the register maps 210 and the global completion table 212. The register maps 210 map to one or more of the general purpose registers (GPRs), floating point registers (FPRs), vector register files (VRF), and the like. The instructions are then provided to an appropriate one of the issues queues 220-232 depending upon the instruction type as determined through the decoding and mapping of the instruction decode unit 206 and register maps 210. The issue queues 220-232 provide inputs to various ones of execution units 240-258. The outputs of the execution units 240-258 go to various ones of the register files 260-272. Data for use with the instructions may be obtained via the data cache 280.

Of particular note, it can be seen in the depicted architecture that there are separate issue queues and execution units for floating point, vector, and fixed point, or integer, instructions in the processor. As shown, there is a single floating point unit (FPU) issue queue 224 that has two output ports to two floating point execution units 244-246 which in turn have output ports to a floating point register file 264. A single vector permute issue queue 226 has a single output port to a vector permute execution unit 248 which in turn has a port for accessing a vector register file (VRF) 266. The vector arithmetic logic unit (ALU) issue queue 228 has one issue port for issuing instructions to the vector ALU 250 which has a port for accessing the vector register file 268. It should be appreciated that these issue queues, execution units, and register files all take up resources, area, and power.

Figure 3:
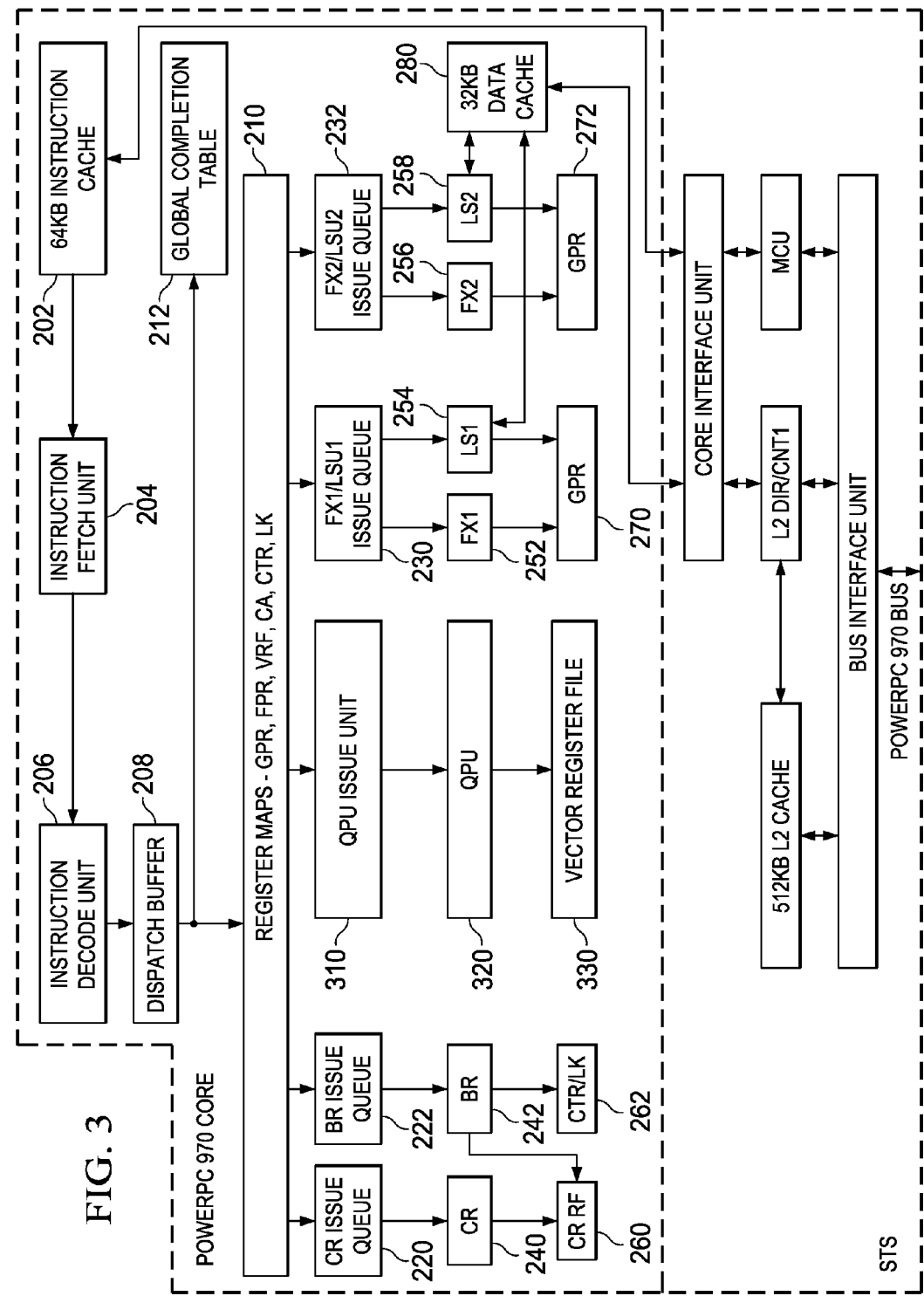
FIG. 3 is an exemplary diagram of a modified form of the processor architecture shown in FIG. 2 in which exemplary aspects of the illustrative embodiments may be implemented.

With the illustrative embodiments, in providing mechanisms for a floating-point only SIMD architecture, these issue units 224-228, the execution units 244-250, and register files 264-268 are replaced with a single issue queue, execution unit, and register file. FIG. 3 is an exemplary diagram showing the alternative processor architecture in accordance with one illustrative embodiment. The processor architecture shown in FIG. 3 is of a modified form of the PowerPC™ 970 architecture shown in FIG. 2 and thus, similar elements to that of FIG. 2 are shown with similar reference numbers. It should be appreciated that the example modified architecture is only an example and similar modifications can be made to other processor architectures to reduce the number of issue units, execution units, and register files implemented in these other architectures. Thus, the mechanisms of the illustrative embodiments are not limited to implementation in a modified form of the PowerPC™ 970 architecture.

As shown in FIG. 3, the modified architecture shown in FIG. 3 replaces the issue units 224-228 with a single quad-processing execution unit (QPU) issue unit 310. Moreover, the execution units 244-250 are replaced with the single quad-processing execution unit (QPU) 320. Furthermore, the register files 264-268 are replaced with a single quad-vector register file (QRF) 330. Because the quad-processing unit (QPU) can execute up to 4 data elements concurrently with a single instruction, this modified architecture not only reduces the resource usage, area usage, and power usage, while simplifying the design of the processor, but the modified architecture also increases performance of the processor.

It should be noted that the modified processor architecture in FIG. 3 still has the fixed point units (FXUs) which process scalar integers. Such scalar integers are used primarily for control operations, such as loop iterations, and the like. All other instructions are of the floating-point or vector format. Specifically, unlike the mixed floating point and integer execution repertoire of the VMX instruction set, the QPX instructions generally operate, and in particular perform arithmetic operations, on floating point data only. The only storage of integer-typed data is associated with conversion of data to an integer format for the purpose of loading and storing such integers, or moving a control word to and from the floating point status and control register (FPSCR). Reducing operations to a floating point-only format greatly enhances efficiency of floating point processing, as an appropriate internal representation optimized for the representation and processing of floating numbers can be chosen without regard to the needs of integer arithmetic, logical operations, and other such operations.

In accordance with one illustrative embodiment, with the floating-point only SIMD ISA, there is no requirement to support integer encoding for the storage of comparison results, Boolean operations, selection operations, and data alignment as is required in prior known ISAs. The floating-point (FP) only SIMD ISA allows substantially all of the data to be stored as floating point data. Thus, there is only one type of data stored in the vector register file 330 in FIG. 3.

In accordance with an illustrative embodiment, the FP only SIMD ISA provides the capability to compare floating point vectors and store comparison results in a floating point vector register of the vector register file 330. Moreover, the FP only SIMD ISA provides an encoding scheme for selection operations and Boolean operations that allows the selection operations and Boolean logic operations to be performed using floating point data representations.

In one illustrative embodiment, the FP only SIMD ISA uses an FP only double precision SIMD vector with four elements, i.e., a quad-vector for quad-execution by the QPU 320. Single precision SIMD vectors are converted automatically to and from double precision during load and store operations. While a double precision vector SIMD implementation will be described herein, the illustrative embodiments are not limited to such and other precisions including, but not limited to, single precision, extended precision, triple precision, and even decimal floating point only SIMD, may be utilized without departing from the spirit and scope of the illustrative embodiments.

In one illustrative embodiment, the mechanisms of the illustrative embodiment for implementing the FP only SIMD ISA are provided primarily as logic elements in the QPU 320. Additional logic may be provided in one or more of the memory units LS1 and LS2 as appropriate. In other illustrative embodiments, the mechanisms of the illustrative embodiments may be implemented as logic in other elements of the modified architecture shown in FIG. 3, such as distributed amongst a plurality of the elements shown in FIG. 3, or in one or more dedicated logic elements coupled to one or more elements shown in FIG. 3. In order to provide one example of the implementation of the illustrative embodiments, it will be assumed for purposes of this description that the mechanisms of the illustrative embodiments are implemented as logic in the QPU 320 unless otherwise indicated. For a more detailed explanation of one illustrative embodiment of the logic in the QPU 320, reference should be made to Appendix A which provides a specification for the QPU 320 architecture.

As part of the FP only SIMD ISA of the illustrative embodiments, capability is provided to compare FP vectors and store comparison results in the FP vector register file 330. Comparison choices are encoded using FP values corresponding to Boolean values. For example, in one illustrative embodiment, for a "TRUE" output, i.e., the conditions of the comparison are met and a "TRUE" result is generated, the output is represented as an FP value of 1.0. For a "FALSE" output, i.e. the conditions of the comparison are not met and a "FALSE" output is generated, the output is represented as an FP value of −1.0. Functions that generate such FP values based on whether or not conditions of a comparison are met or not include the QVFCMPEQ function which compares two FP values to determine if they are equal, the QVFCMPGT function which compares two FP values to determine if a first FP value is greater than a second FP value, and the QVFCMPLT function which compares two FP values to determine if the first FP value is less than the second FP value. In addition, a test function, i.e. QVTSTNAN, is provided for testing for a "Not a Number" (NaN) condition. The output of these functions is either 1.0 for TRUE or −1.0 for FALSE.

In addition to these comparison functions, a matching select functionality is provided in the FP only SIMD ISA of the illustrative embodiments. This quad-vector floating point select, or QVFSEL, function has the format qvfsel QRT, QRA, QRC, QRB. With this quad-vector floating point select function, the floating-point operand in each double-word slot of register QRA is compared to the value zero to determine a value of TRUE or FALSE. If the operand is greater than or equal to zero (i.e., is TRUE), the corresponding slot of register QRT is set to the contents of register QRC. If the operand is less than zero or is a NaN, register QRT is set to the contents of register QRB. The comparison ignores the sign of zero, i.e., it regards +0.0 as equal to −0.0. Thus, any positive comparison result of this matching select function causes the floating point SIMD vector element of the QRT register to take the corresponding floating point SIMD vector element of the QRC register. Otherwise, any negative or NaN value will cause the floating point SIMD vector element of the QRT register to take the values of the corresponding floating point SIMD vector element in the QRB register.

In accordance with one illustrative embodiment, distinct definitions of TRUE and FALSE are used as input and output representations, wherein the output representation (i.e., the value generated to represent TRUE or FALSE as the result of a computation) are a subset of the range of TRUE and FALSE values used as the input representation. Specifically, the representations shown in Table 1 are used:

TABLE 1

| Input/Output Representations | | |
|---|---|---|
| | TRUE | FALSE |
| Output representation | +1.0 | −1.0 |
| Input representation | ≥±0.0 | <±0.0 or NaN |

In accordance with one aspect of one illustrative embodiment, this choice of input/output representations eliminates undefined behavior. In accordance with another aspect of one illustrative embodiment, this choice also offers compatibility of a "select" function with a legacy "select" function based on floating point sign in accordance with at least one legacy instruction set that does not offer the capability to store Boolean values encoded as floating point numbers and perform comparisons and Boolean operations. In accordance with yet another aspect of one illustrative embodiment, this choice simplifies decoding of Boolean values when used as input to instructions reading Boolean input operands.

Moreover, with the FP only SIMD ISA of the illustrative embodiments, quad-vector floating point logical functions are also defined such that vector outputs are generated. For example, logical functions for AND, OR, XOR, NAND, etc. operations are defined in terms of FP only SIMD ISA Boolean values, e.g., 1.0 for TRUE and −1.0 for FALSE. For example, an AND operation is defined by the FP only SIMD ISA such that 1.0 AND 1.0 results in an output of 1.0, otherwise the output of AND with at least one negative operand is −1.0.

Generally, the operation of an exemplary FP Boolean AND for each vector position of the SIMD vector in accordance with one embodiment of the present invention can be described as per Table 2.

TABLE 2

| Exemplary embodiment for FP Boolean AND function | | |
|---|---|---|
| input 1\input 2 | ≥±0.0 | <±0.0 or NaN |
| ≥±0.0 | +1.0 | −1.0 |
| ≥±0.0 or NaN | −1.0 | −1.0 |

Similarly, for an OR operation, the FP only SIMD ISA defines 1.0 OR 1.0, −1.0 OR 1.0 and 1.0 OR −1.0 such that it results in an output of 1.0, and −1.0 OR −1.0 giving an output of −1.0.

Generally, the operation of an exemplary FP Boolean OR for each vector position of the SIMD vector in accordance with one embodiment of the present invention can be described as per table 3.

TABLE 3

| Exemplary embodiment of FP Boolean OR function | | |
|---|---|---|
| input 1\input 2 | ≥±0.0 | <±0.0 or NaN |
| ≥±0.0 | +1.0 | +1.0 |
| <±0.0 or NaN | +1.0 | −1.0 |

Those skilled in the art will similarly be able to define other Boolean functions based on a defined set of input and output representations of the values of TRUE and FALSE in accordance with the teachings contained hereinabove and in the scope of the present invention.

In accordance with one exemplary embodiment of this invention, a "flogical" instruction is provided. The "flogical" instruction encodes a "truth table" using 4 bits (i.e., an encoding of an arbitrary Boolean logic function with up to 2 inputs), whereby two Boolean operands, encoded as floating point values, are used to index into this table and obtain a Boolean result. The Boolean result is then encoded as an floating point (FP) Boolean value in accordance with the mechanisms of the illustrative embodiments and stored in the register file. In the context of a SIMD vector architecture, the "flogical" instruction is a vector "qvflogical" instruction. In such a case, the Boolean values in each slot are independently used to independently derive an output result, encoded as FP Boolean, for each vector position.

Figure 4:
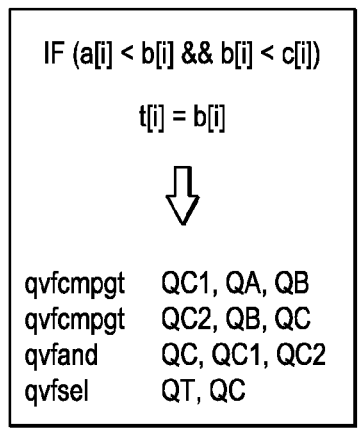
FIG. 4 is an example of code for implementing a complex evaluation using the mechanisms of the FP only SIMD ISA of the illustrative embodiments.

With the above mechanisms of the FP only SIMD ISA of the illustrative embodiments, complex evaluations may be made. FIG. 4 is an example of code for implementing a complex evaluation using the mechanisms of the FP only SIMD ISA of the illustrative embodiments. With the example shown in FIG. 4, Boolean values are generated in a vector representation and Boolean logic operations are performed on such vectors with vector Boolean values being output. Moreover, vector select operations are provided for implementing data selection on such vectors.

As shown in FIG. 4, in the example, a first value a[i] is compared to a second value b[i] to determine if a[i] is less than b[i]. The second value b[i] is further compared to a third value c[i] to determine if b[i] is less than c[i]. If both conditions are satisfied, then t[i] is set equal to b[i]. FIG. 4 shows how this functionality may be implemented using the compare, Boolean logic, and select instructions of the FP only SIMD ISA.

As shown in FIG. 4, four floating point only SIMD instructions are used to perform the comparison, logic, and selection operations of the example. A first instruction is the quad vector floating point compare for greater than instruction QVFCMPGT which takes the quad-vector register values from quad-vector register QA and the quad-vector register values from quad-vector register QB and determines for each of the four vector elements in a quad vector register if the value from QA is larger than the value from QB and stores the result in the four corresponding vector elements in QC1. If the comparison results in a "true" result, i.e., a value in a position of QA is greater than the corresponding value in the corresponding vector position of QB, then a value of 1.0 is stored in QC1 for that corresponding position. If the comparison results in a "false" result, i.e., a value in a position of QA is not greater than the corresponding value in the corresponding vector position of QB, then a value of −1.0 is stored in QC1 for that corresponding position. A similar comparison is performed with the vector values from QB and QC with the result being stored in QC2. A quad-vector logic AND function, QVFAND, is performed on the values in QC1 and QC2 with the result being stored in register QC. A quad-vector select function, QVFSEL, is performed to select for each vector position a value for input to quad-vector register QT based on the value stored in the quad-vector register QC.

Thus, with the floating point only SIMD ISA of the illustrative embodiments, the floating point vector compare instructions may be used to compute conditions for data-parallel select operations. The data parallel select instructions may be used to optimize and SIMD vectorize code with conditional execution. The data parallel select instructions support data-parallel if conversion and data parallel select operations. The floating point logical instructions may be used to compute even more complex expressions for the data-parallel select instructions.

It should be noted that in prior SIMD ISAs it was not possible to perform vector floating point compare and selection operations such as that shown in FIG. 4 because both encoding of Boolean values in floating point ISAs and the necessary operational support for using such encodings has previously eluded those skilled in the art. In the known ISAs these instructions are implemented as integer operations because encoding of Boolean values in FP has previously eluded those skilled in the art. Thus, in order for such instructions to operate on floating point values and vectors of floating point values, such vector values have previously been required to either be converted to scalar instructions, and scalar comparisons into condition codes (which represent conditions as single or multi-bit integers) or vectors of integer values.

When conversion to scalar values has been used, the scalar instructions must be executed on the converted scalar values, and the result converted back to a vector value, resulting in significant processing inefficiency. When integer vectors have been used, expensive support for vector processing with both floating point and integer values has been required.

Figure 5:
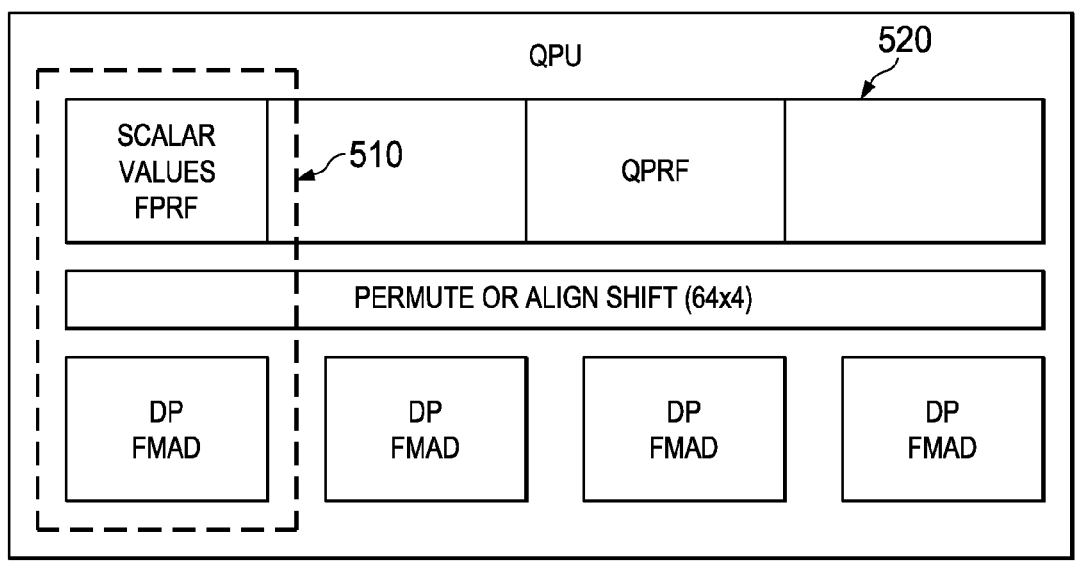
FIG. 5 is an exemplary diagram illustrating a legacy scalar ISA that is overlaid on the floating point only vector SIMD ISA of the illustrative embodiments such that legacy instructions may be executed using the vector registers of the illustrative embodiments.

As discussed above, in the illustrative embodiments, a quad-processing architecture is utilized in which a quad-processing unit (QPU) can execute up to 4 data elements concurrently with a single instruction. This quad-processing architecture is referred to as the Quad-Processing eXtension architecture (QPX). In one illustrative embodiment, the QPX architecture utilizes a four data element double precision SIMD architecture which is fully compliant with the PowerPC scalar computation architecture. That is, as shown in FIG. 5, a legacy scalar ISA is overlaid on the floating point vector SIMD ISA of the illustrative embodiments such that legacy instructions may be executed using the vector registers of the illustrative embodiments. Legacy scalar instructions operate on a preferred slot 510, i.e., a well defined element position in the vector of the vector registers 520. For such scalar instructions, and data values, the other slots of the vector may be set to zero, left undefined, set to another well defined value, or the like. These are basically "don't care" slots with regard to the scalar instructions.

By establishing a preferred slot 510 for scalar instructions, data sharing between scalar and vector instructions is obtained. Thus, there is no need for conversion operations for converting between scalar and vector data values as with known ISAs. Moreover, both scalar and floating point vector instructions and values may be stored in the same vector register file, e.g., vector register file 330 in FIG. 3. This eliminates the need for a separate scalar floating point unit and vector floating point unit while still allowing scalar instructions to be executed.

Figure 6:
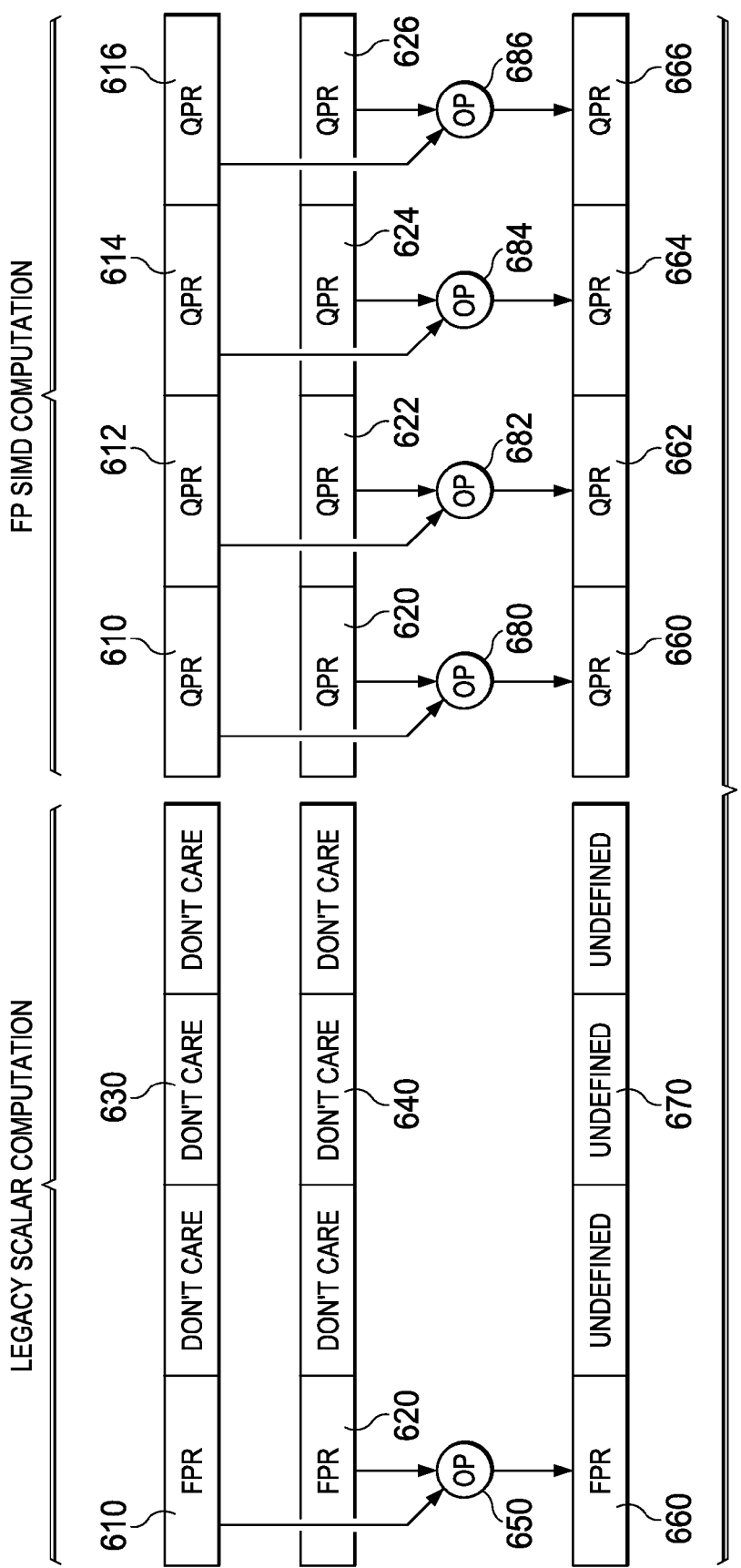
FIG. 6 is an exemplary diagram illustrating how the same vector registers may be used to perform legacy scalar computation operations as well as vector computation operations.

FIG. 6 shows how the same vector registers may be used to perform legacy scalar computation operations as well as vector computation operations. As shown in FIG. 6, for scalar computation operations, the preferred slots 610 and 620 of the vector registers 630 and 640 in the vector register file, e.g., vector register file 330, are operated upon by the scalar instruction or operation 650 with the scalar result being stored in the preferred slot 660 of vector register 670. The other slots 612-616 and 622-626 of the vector registers 630 and 640 are "don't care" slots and are not used by the scalar instruction. As mentioned above, these slots may have values that are set to zero, some well defined value, the value in slots 610 and 620 may be replicated to the remaining slots in their corresponding register, or the like.

With floating point vector instructions, instructions are able to perform four operations 680-686 on respective ones of the slots 610-616 and 620-626 of the vector registers 630 and 640. The results of these vector instructions 680-686 are written to corresponding slots 660-666 of the vector register 670. Thus, both scalar instructions and vector instructions may be executed by a quad-processing unit (QPU), such as QPU 320 in FIG. 3, using the vector registers of the vector register file 330, for example. This greatly reduces the area, power, and resource consumption of the processor architecture.

In addition to the floating point Boolean instructions, logic instructions, select instruction, and comparison instructions, the floating point only SIMD ISA of the illustrative embodiments further provides a permute functionality on the quad-processing vector register data values. The permute function or operation is performed at the vector element granularity on naturally aligned vector elements. The permute functionality in the QPU 320 is implemented in such a way as to support an all-to-all permutation. That is, any of the elements of two input vector registers may be selected for storage in any of the first through fourth elements of a result vector register. The selection of which vector register element is to be used for each slot of the result vector register is controlled by a control value which is also a floating point vector value.

Figure 7:
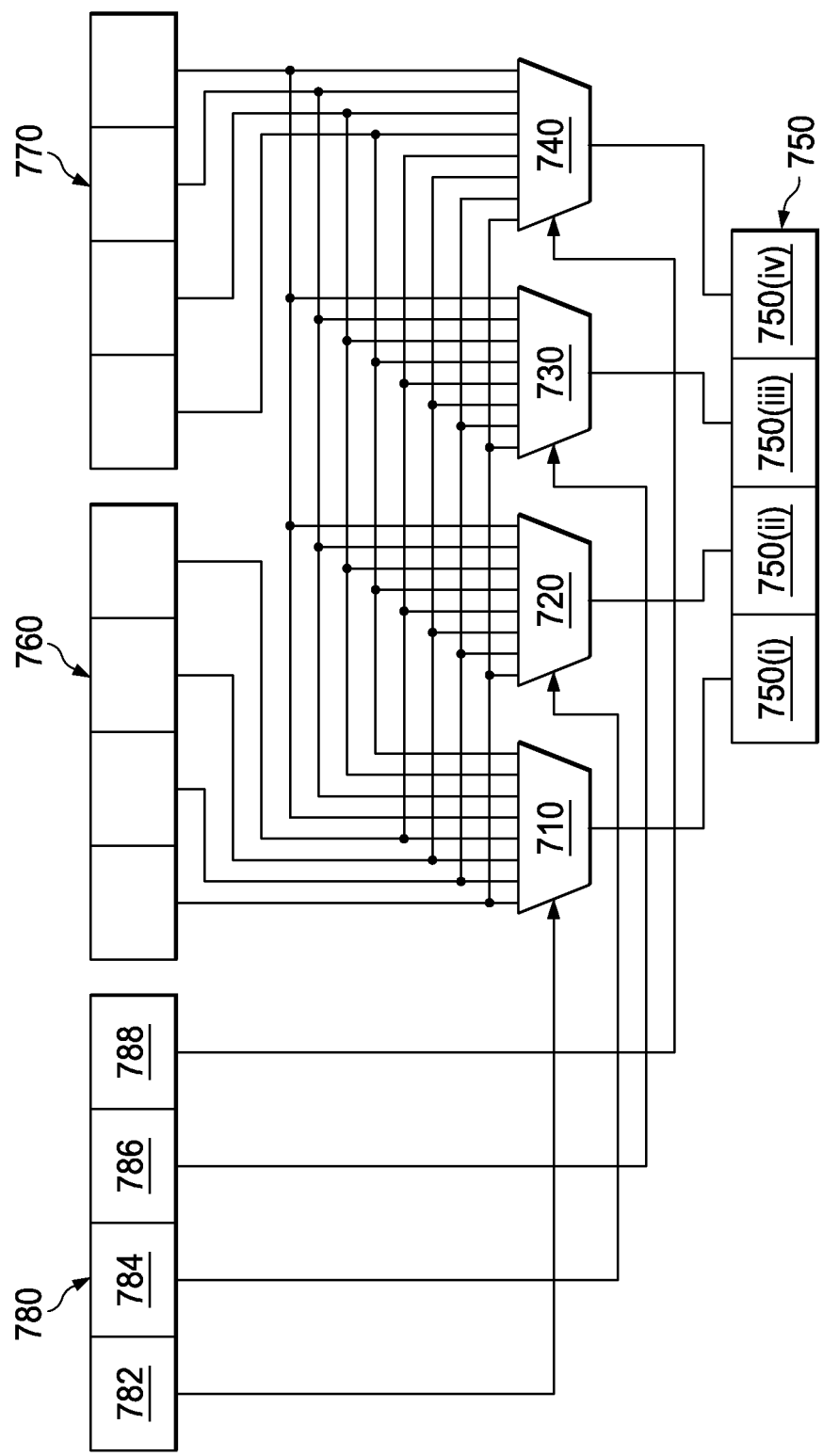
FIG. 7 is an exemplary diagram of the permutation logic for a quad-processing unit in accordance with one illustrative embodiment.

FIG. 7 is an exemplary diagram of the permutation logic for a quad-processing unit in accordance with one illustrative embodiment. As shown in FIG. 7, four multiplexers 710-740 are provided. Each multiplexer 710-740 outputs one of the input vector register elements as an output to a corresponding one of the vector elements in result vector register 750. In the depicted embodiment, each multiplexer 710-740 has eight inputs, one from each of the four elements of the vector registers 760 and 770. A third vector register 780 provides the control input to the multiplexers 710-740. That is, each element 782-788 is input to a respective one of the multiplexer 710-740 and identifies which input to output to the result vector register 750. The third vector register 780, is also part of the vector register file along with vector registers 760 and 770 and thus, has a similar configuration as described herein.

Thus, with the permutation logic of FIG. 7, the permute instruction of the floating point only SIMD ISA may select from two source vectors, any of the elements to generate one target vector. Operations are provided for constructing a control vector and storing that control vector in a vector register, such as vector register 780 in FIG. 7. In one illustrative embodiment, instructions for performing such operations are adapted to construct the control vector as a floating point vector from a literal, i.e. an immediate value field in the instruction word (e.g., see qvgpci instruction in FIG. 12, described hereafter), encoded in the instruction word. In another illustrative embodiment, instructions are adapted to construct the control vector as a floating point vector from an address specified as an operand to the instruction (for example, see the qvlpcldx and qvlpclsx instructions of FIGS. 9 and 10 which read registers ra and rb and convert them into control words stored in the qalign register, described hereafter).

The control vector indicates a permutation pattern as a floating point vector. When at least one slot of the control vector is being write-updated, all elements of the vector are write-updated to a determined or indeterminate value, as previously described above with regard to FIG. 6, for example. For example, the instructions qvgpci of FIG. 12, qvlpcldx of FIG. 10, qvlpclsx of FIG. 9, as well as the qvlperdx and qvlpersx instructions which are demonstrated in the appendix of the instruction set, are exemplary instructions for generating these control vectors.

Thus, a FP-only SIMD ISA processor, data processing system, apparatus, or the like, such as that described in the illustrative embodiments herein, comprises at least a floating point vector register file containing at least two floating point vector register elements in a single floating point vector register and a permute unit receiving at least two input operands containing data to be permuted and at least one control vector indicating the permutation pattern as a floating point vector. The permute functionality of the permute unit supports an all-to-all permutation in which any of the floating point vector register elements of the two input floating point vector registers may be selected for storing in any floating point vector register element of a result floating point vector register. Selection of which floating point vector register element of the result floating point vector register is to be used is controlled by a floating point vector control value of the control vector. The floating point vector control values of the control vector specify a permutation pattern. The permutation pattern is, in one illustrative embodiment, a floating point vector encoded by way of high-order mantissa bits and a well-defined exponent value, as described hereafter.

In one illustrative embodiment, the floating point representation of the floating point vector values for the permute control vector is chosen to correspond to numbers having only a single possible representation. In another illustrative embodiment, the floating point representation of the floating point vector values for the permute control vector is chosen to correspond to numbers not requiring preprocessing to determine the control action of the permute unit. The permute instruction, that invokes the operation of the permute unit, is adapted to permute single and double precision values stored in the respective one of each vector locations directly.

Figure 10:
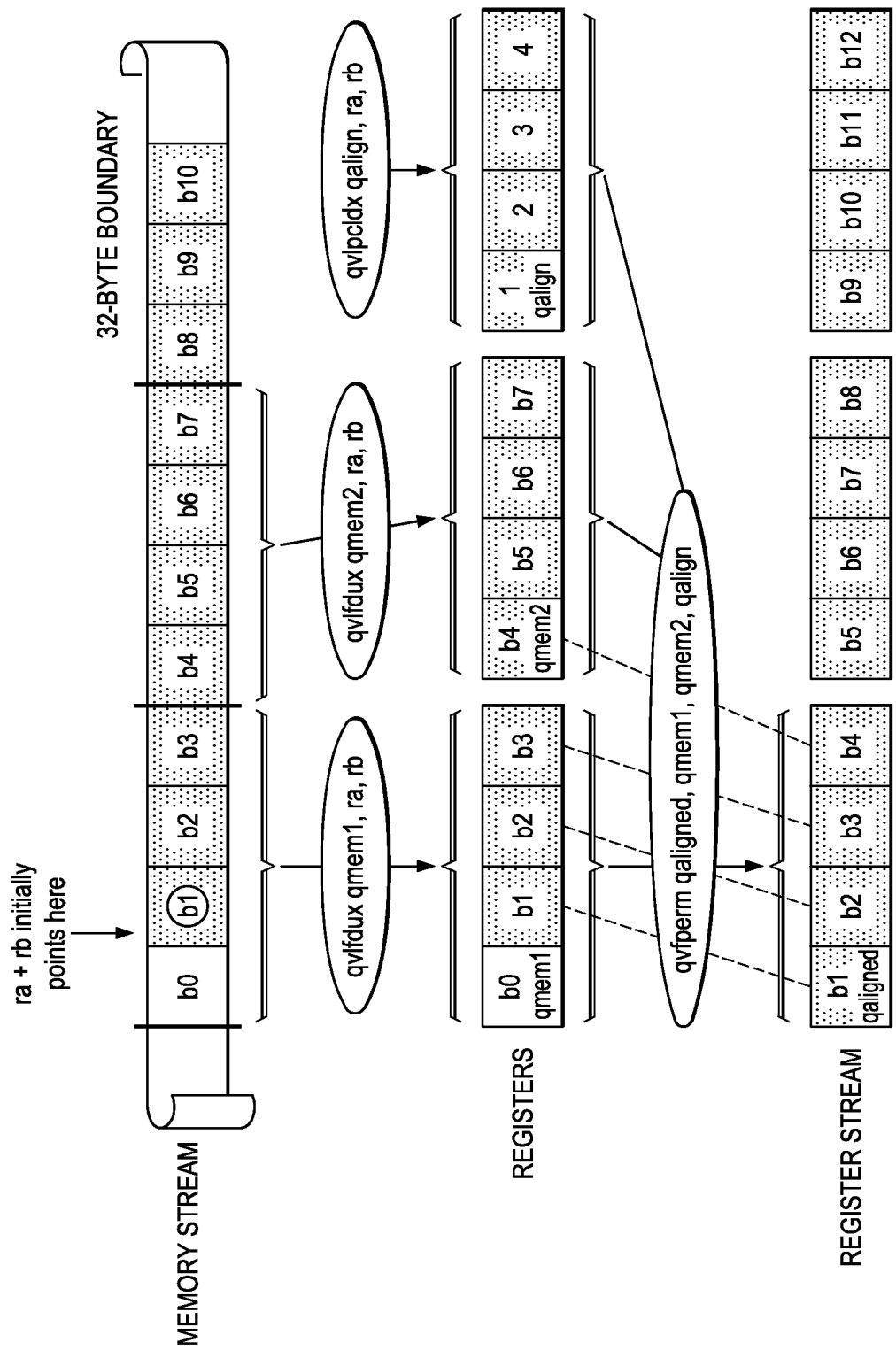
FIG. 10 is an exemplary diagram illustrating the data alignment performed for double precision data values in accordance with one illustrative embodiment.
Figure 11:
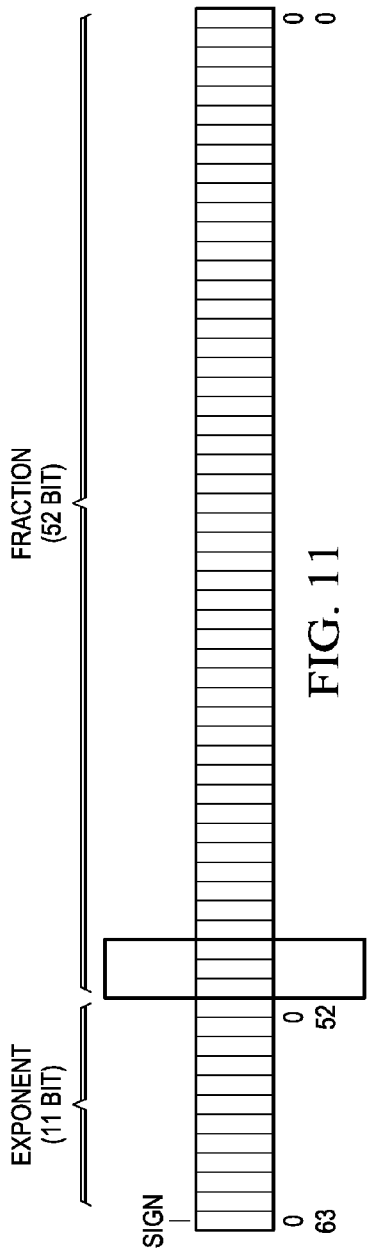
FIG. 11 is an exemplary diagram illustrating the encoding of alignment data in the most significant bits of a mantissa of a floating point number in accordance with one illustrative embodiment.

The logic of the permute unit, as shown in the illustrative embodiment of FIG. 7, comprises one or more multiplexers, e.g., four multiplexers in the depicted example, each of the one or more multiplexers outputting a floating point value selected from floating point values of the at least two floating point vector register elements, as an output to a corresponding one of the floating point vector register elements in the result floating point vector register. The floating point vector register elements may represent input operands, for example. The vector elements of the control vector indicate the permutation pattern as a floating point vector that encodes the source of the floating point number. For example, with regard to the example of FIG. 7, the control vector 780, and more specifically its specific elements 782, 784,786, and 788, encode the source information for each of the elements 750(*i*), 750(*ii*), 750(*iii*), and 750(*iv*). Element 780 (and specifically the slots 782, 784, 786 and 788) of FIG. 7 represent an alignment control vector that, as a software register, is specified by the register name qalign with respect to FIGS. 9 and 10 hereafter. As such, 780 is the apparatus aspect implementing qalign. Register 780 (register qalign) consists of 4 vector element slots each encoded in accordance with FIG. 11, described hereafter, wherein each vector slot encodes the source to be selected by multiplexors 710 thru 740 in accordance with FIG. 7. As described hereafter, FIG. 11 shows 3 bits of the fraction being used, which allows the multiplexers to select $2^3=8$ possible inputs. Those skilled in the art will understand that the illustrative embodiments may be applied to vectors of other lengths, e.g., of length 2 wherein 2 selection bits suffice, or of length 8, wherein 4 selection bits to select from 2 inputs, each of the 2 inputs having 8 elements, are utilized.

In one illustrative embodiment of a floating point SIMD architecture, the control word is encoded in a floating point format. In some illustrative embodiments, the floating point format used to encode alignment information uses a predefined exponent value and encodes the alignment information as part of the mantissa. In one of these illustrative embodiments, the alignment information is encoded in the high-order mantissa bits. Those skilled in the art will understand that other encodings can be used to describe alignment based on the teachings contained herein, including those that use one or more of exponent bits, sign bits and lower order mantissa bits.

A compiler for the FP only SIMD ISA of the illustrative embodiments may make use of these compare, Boolean, select, logic, and permute instructions when optimizing code for execution. For example, if original code has the "if" code shown in FIG. 4, the "if" code can be converted to the set of comparison and select instructions also shown in FIG. 4. The compiler may parse the original code and transform the code into a set of instructions corresponding to the floating point only SIMD ISA of the illustrative embodiments. Thus, the compiler may have code for identifying different code sequences corresponding to the particular instructions in the floating point only SIMD ISA.

In accordance with the present invention, the compiler may further have code to assign Boolean conditions to the novel floating point Boolean representation and a novel assignment algorithm to assign logical values to floating point registers by making use of the floating point Boolean representation. Furthermore, in some illustrative embodiments of the present invention, the compiler may furthermore have the capability to generate novel instructions operating on the novel floating point Boolean values, e.g., to evaluate Boolean operations. The compiler may furthermore have the ability to translate Boolean expressions into sequences of instructions including the instructions operating on floating point Boolean values, such as floating point Boolean logical operations and floating point Boolean select.

In accordance with the present invention, the compiler may furthermore have code to understand that data parallel if-conversion can be performed to target a floating point-only SIMD ISA, by translating if instructions into data parallel select, i.e., performing FP-oriented data-parallel if conversion. Moreover, the compiler may furthermore have code cognizant of that data reorganization and the ability to perform the data reorganization in an FP-only SIMD ISA. It may further be able to generate code to use the data reorganization to re-align vector values, by generating permute control words and generating floating-point oriented permute instructions for an FP-only SIMD ISA.

In accordance with the present invention, the compiler may furthermore have code cognizant of the requirement to widen vectors of single precision values to vectors of double precision values on load from memory when a vector of single precision values is to be loaded, and truncating double precision values in a vector of double precision values into single precision values in a vector of single precision values when a vector of single precision values is to be stored. With regard to some illustrative embodiments of the present invention, the compiler may further be cognizant that realignment control for vector realignment uses naturally aligned double word memory address boundaries (corresponding to double precision values stored in memory) for double precision vectors that have been loaded with instructions directed at loading vectors consisting of double precision values. The compiler may further be cognizant that realignment control for vector realignment must translate naturally aligned word memory address boundaries (corresponding to single precision values stored in memory) for single precision vectors that have been loaded with instructions directed at loading vectors consisting of single precision values and converting them to double precision values, in a manner preserving the positions within the vector regardless of data size by adjusting positions in accordance with the performed conversion from vectors consisting of single precision values to vectors consisting of double precision values.

Those skilled in the art will understand that similarly, in accordance with the present invention, the compiler will be cognizant of like issues when data is to be stored from the double precision vector register format into one of vectors of double precision and vectors of single precision, when conversion is to be performed, and when realignment for store is to be performed.

Figure 8A:
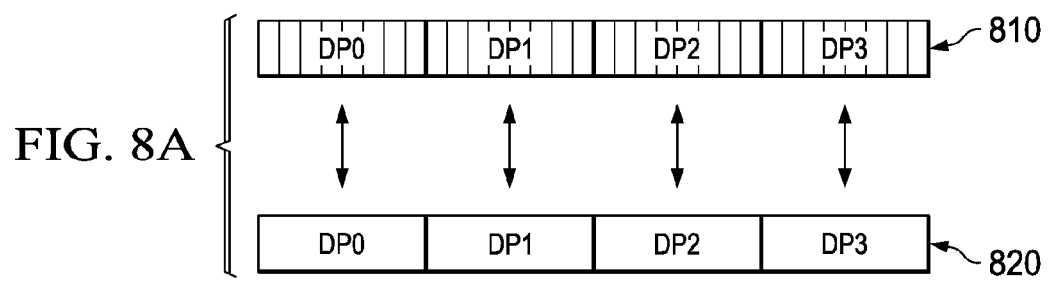
FIG. 8A is an exemplary diagram illustrating a double precision memory access in accordance with one illustrative embodiment.

As mentioned above with the illustrative embodiments, the values stored in the slots of the vector registers in the vector register file are preferably double precision floating point values. Thus, with the quad-processing architecture of the illustrative embodiments, four double precision floating point values may be stored in a single vector register of the vector register file. For example, as shown in FIG. 8A, four double precision floating point values DP0-DP3 are loaded from a 32 Byte block of memory 810 as a naturally aligned 32 Byte vector and placed into a 32 Byte vector register 820 of the vector register file.

Figure 8B:
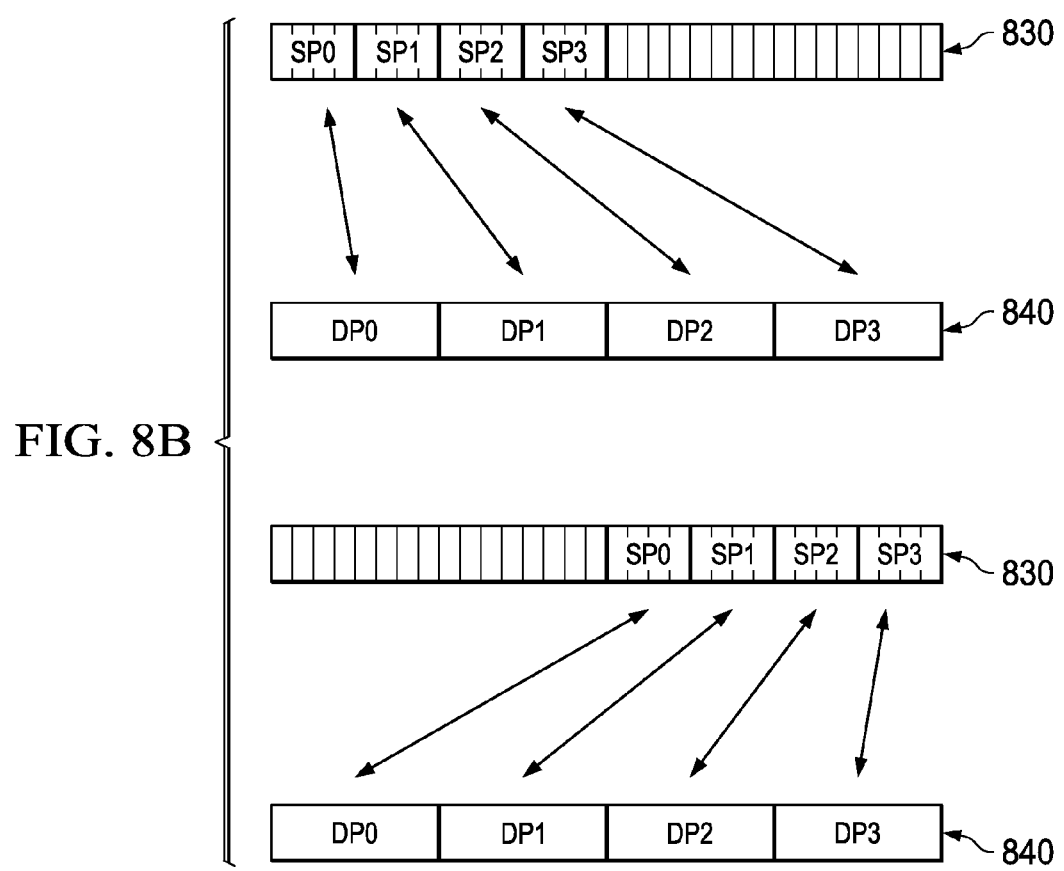
FIG. 8B is an exemplary diagram illustrating a single precision memory access in accordance with one illustrative embodiment.

The illustrative embodiments further provide mechanisms for handling single precision memory access, as shown in FIG. 8B. With a single precision memory access, the first 16 byte block in a 32 byte block is loaded into a quad-processing vector register with precision expansion. As shown in FIG. 8B, four single precision floating point values SP0-SP3 are loaded from a 32 Byte block 830 as a naturally aligned 16 Byte vector, from either a first 16 byte aligned vector position or a second aligned 16 byte vector position, and placed into the 32 Byte register 840 after precision expansion, wherein the first or second block is preferably selected by one additional address bit being decoded by corresponding load instruction. The precision expansion may be performed implicitly by a load instruction that extends the values loaded from memory into elements of a vector.

Alternatively, the precision expansion may be performed by providing an additional extension instruction. In accordance with such an alternate illustrative embodiment, an extract single and convert to double instruction will select a 16 byte data range from a 32 byte vector register, interpret the 16 byte data range as a sequence of 4 single precision values, and convert each single precision value into a double precision value, generating a 32 byte vector consisting of 4 double precision values. In accordance with one illustrative embodiment, the first or second 16 byte subrange is specified by an operand and provides data-driven subrange selection and conversion. In accordance with an alternate illustrative embodiment, the subrange is encoded in the instruction, and one or multiple instructions corresponding to different subranges may be provided.

It should be appreciated that, conversely, when a value in a vector register is to be stored as a lower precision vector, the value is stored using a store instruction which reduces the precision. Those skilled in the art will be able to use a number of different methods in conjunction with the illustrative embodiments for reducing procession in order to convert a double precision number to a single procession number, including known and future precision reduction methods, such as the known methods of truncating, and specifically truncating in accordance with the Power Architecture™ specification, and rounding, either in accordance with a dynamically or statically specified rounding mode. Again, in an alternative embodiment, an additional instruction may be provided which may reduce the precision of the value prior to performing the store operation.

Thus, in the FP only SIMD ISA of the illustrative embodiments, a vector register of the vector register file may store either four single precision FP vector elements extended to double precision, or four double precision floating point vector elements. With the expansion mechanism of the illustrative embodiments, data is "stepped up" from an internal k[i] bit representation (i being the data type loaded) to a k[j] (j being the data type stored into the register) representation and an expansion factor k[i]/k[j] takes place. This expansion, however, defeats known alignment operations which compute alignment based on the data address. Specifically, when alignment refers to a value of type i with alignment a*k[i], when data type i is stepped up, it will now be at position a*k[i]/(k[i]*k[j])=a*k[j] and hence alignment information referring to a*k[i] will no longer refer to the original datum in its "stepped up" form, and thus lead to incorrect realignment of the stepped up data.

Typically, with known polymorphic architectures, such alignment of vectors is done using polymorphic byte-wise data rearrangement in which vector displacement is specified by a byte offset. However, with an architecture in which vector registers store wider elements, and narrow elements may be extended to these wider elements for processing, as in the floating point only SIMD ISA of the illustrative embodiments, it is not possible to perform such byte-wise data rearrangement. Depending on the architectures, there may be other causes for which it is not possible to perform such byte-wise data rearrangement.

For example, different vector data types may be realigned with correspondingly different vectors. This is necessary because an offset of 8 Bytes will indicate, for example, for a single precision vector a misalignment of 2 elements, whereas for a double precision vector, a misalignment of a single element. While it may be possible to have different re-arrangement instructions for different vector data types, e.g., single precision versus double precision, this requires an increase in opcode usage (multiple instructions must be encoded), verification complexity (multiple instructions must be verified), and programming complexity (a programmer or compiler must understand what permute instruction to use for each register depending on how the vector was loaded regardless of its present data type).

The illustrative embodiments alleviate this additional complexity by providing a common data rearrangement capability for a double precision floating point only SIMD ISA. The common data rearrangement capability uses a first instruction for obtaining alignment information from the double precision floating point value in the vector register file and uses this information to compute an alignment mask that identifies how far away from an element boundary the data is. The data is loaded and then a permute operation is performed on the loaded data based upon the determined alignment mask.

In accordance with the illustrative embodiments, different mask generation instructions are provided corresponding to the loading of data types. In one embodiment, a first instruction computes an alignment mask (or alignment control word) corresponding to loading data without data step up. Yet another instruction computes an alignment mask (or alignment control word) corresponding to loading data with a defined step up factor, and considering that defined step up factor to step up alignment information. Those skilled in the art will understand how to add a second instruction with yet another step up (or step down) factor, a third instruction with yet a different step up/down factor, and so forth.

A set of instructions for performing common data rearrangement, regardless of the instruction having generated the alignment control word, is provided for single precision and for double precision floating point data values, in one illustrative embodiment. In accordance with one illustrative embodiment, an example sequence of instructions used to perform alignment of floating point data values for single precision data values is the following:

```
qvlpclsx qalign, ra, rb
qvlfsux qmem1, ra, rb
qvlfsux qmem2, ra, rb
qvfperm qaligned, qmem1, qmem2, qalign
```

For double precision floating point data values, a similar example set of instructions are used to perform alignment:

```
qvlpcldx qalign, ra, rb
qvlfdux qmem1, ra, rb
qvlfdux qmem2, ra, rb
qvfperm qaligned, qmem1, qmem2, qalign
```

In these sets of instructions, qvlpclsx and qvlpcldx are used to determine the alignment of the floating point values stored at a memory address represented by the sum of general purpose registers ra and rb and determine an alignment mask control word that is stored in qalign. The alignment mask control word essentially identifies how far away from an element boundary the data value is that is to be loaded. In this exemplary embodiment, qvlpcldx represents computing an alignment control word for double precision elements and without stepping factor, and qvlplsx represents computing an alignment control word for single precision elements with a stepping factor of 2.

The instructions qvlfsux and qvlfdux are used to load the data values from memory based on the addition of general purpose register ra with general purpose register rb. Those skilled in the art will understand how to provide additional instructions based on different "addressing modes" known to those skilled in the art and employ these addressing modes within the scope of the illustrative embodiments to compute alignment control words based on the teachings contained herein.

Referring now to instructions qvlfdux and qvlfsux, respectively, quad vector load floating point instructions are used to load double and single precision quad vectors from memory. Specifically, the qvlfdux adds general registers RA and RB to use as memory address, and addresses memory, while truncating the received address to address a naturally aligned 32 byte memory block containing at least the first naturally aligned double precision vector element. The specified instruction uses an x-form load, i.e., indexed addressing by adding registers RA and RB to obtain a memory address. The instructions further exploits the update for of load instruction, writing back the (non-truncated) sum of general purpose registers RA and RB back to general purpose register RA. In one preferred exemplary sample sequence update forms are used to load two consecutive double precision quad vectors by initializing general purpose register RB with the value 32.

Those skilled in the art will understand other ways of loading two successive 32 byte memory blocks and will be able to apply alternative ways of loading two successive memory blocks within the scope of the present invention. Specifically, the qvlfsux adds general purpose registers RA and RB to use as memory address, and addresses memory, while truncating the received address to address a naturally aligned 16 byte memory block containing at least the first naturally aligned double precision vector element. The specified instruction uses an x-form load, i.e., indexed addressing by adding registers RA and RB to obtain a memory address. The instructions further exploits the update for of load instruction, writing back the (non-truncated) sum of general purpose registers RA and RB back to general purpose register RA. In one preferred exemplary sample sequence update forms are used to load two consecutive double precision quad vectors by initializing general purpose register RB with the value 16.

Those skilled in the art will understand other ways of loading two successive 16 byte memory blocks and will be able to apply alternative ways of loading two successive memory blocks within the scope of the present invention. Those skilled in the art will understand how to provide additional instructions based on different "addressing modes" known to those skilled in the art and employ the addressing modes within the scope of the present invention to the computation of alignment control words based on the teachings contained herein.

Different instructions are used to determine the alignment and to load the data values because, for a 32 byte vector register with a quad-processing unit in which there are 4 elements per vector register, each element in the vector register has 8 bytes for double precision floating point data values but each single precision floating point data value has 4 byte boundaries. The double precision alignment determination instruction qvlpcdx determines what element of the four elements that the data value is present in and aligns the data value according to the double precision 8-byte elements. The single precision alignment determination instruction determines the element of the four elements that the data value is present in based on a conversion of the 4 byte single precision boundary to the 8-byte element boundaries.

Once the alignment of the values is determined and the data values are loaded, a quad-processing vector floating point permute operation qvfperm is executed on the data values stored in qmem1 and qmem2 based on the determined alignment qalign. That is, qmem1 and qmem2 may be the input vectors for the permute logic shown in FIG. 7 with the qalign vector being the control vector for selecting elements from the input vectors qmem1 and qmem2. The result is stored in the vector register qaligned. It can be appreciated from the above that the same alignment sequence based on qvfperm is used for single precision and double precision data values once alignment information has been loaded with qvlpclsx and qvlpcldx, respectively, and data has been loaded with qvlfsux and qvldux, respectively. The operation described by qvlpclsx and qvlpcldx can be implemented in hardware, such as by an element computation circuit and provided as an instruction, or in software, such as by an address computation and table lookup sequence.

A circuit implementation may be obtained by synthesizing the following logic in Very High Speed Integrated Circuit (VHSIC) Hardware Description Language (VHDL):

WORD_FOR_10_ALIGN, CONTROL WORD_FOR_11_ALIGN correspond to the four alignment mask values for a four element vector.

An exemplary implementation in software, using the C programming language for example, can be obtained by compiling code corresponding to the following "C" language code fragment:

```
extern controlword_t controlword_array[ ];
address_t memaddress, ra;
int rb;
unsigned alignment;
controlword_t controlword;
memaddress      = ra + rb;
alignment       = (memaddress >> 3) & 0x03;
control word    = controlword_array[alignment];
```

In accordance with the "C" language definition, address t is a data type holding a memory address, controlword_t is a data type to hold a controlword (e.g., in a format described herein below with reference to preferred exemplary implementation), and controlword_array is an array consisting of at least 4 elements corresponding to the controlword to be loaded for alignments 00, 01, 10, 11 (vector positions decimal 0, 1, 2, and 3, respectively). Those skilled in the art will understand how to apply the teachings contained herein to different vector lengths, addressing modes, controlword encodings, and so forth, within the scope of the present invention.

Figure 9:
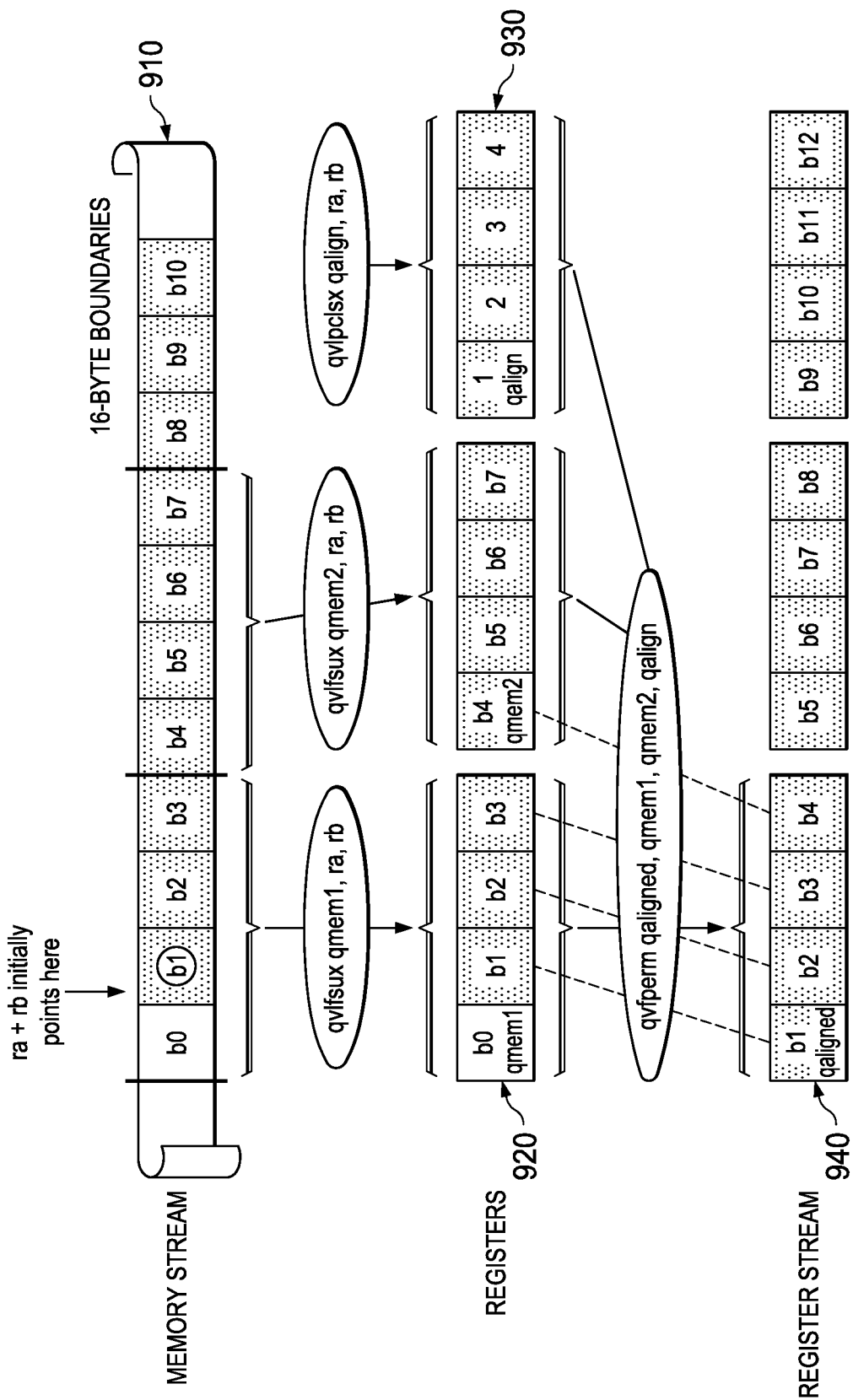
FIG. 9 is an exemplary diagram illustrating the data alignment performed for single precision data values in accordance with one illustrative embodiment.

FIG. 9 is an exemplary diagram illustrating the data alignment performed for single precision data values in accordance with one illustrative embodiment. In FIG. 9, and FIGS. 10, 13, and 14 hereafter, the shaded portions represent used data values whereas unshaded portions represent unused data values. In accordance with one illustrative embodiment of a floating point SIMD architecture, the control word, discussed hereafter with regard to FIGS. 9 and 10, is encoded in a floating point format. In one illustrative embodiment, the floating point format used to encode alignment information uses a predefined exponent value and encodes the alignment information as part of the mantissa. In one of these illustrative embodiments, the alignment information is encoded in the high-order mantissa bits. Those skilled in the art will understand that other encodings can be used to describe alignment based on the teachings contained herein, including those that use one or more of exponent bits, sign bits, and lower order mantissa bits.

The data alignment is performed with regard to the execution of the statement (prior to SIMD code generation) "for (i=0; i<64; i++) a[i+2]=b[i+1]+c[i+3]". The memory stream 910 has elements b0 to b10 shown, but element b0 is not utilized by the statement. To the contrary, the vector of data values starts with the second element b1 (corresponding to i=0). As shown in FIG. 9, in one exemplary sequence ra+rb has been initialized to point to b1 in accordance with

```
memaddress   <=   ra + rb;
alignment    <=   memaddress(59 to 60);
controlword  <=   CONTROLWORD_FOR_00_ALIGN if alignment = "00" else
                  CONTROLWORD_FOR_01_ALIGN if alignment = "01" else
                  CONTROLWORD_FOR_10_ALIGN if alignment = "10" else
                  CONTROLWORD_FOR_11_ALIGN;
```

In accordance with the VHDL definition, the constants CONTROL WORD_FOR_00_ALIGN, CONTROL WORD_FOR_01_ALIGN, CONTROL an exemplary execution sequence. The qvlfsux load instructions load the first and second 16 byte single precision words into the double precision vector registers qmem1 and qmem2 920, respectively. As a result, qmem1 stores the elements b0, b1, b2, and b3 while qmem2 stores the elements b4, b5, b6, and b7.

The qvlpclsx instruction generates a control word 930 based on the element alignment relative to a 4-element single precision vector boundary in memory. This control word 930 indicates that the beginning of the first 4-element vector value is b1, i.e. the second element in qmem1. Thus, based on the control word 930 generated by qvlpclsx, the permute operation qvfperm left shifts the values stored in qmem1 and qmem2 by one element to obtain the register stream 940 shown. As shown in FIG. 9, the register stream 940 comprises all values of the b array used by the original statement.

FIG. 10 is an exemplary diagram illustrating the data alignment performed for double precision data values in accordance with one illustrative embodiment. In comparison with FIG. 9, in FIG. 10 no expansion takes place, and ra and rb point to a different address from that shown in FIG. 9. The first element b1 in the example of FIG. 9 is of the form 16n+4 and a control word of "1234" is obtained. In FIG. 2, the address of the first element b1 is 32n+8, and the control word of "1234" is also obtained because the qvlpcldx and qvlpclsx functions are cognizant of data types and apply the appropriate step up factors internally.

Alignment information is recorded as a control word and may be encoded as a floating point number and stored in a quad vector register. Advantageously, encoding the control word as a floating point number allows the control word to be stored in the FP SIMD vector register file. That is, the control word does not need to be stored in the register file as integer information such that this integer information is processed using arithmetic, logic, permutation, or other such similar computational instructions, as has been used to encode control words as integer control words in prior art mixed integer/floating point SIMD ISAs.

In one illustrative embodiment, the alignment information may be encoded in the mantissa of the floating point number. High order mantissa bits may be used in order to simplify and synergistically amplify predictability optimizations and allow permute control information to be spilled to a single precision vector storage location thereby reducing memory foot print and increasing cache effectiveness. In the context of the present description, predictability optimizations essentially put the bits of the alignment information where they are easy to find. The illustrative embodiments use an exponent that ensures that each number has only a single representation, with the selection of an appropriate mantissa helping in this regard. Other suitable positions of the bits of the alignment information may be utilized without departing from the spirit and scope of the illustrative embodiments.

The term "spilling into a single precision" as it is used herein means that if a store needs to be performed, the store can be done using a single precision. Single precision only stores a subset of mantissa bits, i.e. the high order mantissa bits. The term "cache effectiveness" refers to the fact that storing a 32 byte single precision value is more effective than storing 64 byte values since it allows twice as much information to be stored in the same number of bits. The term "simplified verification" as it is used herein refers to the fact that if the bits are in one location only, it is easier to verify those bits because only one possible location and one possible execution scenario corresponding to information being in one fixed location, needs to be verified. The term "simplified debugging" as it is used herein refers to the fact that predictability aids debugging because only one possible location and one possible execution scenario corresponding to information being in one fixed location can occur. This reduces the number of scenarios that may occur and need to be considered during debugging. This in turn limits the number of possible "bugs" to bugs that are in only one scenario.

As shown in FIG. 11, one double precision value in each vector slot may specify the source for that slot using its most significant mantissa, or fraction, bits. In the depicted example, the 3 most significant fraction bits are used to store the alignment information that specifies the source for that slot of the vector register. In one preferred embodiment, a specific exponent, such as hex 400 or higher, is chosen for the vector so as to avoid complicating debugging, verification, and to improve result predictability. If a permute control word does not have such an exponent, the permute instruction may generate a predetermined default value in a target vector slot not corresponding to a properly formatted vector permute control word, or an implementation defined value.

In accordance with one exemplary implementation of the illustrative embodiment, only the single bit position corresponding to the bit 0x400 is tested to simplify critical paths. If the bit is not set, the vector control value may correspond to a number in a range possibly having multiple internal representations in one exemplary embodiment having chosen an internal representation format to simplify loading and extension of single precision values to double precision values, such that de-normalized single precision numbers may be represented as non-normalized double precision numbers even when such numbers may be represented as a normalized double precision number. On the other hand, if the bit is set, the vector control value cannot correspond to a number in a range possibly having multiple internal representations, in one such exemplary embodiment. As a result, the mantissa is not consulted and a value of 0.0 is returned in the target vector slot. If the bit is set, the vector control value cannot correspond to a number in a range possibly having multiple internal representations. As a result, the mantissa is consulted and the 3 most significant bits of the mantissa are used to perform a select operation as discussed above. This yields the architecturally defined behavior for the exponent of 0x400, and a reproducible output (corresponding to that of cases where the exponent would have been 0x400) for any exponent values in the exponent 0x401 to 0x4FF range. In one exemplary embodiment, no reference is made to low-order mantissa bits, and their values are inconsequential on the behavior of the quad vector float permute instruction qvfperm.

Figure 12:
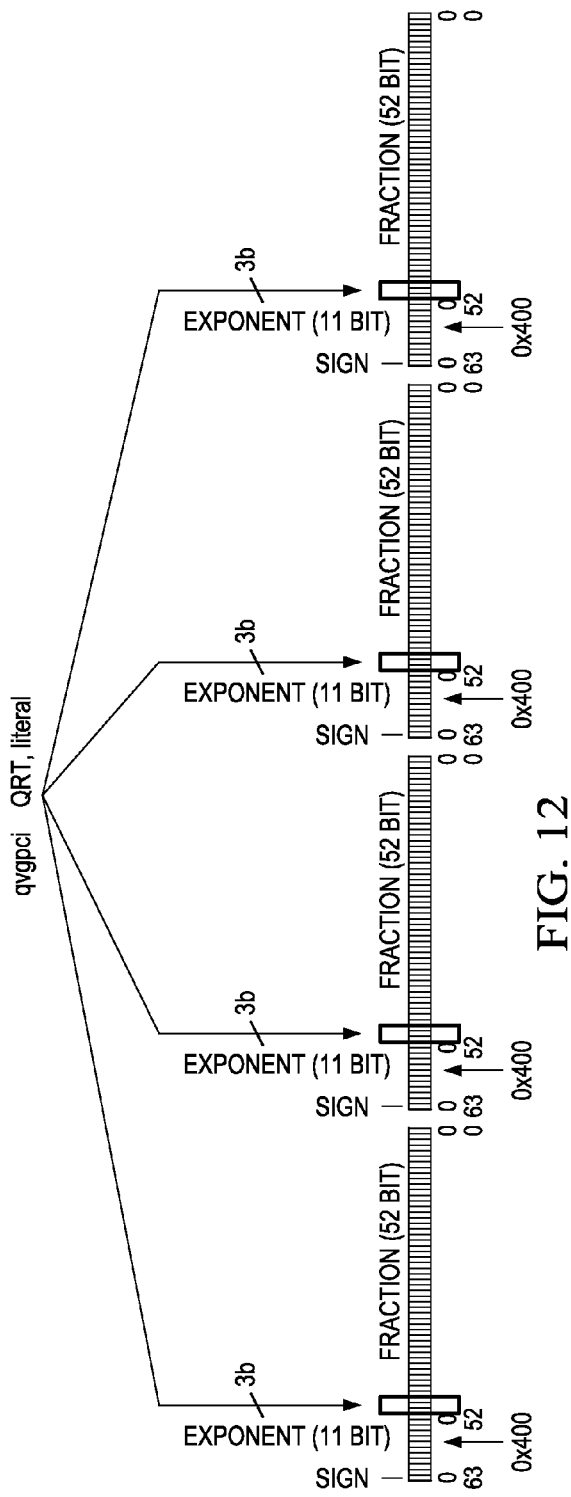
FIG. 12 is an exemplary diagram illustrating a generate vector permute control word immediate instruction (qvgpci) in accordance with one illustrative embodiment.

In addition to the above, additional capabilities are provided by the illustrative embodiments including the ability to generate a vector permute control word immediately. As shown in FIG. 12, to efficiently load a vector permute control word known by the compiler or the application programmer, a generate vector permute control word immediate instruction qvgpci is provided. As shown, the instruction generates a 4 element vector of double precision values which is properly formatted as a vector permute control word, i.e., the exponent is initialized to 0x400, and 3 bits are loaded into the most significant mantissa bits of each vector slot while zeroing the remaining mantissa bits.

Those skilled in the art will understand that this instruction allows programmers (or compilers) to generate a small set of floating point vectors from within a single instruction, and specifically those with normalized double precision numbers with an exponent of 0x400, arbitrary 3 most significant mantissa bits, and zero mantissa bits for the remaining mantissa, corresponding to vector control words.

In one illustrative embodiment, a programmer or compiler may desire to load such a floating point vector to initialize a permute control word for a specific permutation pattern. In another usage pattern, this instruction can be used to load a set of these floating point values for other computational needs. More features and elements of this instruction will be evident with reference to the instruction specification contained in the attached exemplary embodiment of an advanced FP-only SIMD instruction set in accordance with the present invention as set for by the QPX specification in Appendix A of this document.

In addition to the vector permute control word immediate, additional instructions for other data reorganization operations including shift instructions, splat instructions, and similar instructions can be provided in exemplary embodiments using a common hardware implementation. For example, the qvaligni (vector align immediate) instruction is provided for selecting a statically determined subvector from a concatenation for two vectors to generate a new target vector in one exemplary embodiment. More features and elements of this instruction will be evident with reference to the instruction specification contained in the attached exemplary embodiment of an advanced FP-only SIMD instruction set in accordance with the present invention as set for by the QPX specification in Appendix A of this document.

As another example, the qvesplati (element splat) instruction selects a statically determined element from a vector and replicates it into all slots in the target vector. It should be noted that this can also be used to replicate a scalar value in the preferred slot into all positions of a target vector to create a vector from a scalar value. More features and elements of this instruction will be evident with reference to the instruction specification contained in the attached exemplary embodiment of an advanced FP-only SIMD instruction set in accordance with the present invention as set for by the QPX specification in Appendix A of this document.

As with the compare, Boolean, logic, and select instructions of the FP only SIMD ISA of the illustrative embodiments, a compiler may implement the alignment shift operations and instructions described above to perform dynamic data-driven alignment of floating point vector data. That is, the compiler may analyze the original code and insert alignment code into the optimized code for dynamically aligning the vector data using the above vector alignment instructions when vector instructions are created. This alignment code may shift streams of data loaded from memory such that the resulting register streams are aligned for proper operation of vector logic instructions in accordance with the illustrative embodiments.

Figure 13:
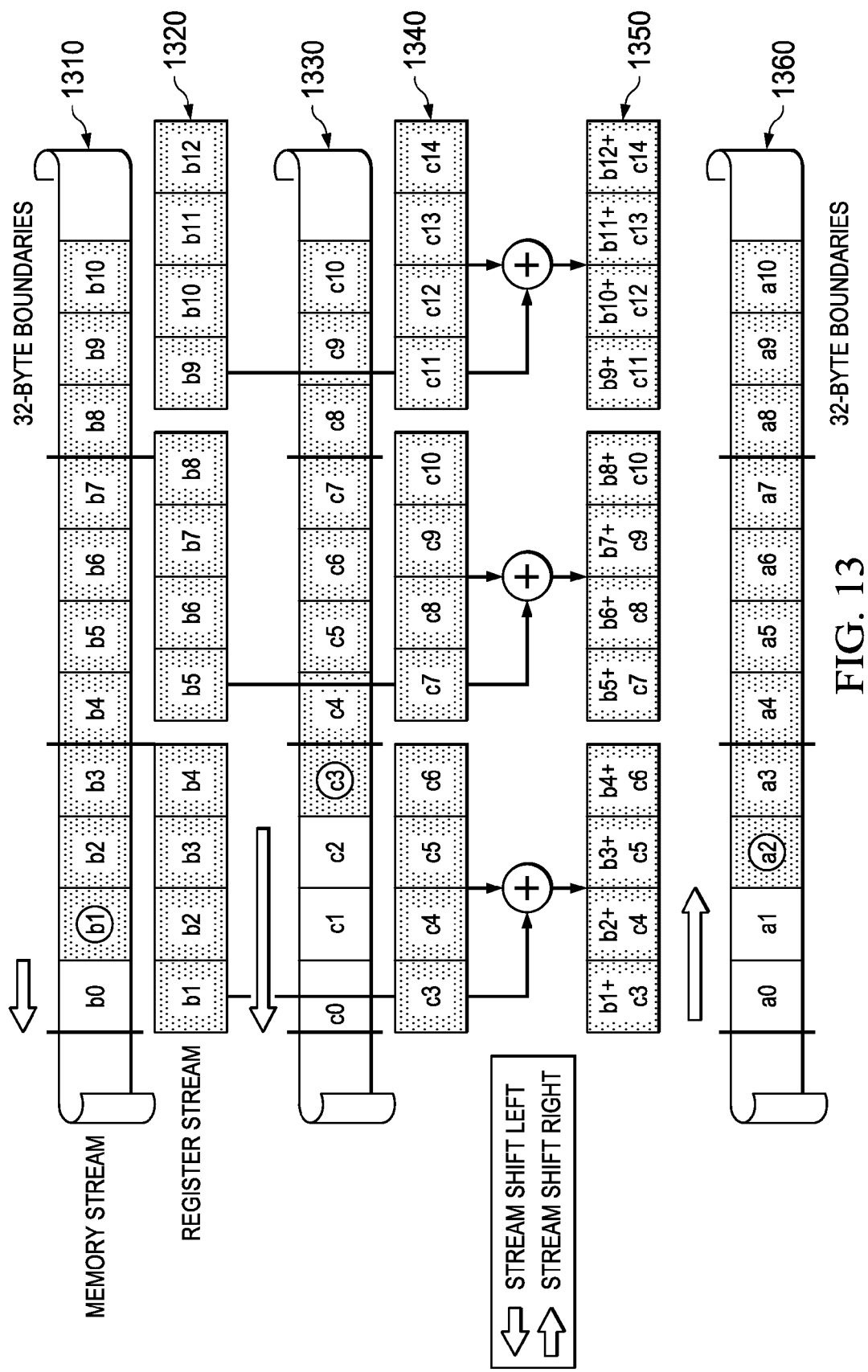
FIG. 13 is an exemplary diagram illustrating a data alignment problem for SIMD execution of an example original code statement.

In addition to simply aligning two vectors for performance of a vector logic operation, the alignment code may take into consideration all of the memory streams involved in an original code statement before determining proper alignment of the memory streams to achieve optimized execution. FIG. 13 is an exemplary diagram illustrating a data alignment problem for SIMD execution of an example original code statement. The example shown in FIG. 13 is for the execution of the scalar statement "for (i=0; i<64; i++) a[i+2]=b[i+1]+c[i+3]" in a SIMD fashion. As shown in FIG. 13, in order to perform a vector addition according to this statement, in an non-optimized fashion, a first memory stream 1310 for the array b[i+1] must be shifted left 1 vector element to achieve the register stream 1320. A second memory stream 1330 for the array c[i+3] must be shifted left 3 vector elements to achieve register stream 1340. The two register streams may then be added using a quad-processing vector logic instruction in accordance with the illustrative embodiments such that b1 is added to c3, b2 is added to c4, etc. and the register stream 1350 is obtained. The results must then be written to memory 1360 by shifting the result right by 2 vector elements such that the a2 element has the value of b1+c3.

Figure 14:
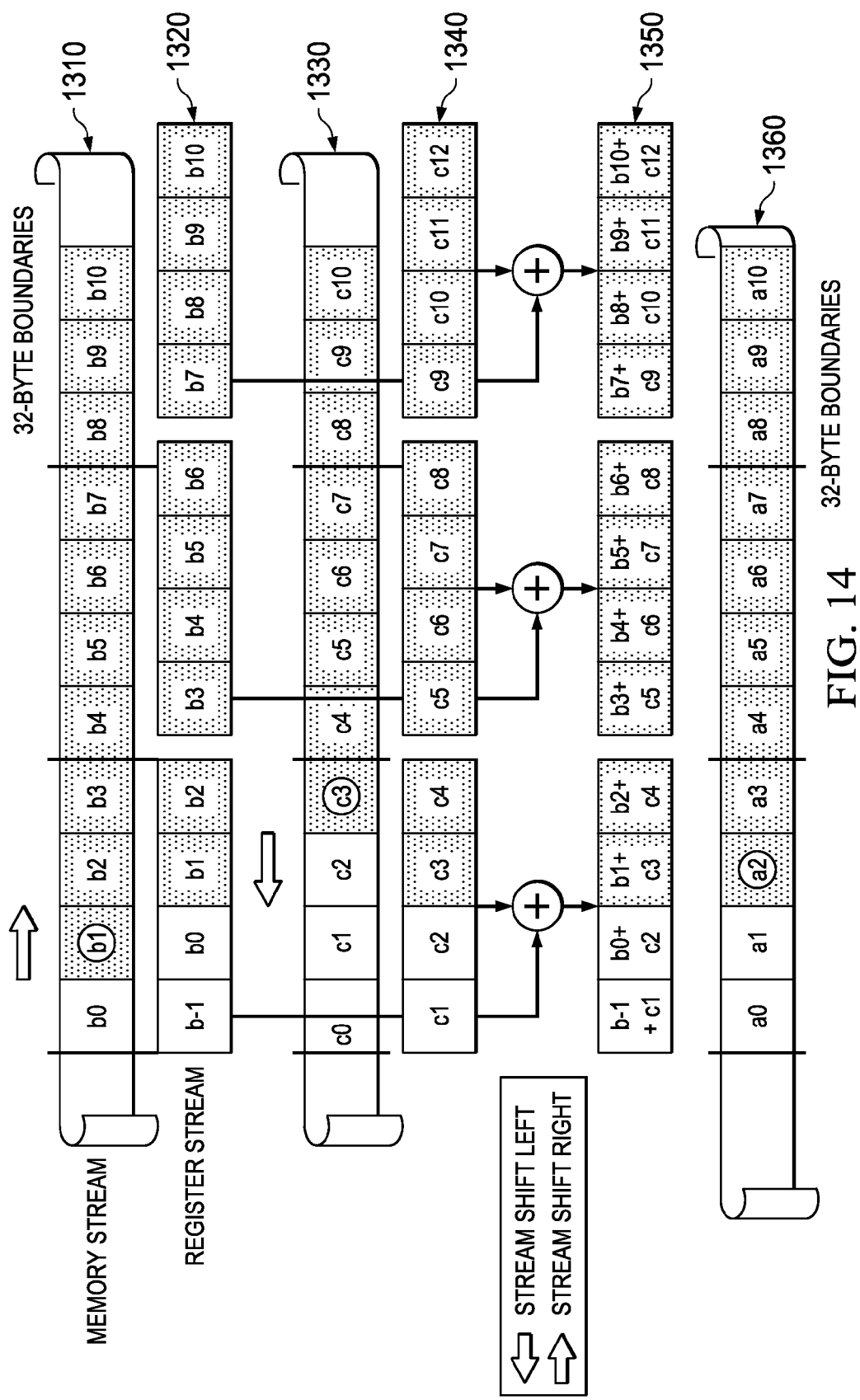
FIG. 14 illustrates an alternative data alignment sequence to that of FIG. 13 for an optimized data alignment in which the amount of data shifting is minimized.

The dynamic data-driven alignment instructions of the illustrative embodiments may seek to minimize the amount of shifting so as to reduce execution cycles. FIG. 14 illustrates an alternative data alignment sequence to that of FIG. 13 for an optimized data alignment in which the amount of data shifting is minimized. As shown in FIG. 14, rather than shifting the memory stream 1310 to the left by 1 vector element, the second memory stream 1330 by 3 vector elements, and the memory stream 1360 by 2 vector elements, the shifting is minimized by taking into consideration the final placement of the results of the vector logic instructions as well as the misalignment of the vectors involve in the vector logic instructions. Thus, with this alternative embodiment, the memory stream 1310 is shifted to the right by one vector element, the memory stream 1330 is shifted to the left by one vector element, and no shifting is necessary to write the results to memory stream 1360. In this way, all of the vectors a[i+2], b[i+1], and c[i+3] are aligned with minimum shifting.

In addition to the above, the FP only SIMD ISA provides instructions for performing matrix multiplication, using the hardware of the quad processing unit (QPU) 320 in FIG. 3, such that the matrix multiplication is performed efficiently with no need for data rearrangement. That is, in some architectures, matrix multiplication may be performed by first rearranging data inside vector registers so as to place the source operand data in the proper position within a vector register.

Figure 15:
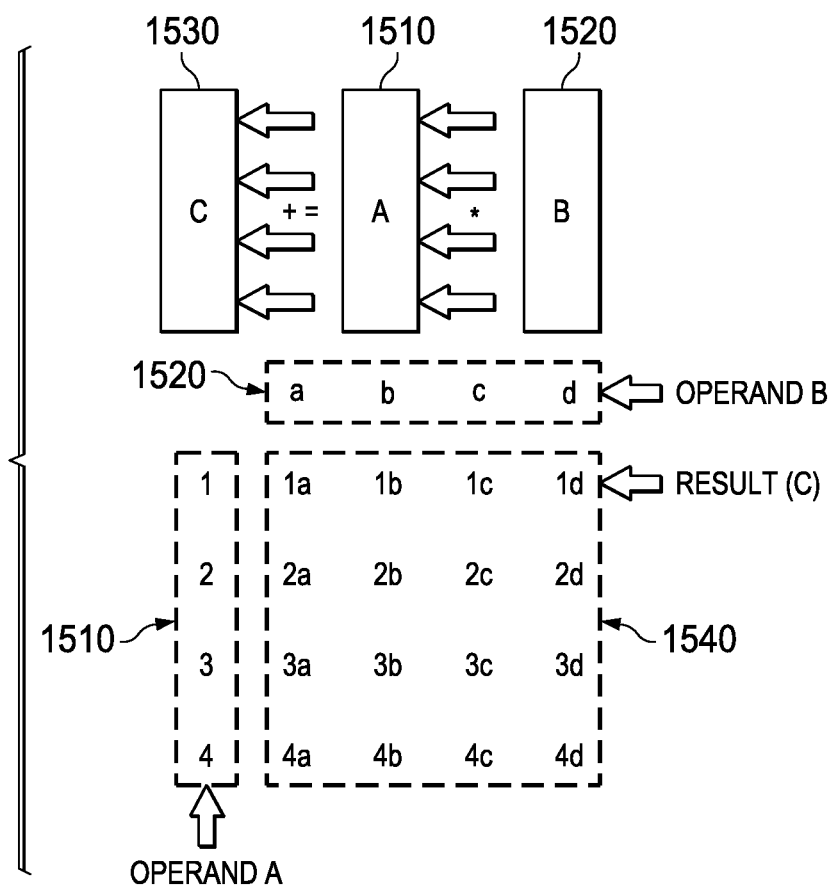
FIG. 15 is an exemplary diagram illustrating an outer product of an innermost loop of matrix multiplication in accordance with one illustrative embodiment.

For example, as described in greater detail hereafter with reference to FIG. 15, in the current state of the art where the data rearranging is done in software inside of the vector register file, first a vector load is generated, loading only one useful data element ("a" in the depicted example). The other data elements are not useful due to the layout of the data, i.e. the data layout is such that a single vector load loads the values "1, 2, 3, 4", meaning that the data is laid out such as that the values 1, 2, 3, 4 are contiguous in memory. This implies that the data a, b, c, d are not contiguous in memory. Thus, a vector load is performed where only one out of 4 elements is useful in order to load the proper "a" value. Then a second operation is issued, i.e. a vector splat operation, which will replicate the first value in a vector register 4 times. It can be readily observed that 4 load and 4 splat instructions are needed in order to perform the multiply operation here. It should be noted that the unused values that are obtained when loading the "a" values could nevertheless be used, provided the algorithm is changed so as to compute 4 matrix DGEMMS. This requires careful layout of the computation and also results in a great increase in the register pressure. As a result, it is generally not a practical solution.

Moreover, a permute operation may be required to realign the result data. The need to utilize such data realignment operations in the hardware of the processor results in additional wire lengths which in turn causes additional heat and power requirements. While a permute operation is being performed, in some implementations of a SIMD architecture, the processor cannot also perform computation operations thereby resulting in larger latencies in the computing of values. This limitation is due to the architecture of the processor being able to start at most one register to register instruction per cycle. Thus, when a permute unit starts a permute instruction in a given processor cycle, it cannot start a QPU computation operation (i.e., an arithmetic instruction), or any other register to register instruction for that matter, in that same cycle. Notably, load and stores can be initiated in parallel.

Because of this limitation in the architecture, it is desirable to be able to minimize the instances where a realignment operation, e.g., a permute operation, needs to be utilized. The mechanisms of the illustrative embodiments provide hardware and associated instructions for pre-conditioning data and operating on the pre-conditioned data so as to perform matrix multiplication without the need to use a data realignment operation and hardware, e.g., the permute instruction and hardware previously described above.

The illustrative embodiments utilize a load and splat instruction and corresponding load/store unit hardware in the QPU 320 that causes loaded data, such as from a data cache, to be replicated in elements of vector registers associated with a plurality of floating point multiply add (FMA) units of the QPU 320 during the load operation such that data need not be moved or replicated in each of the FMA units via one or more separate operations. This load and splat instruction pre-conditions data in vector registers associated with the FMA units by replicating scalar values to occupy each of the elements such that the same scalar value may be multiplied by corresponding elements of a vector value in another vector register. Thus, the illustrative embodiments accomplish efficient computation using only local operands and reducing the penalties associated with obtaining source operands via long wire delays. These benefits are obtained while also eliminating specific instructions to perform this data distribution using explicit splat instructions, thereby also reducing path length, i.e., the number of instructions that must be executed to compute the result.

Many high performance scientific codes have matrix multiplication at their core. In sparse linear algebra applications, the permute instruction, detailed above, will prove useful for making use of SIMD floating point multiply add (FMA) instructions. However, when matrix operations are on larger, dense matrices, the operation of the illustrative embodiments as described hereafter is simpler and expected to achieve a higher percentage of the theoretical peak performance rate of the FP only SIMD architecture. With regard to matrix multiplication operations, in one illustrative embodiment, a matrix multiply operation is performed by loading a scalar value along one dimension of a matrix and replicating that scalar value in a first register using an optimized hardware capability of the illustrative embodiments. A portion of a strided vector, e.g., stride-1 to stride-n where n is greater than 1, is loaded into a second register along another dimension of the matrix and a partial result is computed. The partial result is computed by multiplying the replicated elements of the scalar value register with the elements of the strided vector register and accumulating the result without utilizing separate data reorganization instructions. The matrix multiplication operation is done on a per element basis combining elements of a same vector index position.

To best understand the mechanisms of the illustrative embodiments with regard to matrix multiplication, consider the appropriateness of the FP only SIMD ISA when the input vectors are relatively aligned and the operation is on a large matrix. At the heart of matrix multiplication is a kernel that acts on the register set of the data processing system. In order to address bandwidth and latency considerations on modern computer systems, this kernel, or innermost loop of matrix multiplication, almost always takes the form of an outer product. This is to say that the operation C +=A*B is, through multiple levels of cache blocking, at the ISA centric level, a small outer product. Thus, given a first vector A=(a1, a2, . . . , am) with m elements, and a vector B=(b1, b2, . . . , bn) with n elements, the outer product is a m×n matrix C obtained by multiplying each element a in vector A by each element b in vector B.

FIG. 15 is an exemplary diagram illustrating an outer product of an innermost loop of matrix multiplication in accordance with one illustrative embodiment. As shown in FIG. 15, a first 4 element vector operand A 1510 is multiplied by a second 4 element vector operand B 1520 to generate a resultant vector C 1530. The first operand A 1510 has elements "1, 2, 3, 4" and the second operand B 1520 has elements "a, b, c, d." The matrix 1540 shows the resulting vector C 1530 values obtained by multiplying the vector A 1510 by the vector B 1520.

As shown in FIG. 15, in order to generate the resulting matrix 1540, each element in vector operand A 1510 must be multiplied by each element in vector operand B 1520. This causes a large amount of complexity in the wiring of the processor and movement of data within the processor to handle the cross products of the matrix multiplication shown in FIG. 15. For example, in a processor using multiply add (MAD) units to multiply values and then add their results to a register, wiring must be provided and data must be shifted between multiply add units and multiple registers, using a number of instructions and processor cycles, in order to perform all of the multiplication operations necessary to generate the resulting matrix 1540.

However, it can be seen from FIG. 15 that each row in the matrix 1540 is essentially a 4×1 vector and each column in the matrix 1540 is a 1×4 vector. The illustrative embodiments utilize this observation that rows and columns of the result matrix 1540 make the result matrix 1540 essentially a 4×1×4 matrix to simplify the matrix multiplication operation using the FP only SIMD architecture and corresponding ISA. Using this observation, the mechanisms of the illustrative embodiments utilize a vector load instruction and a vector load and splat operation to perform the matrix multiplication to achieve a partial product of the matrix multiplication, which may then be accumulated with other partial products to generate the resulting matrix 1540. The vector load instruction, e.g., a qvlfdux instruction, loads the four elements of a vector into a register while the vector load and splat operation, e.g., a lfdux instruction, essentially pre-conditions a vector to have the same scalar value in each element of the vector corresponding to an entry in one of the operand vectors, e.g., operand vector A 1510 or operand vector B 1520. The load and splat instruction receives a single value and replicates that value into each of the elements of the target vector such that all of the elements of the target vector have the same value, e.g., a scalar value "1" would be replicated in a 4 element target vector such that the target vector is {1, 1, 1, 1}.

Each column or row of the resulting matrix 1540 may be generated using the mechanisms of the illustrative embodiments by processing a vector load instruction and a load and splat instruction to generate the operand vectors for the partial product. These operand vectors may then be multiplied, such as by using a floating point multiply add (FMA) unit of a processor in the FP only SIMD architecture, to generate the partial product, i.e. by performing straight (element-by-element) multiplication of each element in a first operand vector by a correspondingly indexed element in a second operand vector, to generate a correspondingly indexed element in the partial result vector register. For example, a first element of a first operand vector is multiplied by a first element of a second operand vector and the resulting value is added to a value stored in a first element of the partial result vector register by a FMA unit. This process may be repeated for each element of the original operand vectors such that all rows and columns of the resulting matrix 1540 are generated. Thus, there is a single vector load and single load and splat for each row or column in the resulting matrix 1540.

Figure 16:
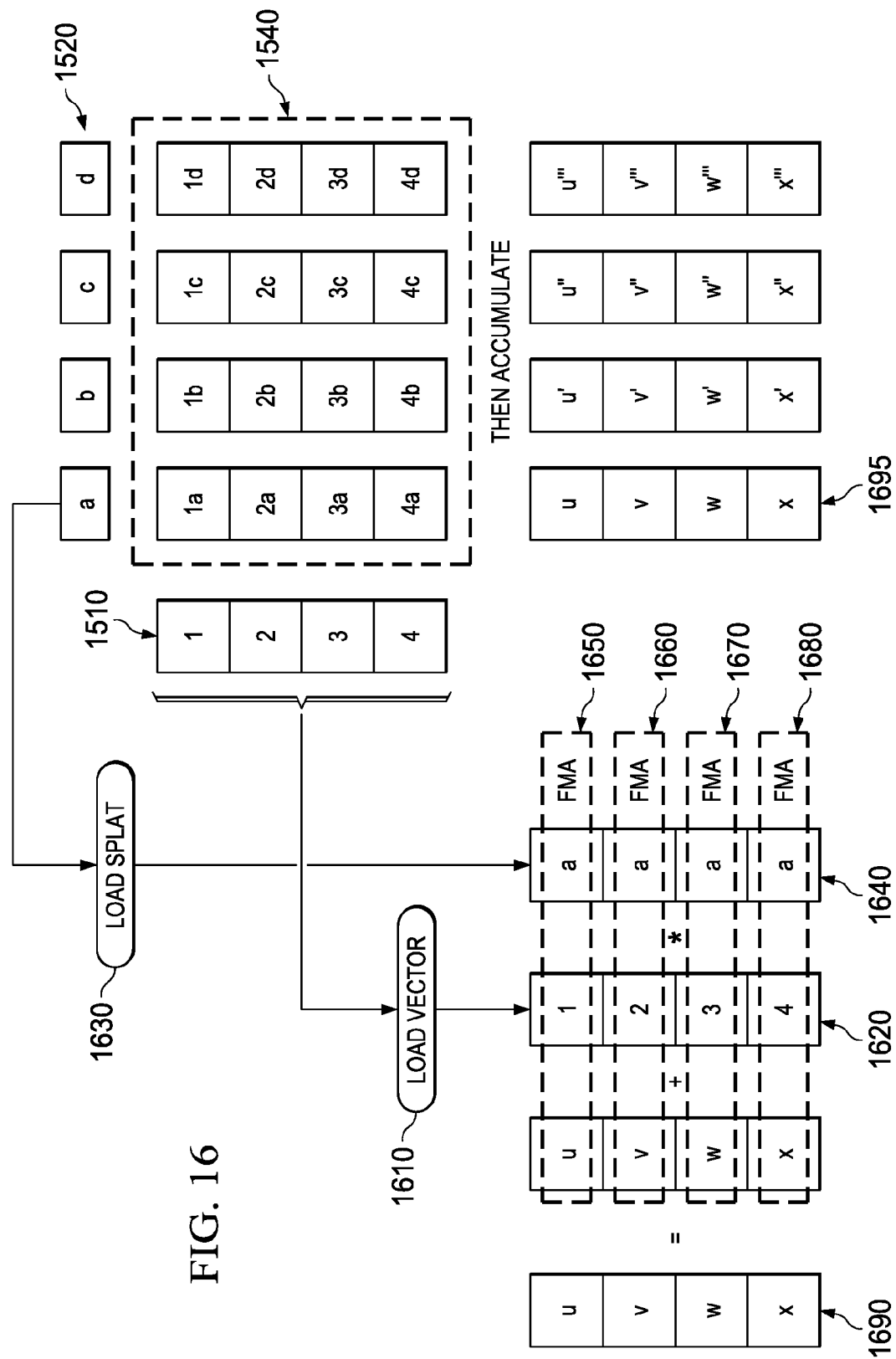
FIG. 16 illustrates a first multiplication operation for generating a first partial product of the resulting matrix 1540 in FIG. 15 in accordance with one illustrative embodiment.

FIG. 16 illustrates a first multiplication operation for generating a first partial product of the resulting matrix 1540 in FIG. 15 in accordance with one illustrative embodiment. As shown in FIG. 16, in this first multiplication operation for multiplying the input operand A 1510 with the input operand B 1520, a vector load instruction 1610, e.g., qvlfdux instruction, is used to load the vector corresponding to input operand A 1510 into a first vector register 1620. Thus, each element in the input operand A 1510 is loaded into a correspondingly index element in the vector register 1620 such that the vector register 1620 stores the value, in this example, of "1, 2, 3, 4." A second load instruction, i.e. a load and splat instruction 1630, is used to load one value from one element of the second input operand, i.e. input operand B 1520, into a second vector register 1640. The second load instruction 1630 is a load and splat instruction which replicates the single value from the input operand B 1520 into all of the elements of the second vector register 1640. Thus, in this first multiply operation, the first value "a" of the input operand B 1520 is loaded and replicated into all four slots or elements of the second vector register 1640.

In the FP only SIMD architecture of the illustrative embodiments, a floating point multiply add (FMA) unit 1650-1680 of the processor operates on correspondingly indexed elements, or slots, of the vector registers 1620 and 1640 and adds the result to a correspondingly indexed element or slot of a partial result vector register 1690. Thus, for example, a first FMA unit 1650 multiplies a first element of the vector register 1620 with the first element of vector register 1640 and adds the result to a first element of the partial result vector register 1690 to obtain a value of "1a." Similarly, a second FMA unit 1660 multiples a second element of the vector register 1620 with the second element of the vector register 1640 and adds the result to the second element of the partial result vector register 1690 to obtain a value of "2a." This process is repeated for each of the other elements in the vector registers 1620 and 1640 to obtain a first column of values in the resulting matrix 1540. This first column of the resulting matrix 1540 is stored in a first result vector register 1695 as elements "u, v, w, x" of the resulting matrix 1540.

It should be noted from FIG. 16 that there are no cross multiplication operations necessary to perform the partial result multiplication in the illustrative embodiments. Thus, the wiring complexity, length, and the like, are greatly reduced from that of known architectures which must implement wiring for performing such cross-multiplication operations.

Figure 17:
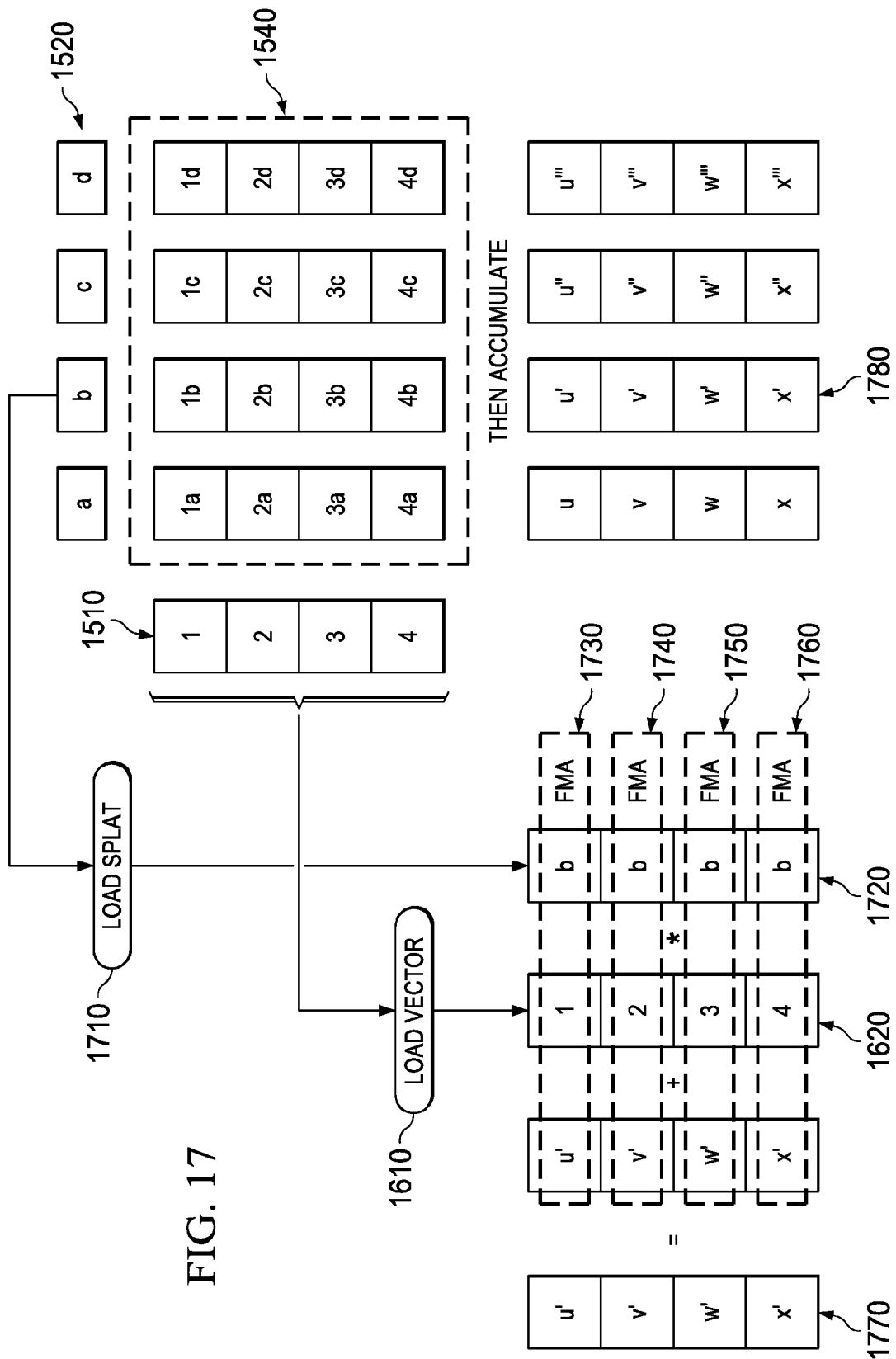
FIG. 17 illustrates a second multiplication operation for generating a second partial product of the resulting matrix 1540 in FIG. 15 in accordance with one illustrative embodiment.

FIG. 17 illustrates a second multiplication operation for generating a second partial product of the resulting matrix 1540 in FIG. 15 in accordance with one illustrative embodiment. As shown in FIG. 17, in this second multiplication operation for multiplying the input operand A 1510 with the input operand B 1520, the vector load instruction 1610 may be used again to load the vector corresponding to input operand A 1510 into a first vector register 1620. Alternatively, since the vector corresponding to input operand A 1510 has already been loaded in the first multiplication operation, the need to reload this vector again may be eliminated for the second through fourth multiplication operations (since in this example, the number of elements in the vectors supported by the FP only SIMD architecture is 4).

Another load and splat instruction 1710, is used to load one value from one element of the second input operand, i.e. input operand B 1520, into the second vector register 1720. The load and splat instruction 1710 again replicates the single value from the input operand B 1520 into all of the elements of the second vector register 1720. Thus, in this second multiply operation, the second value "b" of the input operand B 1520 is loaded and replicated into all four slots or elements of the second vector register 1720.

Once the necessary data is loaded into the vector registers 1620 and 1720, a floating point multiply add (FMA) unit 1730-1760 of the processor operates on correspondingly indexed elements, or slots, of the vector registers 1620 and 1720 and adds the result to a correspondingly indexed element or slot of a partial result vector register 1770. Thus, for example, a first FMA unit 1730 multiplies a first element of the vector register 1620 with the first element of vector register 1720 and adds the result to a first element of the partial result vector register 1770 to obtain a value of "1b." Similarly, a second FMA unit 1740 multiples a second element of the vector register 1620 with the second element of the vector register 1720 and adds the result to the second element of the partial result vector register 1770 to obtain a value of "2b." This process is repeated for each of the other elements in the vector registers 1620 and 1720 to obtain a first column of values in the resulting matrix 1540 which is stored in another result vector register 1780 as vector {u', v', w', x'}. Again, there are no cross multiplication operations necessary to perform the partial result multiplication.

Similar operations may be performed for the third and fourth elements in the original input operand B 1520 to generate vectors {u", v", w", x"} and {u'", v'", x'"} in the third and fourth columns of the resulting matrix 1540. These vectors may be accumulated to generate the resulting matrix C representing the outer product. The use of the load and splat operation optimizes "element times vector" type operations, such as a matrix multiplication operation, and avoids having to perform data realignment operations, such as permute operations, since it can be determined a priori how matrix C is aligned and copy operand A so that it can be aligned analogously (copy/precondition the A matrix to be conformal to matrix C).

Moreover, the use of the load and splat operation offloads the pressure from the arithmetic execution unit issue pipeline. That is, rather than requiring a splat operation, which is separately executed as a register to register instruction, the load instruction performs the splat function. As such, because this eliminates the need to issue a separate register to register operation, the issue slot is made available for other instructions. Thus, the issue pressure on the register to register issue slot is reduced, i.e. less instructions to issue means less pressure on that port.

The load and splat operation further reduces the wire length necessary to operate on the vectors since data is replicated straight, or directly, from the load unit in the quad processing unit (QPU) to the floating point multiply add (FMA) units of the QPU rather than having the data placed in one FMA and then loaded from that FMA to the other FMA units of the QPU. Moreover, since the load and splat operation helps to avoid having to use a data realignment operation, such as a permute operation, which would cause processing cycles to be used to do realignment rather than compute operations, the frequency or speed of the QPU is increased.

Figure 18:
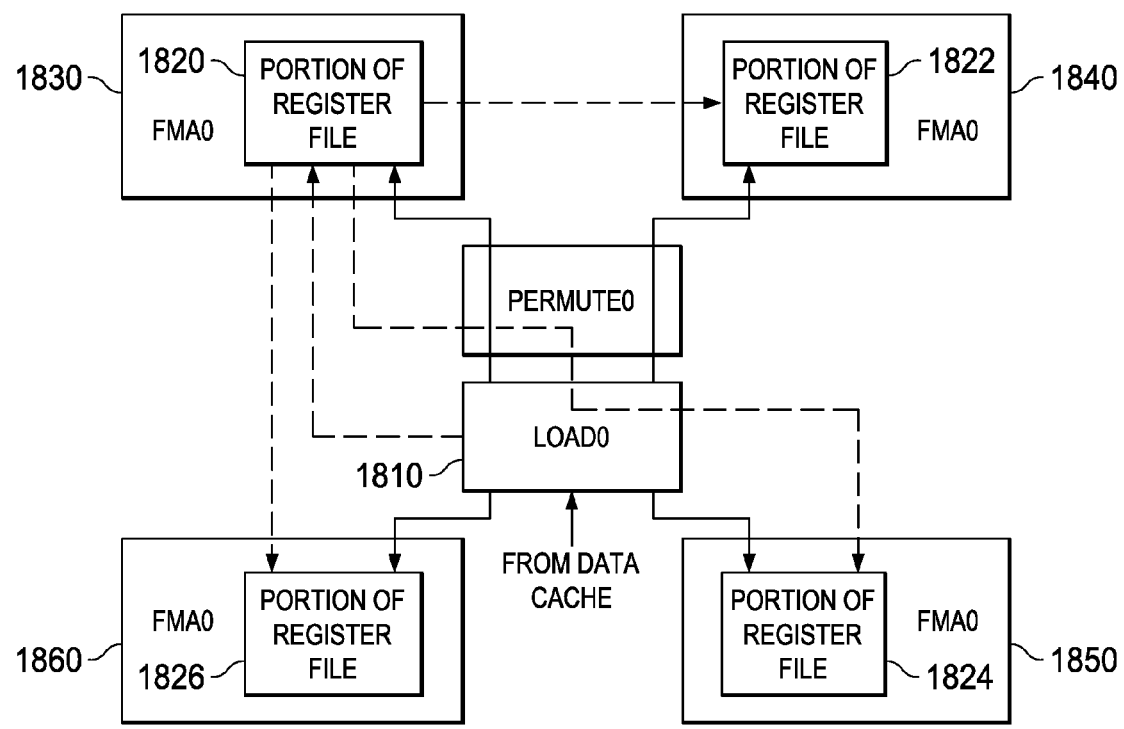
FIG. 18 is an example block diagram of the load unit and floating point multiply add (FMA) units of a QPU in accordance with one illustrative embodiment.

FIG. 18 is an example block diagram of the load unit and floating point multiply add (FMA) units of a QPU in accordance with one illustrative embodiment. As shown in FIG. 18, data may be loaded from a data cache via the load unit 1810 and stored in one or more of the portions of the register file 1820-1826 associated with respective ones of the floating point multiply add (FMA) units 1830-1860. For example, with a load and splat operation, one of the benefits is that the data value is loaded by the load unit 1810 and directly replicated to each of the register file portions 1820-1826 of the FMA units 1830-1860.

This replication is shown in FIG. 18 as the solid arrow lines pointing from the load unit 1810 to the FMA units 1830-1860. This results in considerably less wire length, and thus power and heat, than would otherwise be required without the load and splat capability which is shown in FIG. 18 by the dashed arrow lines. As shown in FIG. 18, without the load and splat capability, the data would need to be loaded into one of the FMA units, e.g., FMA unit 1830, and then sent to each of the other FMA units 1840-1860 using additional operations. While the wire distance between FMA unit 1830 and each of FMA units 1840 and 1860 is about the same as the distance from the load unit 1810 to these FMA units 1840 and 1860 in the depicted example, the wire length to reach FMA unit 1850 from FMA unit 1830 is twice the distance. Thus, the load and splat operation, in addition to reducing the number of processor cycles required to get the data to the FMA units 1830-1860 for computation, the load and splat operation reduces wire length, power consumption, and heat generation.

Figure 19:
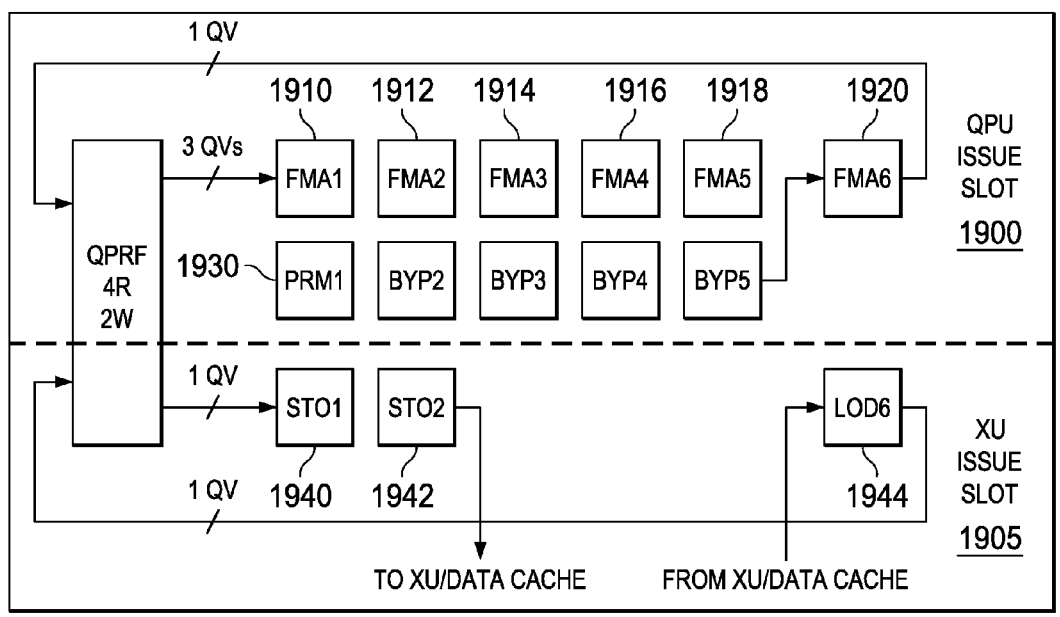
FIG. 19 is an example diagram of a QPU issue slot pipeline and arithmetic execution unit slot pipeline of a QPU in accordance with one illustrative embodiment.

FIG. 19 is an example diagram of a QPU issue slot pipeline and arithmetic execution unit slot pipeline of a QPU in accordance with one illustrative embodiment. Each pipeline may operate on a single instruction per cycle such that two instructions are processed by the QPU per cycle. As shown in FIG. 19, the floating point multiply add (FMA) units 1910-1920 are part of the QPU issue slot pipeline 1900 along with the permute unit 1930. The execution unit slot pipeline 1905 of the QPU performs store and load operations to an arithmetic execution unit (XU) and/or data cache via the store and load units 1940-1944.

Thus, there is a 2-issue capability with the mechanisms of the illustrative embodiments and thus, best performance is obtained if there are about the same number of load/store and QPU instructions executed in the pipelines 1900 and 1905. To increase the likelihood of having about the same number of such instructions, data arrangement instructions are pushed into the issue slot pipeline 1900, so that there are more load/store operations and fewer permutes which go into the QPU issue slot pipeline 1900, thereby eating issue cycles from the FMA units 1910-1920 and increasing total execution length.

The above illustrative embodiments provide mechanisms for performing matrix multiplication operations with data pre-conditioning in a high performance computing architecture, such as a floating point only single instruction multiple data (FP only SIMD) computing system. The matrix multiplication operations operate on real scalar/floating point values stored in slots of vector registers. However, there are many applications, such as scientific applications, that utilize complex values, i.e. values having both real and imaginary parts. In further illustrative embodiments, the present invention provides mechanisms for performing complex matrix multiplications using vector registers storing complex values. These further illustrative embodiments build off of the mechanisms described above to apply the mechanisms described above to complex values. Thus, these further illustrative embodiments also provide similar benefits as noted above but with regard to complex matrix multiplication operations.

Before explaining the manner by which the complex matrix multiplication mechanisms of the illustrative embodiment operate, it is first important to understand the manner by which complex numbers are stored in a vector register of a SIMD computing system. As noted above, vector registers, in an example SIMD architecture, are comprised of a plurality of "slots" into which a data value may be stored. In the example SIMD architecture, each vector register has four slots which, as a result, can store four real values. With complex values, each complex value is comprised of a real part and an imaginary part. Thus, each complex value is essentially a combination of two sub-values. In a SIMD architecture, each sub-value occupies one of the slots of the vector register. Thus, in a four slot vector register, a first slot of the vector register may store a real part (or sub-value) of a first complex value, a second slot of the vector register may store an imaginary part (or sub-value) of the first complex value, a third slot of the vector register may store the real part of a second complex value, and a fourth slot of the vector register may store the imaginary part of the second complex value, for example. Alternatively, a single complex value may occupy the first two slots or last two slots with the other slots being populated with two other real values.

With regard to the actual complex matrix multiplication operations, in one illustrative embodiment, a complex matrix multiply operation is performed by first providing a first operand vector that is comprised of a portion of a strided vector, e.g., stride-1 to stride-n where n is greater than 1, that is loaded into a first register along one dimension of the matrix. The strided vector values are stored as complex values, i.e. as both real and imaginary parts. A second operand vector along another dimension of the matrix is also provided. The second operand vector also is stored as having the real and imaginary parts of at least one complex value provided in two slots of the second operand vector register. In one illustrative embodiment, the first and second operand vector registers each store two complex vector values taking up four slots of the vector register.

The first operand vector is loaded using a standard vector load instruction seeing as the real and imaginary parts of the operand vector values are already separated into vector elements within the operand vector register. A complex load and splat operation is performed on a portion of the second operand vector to load both the real and imaginary parts of a single complex vector value in the second operand vector and splats (replicates) the real and imaginary parts to populate all of the slots of a vector register used to perform multiplication to generate a partial result. The partial result is computed by multiplying the replicated elements of the second operand vector register with the elements of the strided vector register. Such multiplication further involves a cross-multiplication operation and sign change operation, as described hereafter. The multiplication is performed, and the result is accumulated, without utilizing separate data reorganization instructions.

Figure 20:
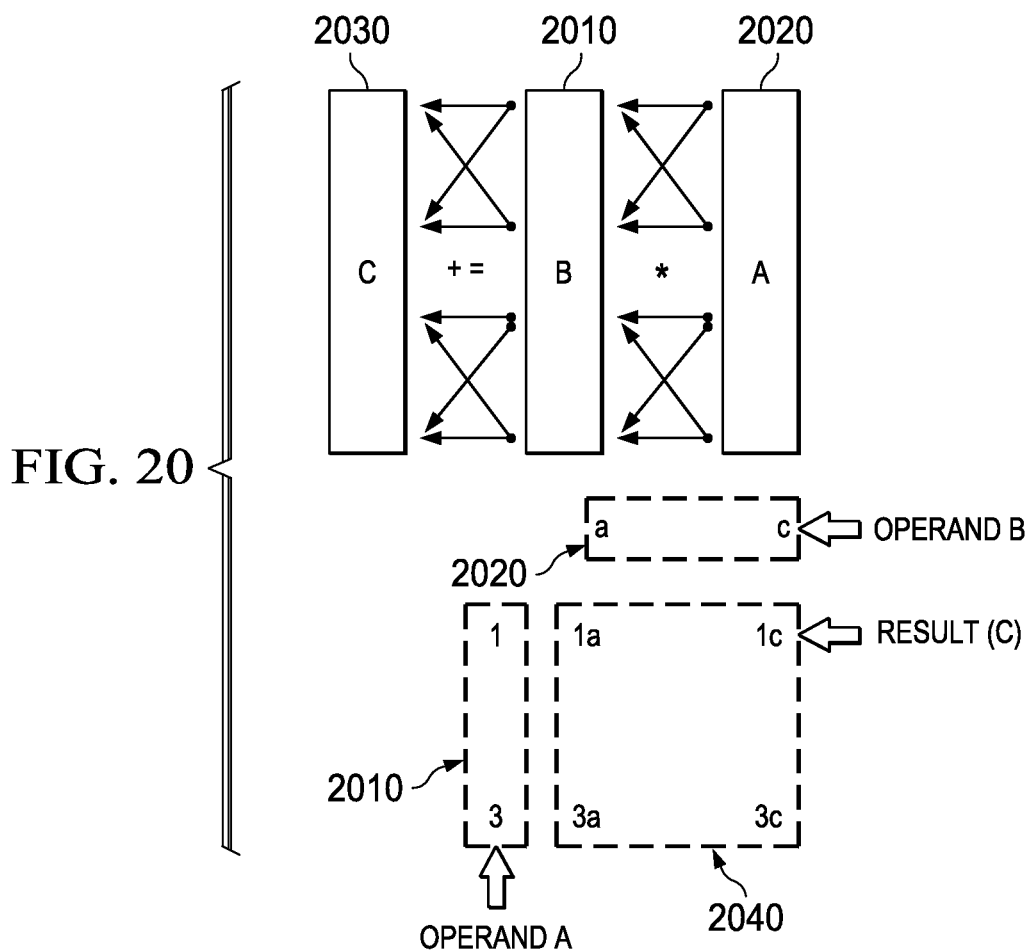
FIG. 20 is an exemplary diagram illustrating an outer product of an innermost loop of a complex matrix multiplication in accordance with one illustrative embodiment.

FIG. 20 is an exemplary diagram illustrating an outer product of an innermost loop of a complex matrix multiplication in accordance with one illustrative embodiment. As shown in FIG. 20, a first vector operand A 2010 is multiplied by a second vector operand B 2020 to generate a resultant vector C 2030. The first operand A 2010 has elements "1, 3" (a strided vector having stride 2) and the second operand B 2020 has elements "a, c." The matrix 2040 shows the resulting vector C 2030 values obtained by multiplying the vector A 2010 by the vector B 2020. However, this multiplication is not a straight matrix multiplication such as that described previously above due to the fact that, while these operand values are shown as individual scalar values, in actuality, they are complex values having both real (r) and imaginary (i) parts. Thus, rather than having a vector comprised of only two elements "1, 3" or "a, c", the actual vectors comprise four elements to represent both the real and imaginary parts of each vector value, i.e. "1(r), 1(i), 3(r), 3(i)" and "a(r), a(i), b(r), b(i)." As a result, a complex matrix multiplication is required that performs cross multiplication of the real and imaginary parts of each of the complex vector values in a manner described hereafter.

It can be seen from FIG. 20 that each row in the matrix 2040 is essentially a 2×1 vector and each column in the matrix 2040 is a 1×4 vector. The illustrative embodiments utilize a standard vector load instruction and a complex vector load and splat operation to perform the complex matrix multiplication to achieve a partial product of the complex matrix multiplication, which may then be accumulated with other partial products to generate the resulting matrix 2040. The standard vector load instruction, e.g., a qvlfdux instruction, loads the real and imaginary parts of two operand vector elements of a vector into a register while the complex vector load and splat operation, e.g., a qvlfcdux instruction, essentially pre-conditions a vector to have the same real and imaginary parts of a single input operand value in each pairs of elements of the vector, e.g., a(r) and a(i) of operand vector A 2010 or b(r) and b(i) of operand vector A 2010. The complex vector load and splat instruction receives a single complex value, i.e. both its real and imaginary parts, and replicates that complex value in pairs of elements of the target vector such that the pairs of elements of the target vector have the same complex value, e.g., a complex value "a(r)+a(i)" would be replicated in a 4 element target vector such that the target vector is {a(r), a(i), a(r), a(i)}.

Each column or row of the resulting matrix 2040 may be generated using the mechanisms of the illustrative embodiments by processing a vector load instruction, a complex vector load and splat instruction, a complex cross multiply add instruction (described hereafter), to generate the operand vectors for the partial product. The complex cross multiply add instruction can be executed, for example, by using a floating point multiply add (FMA) unit of a processor in the FP only SIMD architecture, to generate the partial product, i.e. by performing (element-by-element) cross multiplication of each element in a first operand vector by a correspondingly indexed element in a second operand vector, to generate a correspondingly indexed element in the partial result vector register.

FIGS. 21-24 illustrate the steps for performing a complex matrix multiplication in accordance with one illustrative embodiment. It should be appreciated that the complex matrix multiplication operation outlined in FIGS. 21-24 may be performed, for example, in a floating point multiply add (FMA) unit of a processor, such as a FMA unit of the QPU 320 shown in FIG. 3.

Figure 21:
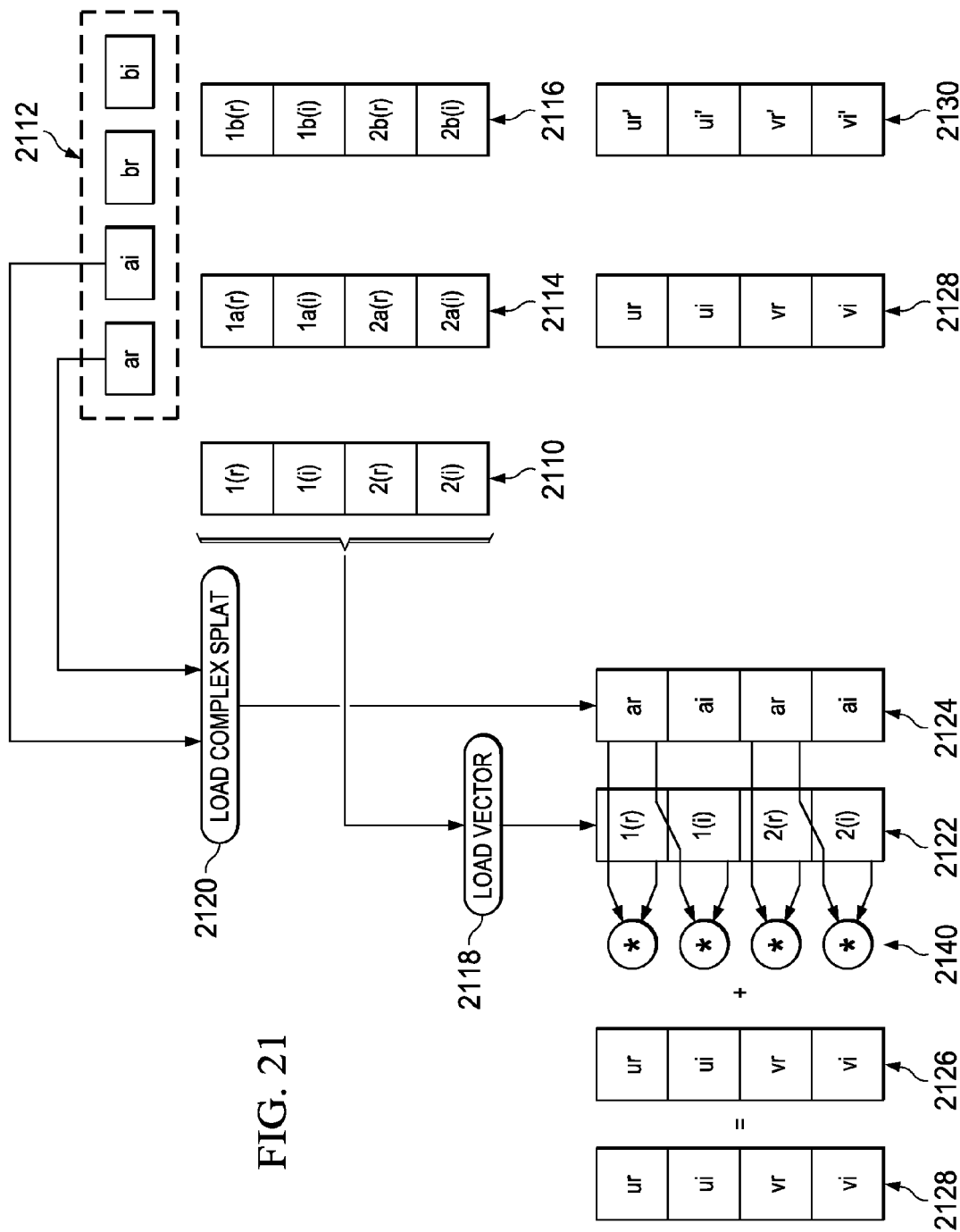
FIGS. 21-24 illustrate the steps for performing a complex matrix multiplication in accordance with one illustrative embodiment.

As shown in FIG. 21, in a first step of the complex multiply add operation, i.e. a qfxmadd operation, a first operand vector 2110 is loaded into a first vector register 2122 using a standard vector load instruction 2118 in a similar manner as the vector load instruction in the above illustrative embodiments. First and second elements of a second operand vector 2112 are loaded and replicated to a second vector register 2124 using a load complex splat operation 2120. As shown in FIG. 21, the vector load instruction 2118 loads the real and imaginary parts of two vector values 1(r), 1(i) and 2(r), 2(i) by simply loading these values straight from the operand vector register 2112. The load complex splat 2120 loads a first value a(r), corresponding to the real part of a first operand value "a," into a first element of the vector register 2124 and replicates that real part a(r) to the third element of the vector register 2124. Similarly, the load complex splat 2120 loads a second value a(i), corresponding to the imaginary part of the first operand value "a," into a second element of the vector register 2124 and replicates that imaginary part a(i) to the fourth element of the vector register 2124. Having loaded the operand values into the vector registers 2122 and 2124, the complex multiply add operation may then be performed on the values in these registers 2122 and 2124 to generate a partial product with regard to the first vector value "a" of the first operand and the vector values "1" and "2" of the second operand.

To perform the complex multiply add operation, a first element "1(r)" of the first operand vector register 2122, corresponding to a real part of the first vector value "1", is multiplied by the first element "a(r)" of the second operand vector 2124, corresponding to the real part of the second vector value "a", and the resulting value is added to a value stored in a first element of the partial result vector register 2126 to generate updated partial result vector register 2128. Moreover, since this is a complex vector multiplication, a cross multiplication operation is performed by multiplying the first element "a(r)" of the second operand vector 2124 (i.e. the real part of the second vector value) with a second element "1(i)" of the first operand vector 2110, which represents the imaginary part of the first vector value "1" in the register 2110. Similarly, multiplications of the third element "a(r)" of the second operand vector 2124 (representing the real part of the second vector value) with the third and fourth elements "2(r)" and "2(i)" of the first operand vector are performed. Thus, as a result of the above operations, a partial results vector register 2126 is updated to have the partial complex results of the multiplication of the real part of the vector value "a" with the vector values "1" and "2."

Figure 22:
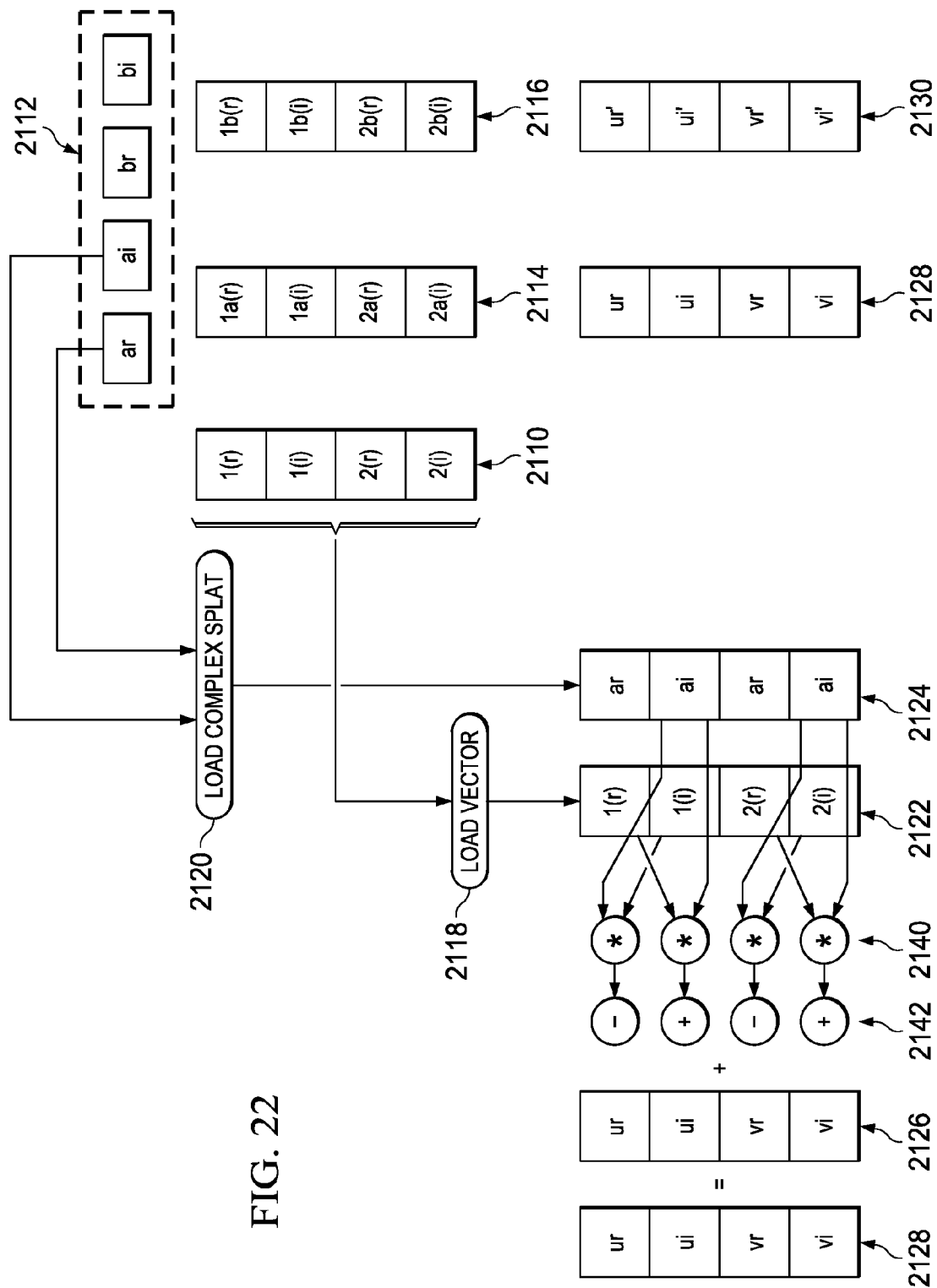

FIG. 22 shows the second step of the complex multiply add operation in which the second and third elements of the vector register 2124, corresponding to the imaginary part of the vector value "a", i.e. a(i), are multiplied with the imaginary and real parts of the vector values "1" and "2" in the vector register 2122. For example, the second element of vector register 2124, i.e. a(i), is multiplied times the first and second elements 1(r) and 1(i) and the fourth element of vector register 2124, i.e. a(i), is multiplied with the third and fourth elements of vector register 2122, i.e. 2(r) and 2(i). Notably, with the multiplication of the imaginary part of the value "a", a sign change operation 2142 is performed on the results of the multiplications such that the result of the multiplication of a(i)*1(i) has a negative sign change, the result of the multiplication of a(i)*1(r) has a positive sign change, and similar sign changes are made for the results of the multiplications of a(i)*2(i) and a(i)*2(r). The sign changed values are then added to the values calculated in the first step of the complex multiply add operation shown in FIG. 21 to generate an updated partial product that represents the multiplication of the vector value "a" (i.e. a(r)+a(i)) with the vector values "1" and "2" (i.e. 1(r)+1(i) and 2(r)+2(i)).

Figure 23:
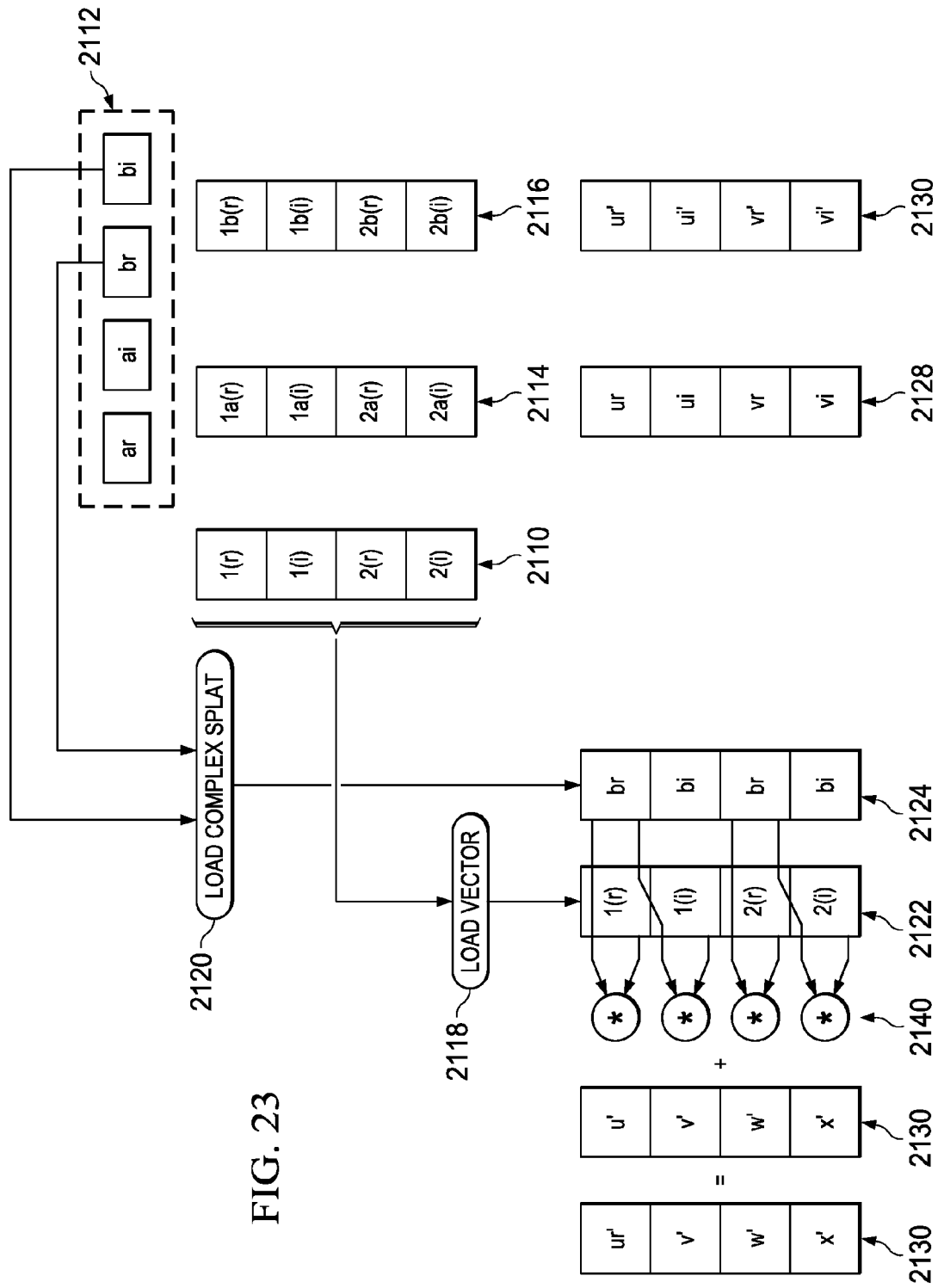
Figure 24:
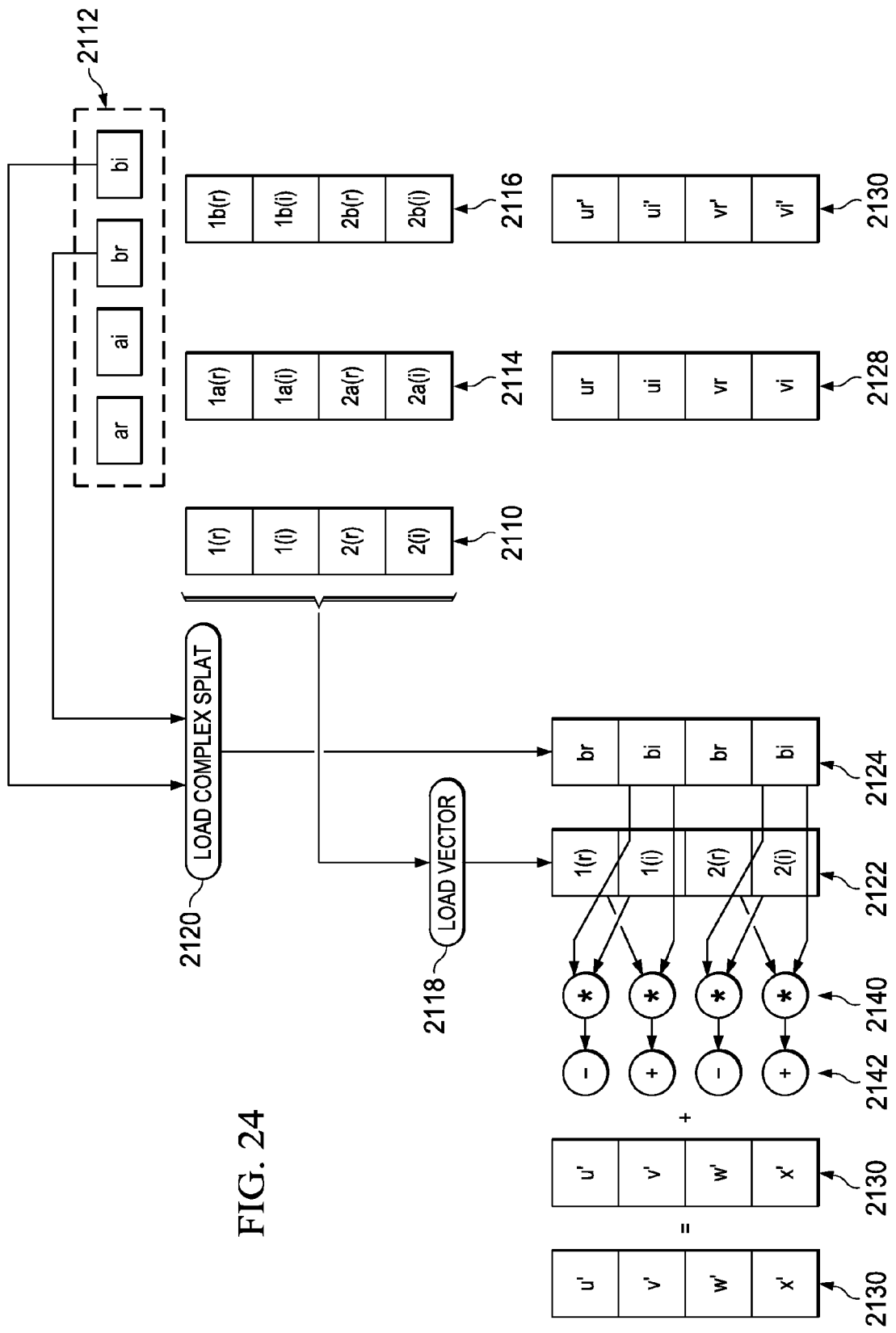

FIGS. 23 and 24 illustrate that the same set of operations that were performed for the multiplication of the vector value "a" with the vector values "1" and "2" may also be performed for the multiplication of the vector value "b" (i.e. b(r)+b(i)) with the vector values "1" and "2" (i.e. 1(r)+1(i) and 2(r)+2(i)). The result is a second partial product that is stored in vector register 2130. These vectors may be accumulated to generate the resulting matrix C representing the outer product of the complex matrix multiplication.

FIG. 25 illustrates examples of a vector load instruction for loading complex values into vector registers in accordance with one illustrative embodiment. This vector load instruction may be used to load the values into the vector registers 2110 and 2112. FIG. 26 illustrates examples of a cross-multiply-add instructions for performing the actual cross multiplication operations between elements of the vectors 2122 and 2124, such as shown in FIGS. 21-24, in accordance with one illustrative embodiment. The operations performed by these instructions have been described in detail above with examples provided. FIGS. 25 and 26 are provided as examples of the way in which the instructions are organized in the instruction set architecture to cause such operations to be performed.

The mechanisms described above for performing complex matrix multiplication operations may further be used to enhance scalar operations where scalar values are replicated in a vector register. In a further illustrative embodiment, a storage format for data in vector registers is provided to facilitate efficient computing with scalar constants in a SIMD vector architecture where a scalar value is replicated in a vector register. Moreover, the further illustrative embodiment provides a new instruction to precondition in-memory values and generate this optimized representation with no additional overhead. Furthermore, the illustrative embodiment provides an algorithm for exploiting this storage format and new instruction for generating the optimized representation.

As described above, vector registers, in an example SIMD architecture, are comprised of a plurality of slots into which a data value may be stored. In the example SIMD architecture, each vector register has four slots which, as a result, can store four real values. With the complex matrix multiplication mechanisms described above, each complex value is comprised of a two sub-values, i.e. a real part and an imaginary part, where each sub-value occupies one of the slots of the SIMD vector register. Thus, in a four slot vector register, a first slot of the vector register may store a real part (or sub-value) of a first complex value, a second slot of the vector register may store an imaginary part (or sub-value) of the first complex value, a third slot of the vector register may store the real part of a second complex value, and a fourth slot of the vector register may store the imaginary part of the second complex value, for example. Alternatively, a single complex value may occupy the first two slots or last two slots with the other slots being populated with two other real values.

This format of sub-values may be used to enhance scalar operations by using pairs of scalar values, where each scalar value populates one of the sub-value slots in the vector register, rather than individual scalar values replicated to all vector register slots, such as described previously with regard to FIGS. 15-17, or real and imaginary parts of a complex value, as described above with regard to FIGS. 20-24. That is, with the mechanisms of this additional illustrative embodiment, the load and splat operations described above are performed on pairs of scalar values such that a pair of scalar values may be loaded into a first two slots of a vector register and the pair may be splatted to the second two slots of the vector register. Matrix multiplication operations may then be performed based on this "load pair and splat" format to generate a partial product for the matrix multiplication in a similar manner as described above with regard to the complex matrix multiplication operations, as will be described in greater detail hereafter. In this way, operations may be performed on a pair of scalar values at a same time rather than having to perform operations on individual scalar values replicated across all of the vector slots, thereby increasing the performance of scalar matrix multiplication operations.

With regard to the actual pair-wise scalar matrix multiplication operations, in one illustrative embodiment, the pair-wise scalar matrix multiply operation is performed by first providing a first operand vector that is comprised of a portion of a strided vector, e.g., stride-1 to stride-n where n is greater than 1, that is loaded into a first register along one dimension of the matrix. A second operand vector along another dimension of the matrix is also provided. The second operand vector stores two or more scalar values in vector slots of the second operand vector. The first and second operands are preferably stored in vector registers, such as the SIMD vector registers previously described above.

The first operand vector is loaded using a standard vector load instruction into a first vector register. A "load pair and splat" operation is performed on a portion of the second operand vector to load a first pair of scalar values from the second operand vector and splats (replicates) this pair of scalar values to populate all of the slots of a vector register used to perform multiplication to generate a partial result. The partial result is computed by multiplying the replicated elements of the second operand vector register with the elements of the strided vector register. Such multiplication further involves a cross-multiplication operation. Contrary to the complex matrix multiplication mechanisms above, however, with a pair-wise scalar multiplication operation, no sign change operation is required since no imaginary parts of complex values are involved in the pair-wise scalar matrix multiplication operation. This process may then be repeated for subsequent pairs of scalar values in the second operand vector. The multiplications are performed, and the results are accumulated, without utilizing separate data reorganization instructions.

Referring again to FIG. 15, a first 4 element vector operand A 1510 is multiplied by a second 4 element vector operand B 1520 to generate a resultant vector C 1530. The first operand A 1510 has elements "1, 2, 3, 4" and the second operand B 1520 has elements "a, b, c, d." The matrix 1540 shows the resulting vector C 1530 values obtained by multiplying the vector A 1510 by the vector B 1520.

As shown in FIG. 15, in order to generate the resulting matrix 1540, each element in vector operand A 1510 must be multiplied by each element in vector operand B 1520. As described above, with a first illustrative embodiment, this multiplication is achieved by utilizing a vector load instruction and a vector load for the first operand A 1510 and a vector load and splat operation for each element of the second operand B 1520 to generate partial products of the matrix multiplication which may then be accumulated with each other to generate the resulting matrix 1540. The vector load instruction, e.g., a qvlfdux instruction, loads the four elements of a vector into a register while the vector load and splat operation, e.g., a lfdux instruction, essentially preconditions a vector to have the same scalar value in each element of the vector corresponding to an entry in one of the operand vectors, e.g., operand vector A 1510 or operand vector B 1520. The load and splat instruction receives a single value and replicates that value into each of the elements of the target vector such that all of the elements of the target vector have the same value, e.g., a scalar value "1" would be replicated in a 4 element target vector such that the target vector is {1, 1, 1, 1}.

To the contrary, in an additional illustrative embodiment, rather than having to use a load and splat operation for each element of the second operand B 1520, a pair-wise load and splat operation, referred to as the "load pair and splat" operation, is performed to load two of the scalar elements form the second operand B 1520 and splat them across the vector register such that two copies of the pair are provided in the vector register (assuming a four slot vector register). The load pair and splat operation operates in a similar manner to the load complex and splat operation described above, but rather than the first element of the load complex and splat operation being a real part of a value and the second element being an imaginary part of the value, the two values in the pair of values that are loaded and splatted are two separate scalar values in the second operand B 1520 vector.

The load pair and splat instruction receives a pair of scalar values and replicates the pair of values into each of the elements of the target vector such that the elements of the target vector have the same pair of values duplicated, e.g., a pair of scalar values "1" and "2" would be replicated in a 4 element target vector such that the target vector is {1, 2, 1, 2}. A cross multiplication operation may be used with these pairs of values, such as previously described above with regard to the complex matrix multiplication, to generate the partial products which may then be accumulated, as will be described hereafter. As a result, with the load pair and splat instruction/operation, rather than having to use four load and splat operations, one for each element of the second operand B 1520 vector such as described above with regard to FIGS. 15-17, only two load pair and splat operations are needed to generate the same partial products and accumulate them to generate the result C 1540.

As with the complex matrix multiplication described previously, the accumulation of the partial products in the load pair and splat operation based matrix multiplication may be performed without a separate data reorganization operation. Moreover, the load pair and splat operation may replicate elements directly from a load unit of the data processing system.

FIGS. 27-30 illustrate the steps for performing a matrix multiplication operation using a load pair and splat instruction in accordance with one illustrative embodiment. It should be appreciated that the matrix multiplication operation outlined in FIGS. 27-30 may be performed, for example, in a floating point multiply add (FMA) unit of a processor, such as a FMA unit of the QPU 320 shown in FIG. 3.

Figure 27:
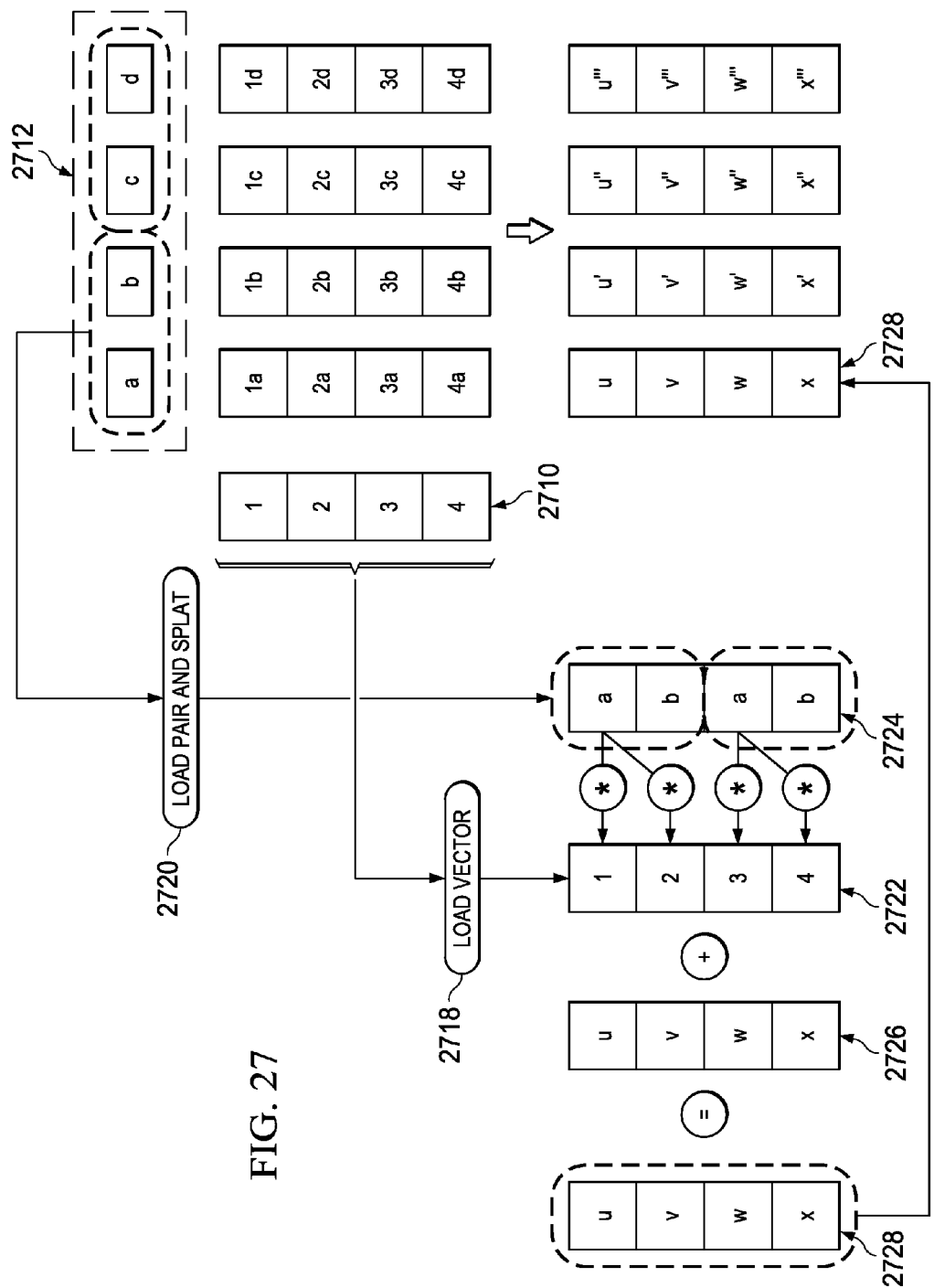
FIGS. 27-30 illustrate steps for performing a matrix multiplication operation using a load pair and splat instruction in accordance with one illustrative embodiment.

As shown in FIG. 27, in a first step of the multiply add operation, i.e. a qvfxmadd operation, a first operand vector 2710 is loaded into a first vector register 2722 using a standard vector load instruction 2718 in a similar manner as the vector load instruction in the above illustrative embodiments. First and second elements of a second operand vector 2612 are loaded and replicated to a second vector register 2724 using a load pair and splat instruction/operation 2720. As shown in FIG. 27, the vector load instruction 2718 loads the values of a first vector by simply loading these values straight from the operand vector register 2712. The load pair and splat instruction 2720 loads a first scalar value "a", from the input vector operand 2712, into a first element of the vector register 2724 and a second scalar value "b", from the input vector operand 2712, into a second element of the vector register 2724. This pair of values is then replicated, by the load pair and splat instruction/operation, to the third element and fourth elements, respectively, of the vector register 2724. Having loaded the operand values into the vector registers 2722 and 2724, the multiply add operation may then be performed on the values in these registers 2722 and 2724 to generate a partial product with regard to the first and second vector values "a" and "b" of the second operand 2712.

To perform the multiply add operation, a first element "1" of the first operand vector register 2722 is multiplied by the first element "a" of the second operand vector 2724, and the resulting value is added to a value stored in a first element of the partial result vector register 2726 to generate updated partial result vector register 2728. Moreover, a cross multiplication operation is performed by multiplying the first element "a" of the second operand vector 2724 with a second element "2" of the first operand vector 2710. Similarly, multiplications of the third element "a" of the second operand vector 2724 with the third and fourth elements "3" and "4" of the first operand vector 2710 in register 2722 are performed. Thus, as a result of the above operations, a partial results vector register 2726 is updated to have the partial results of the multiplication of the first vector value "a" with the vector values "1", "2", "3", and "4" of the first operand 2710 in the register 2722.

Figure 28:
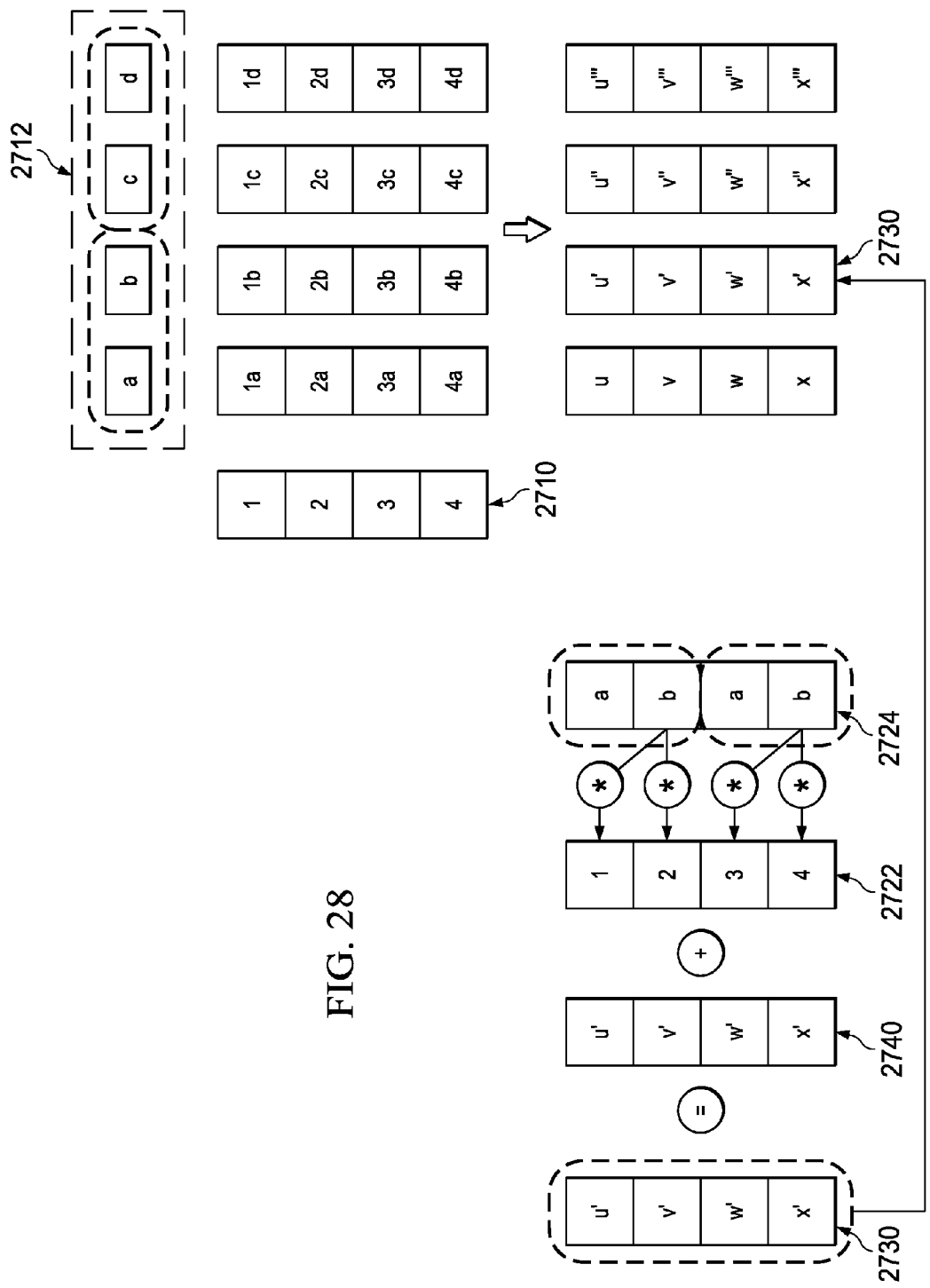

FIG. 28 shows the second step of the multiply add operation in which the second and fourth elements of the vector register 2724, corresponding to the vector value "b", are multiplied with the vector values "1", "2", "3", and "4" in the vector register 2722. For example, the second element of vector register 2724, i.e. "b", is multiplied times the first and second elements 1 and 2 and the fourth element "b" of the vector register 2724 is multiplied with the third and fourth elements of vector register 2722, i.e. "3" and "4." The resulting values are then accumulated in vector register 2740 to generate a second partial product 2730 that represents the multiplication of the vector value "b" with the vector values "1", "2", "3", and "4".

It should be noted that in this second step of the multiply add operation, no additional loads are required. That is, the first operand vector values 2710 are already present in the vector register 2722 and the second value of the second operand vector value 2712 is also already present in the vector register 2724. Thus, all that is necessary to generate the second partial product is to perform the multiply add operation and cross multiply add operations to generate the second partial product 2730. Thus, with one vector load operation and one load pair and splat operation, two partial products may be generated using the mechanisms of this illustrative embodiment.

Figure 29:
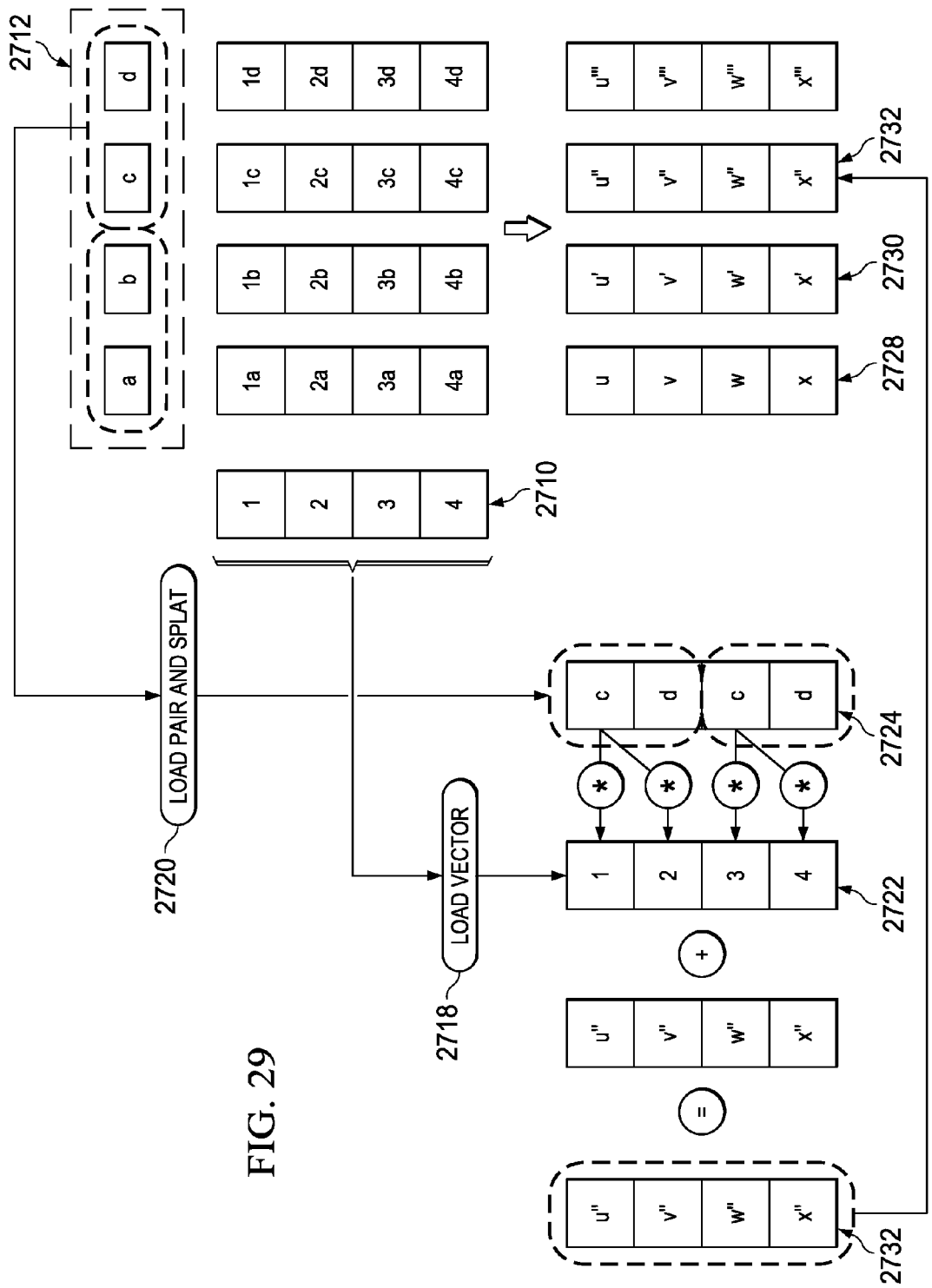
Figure 30:
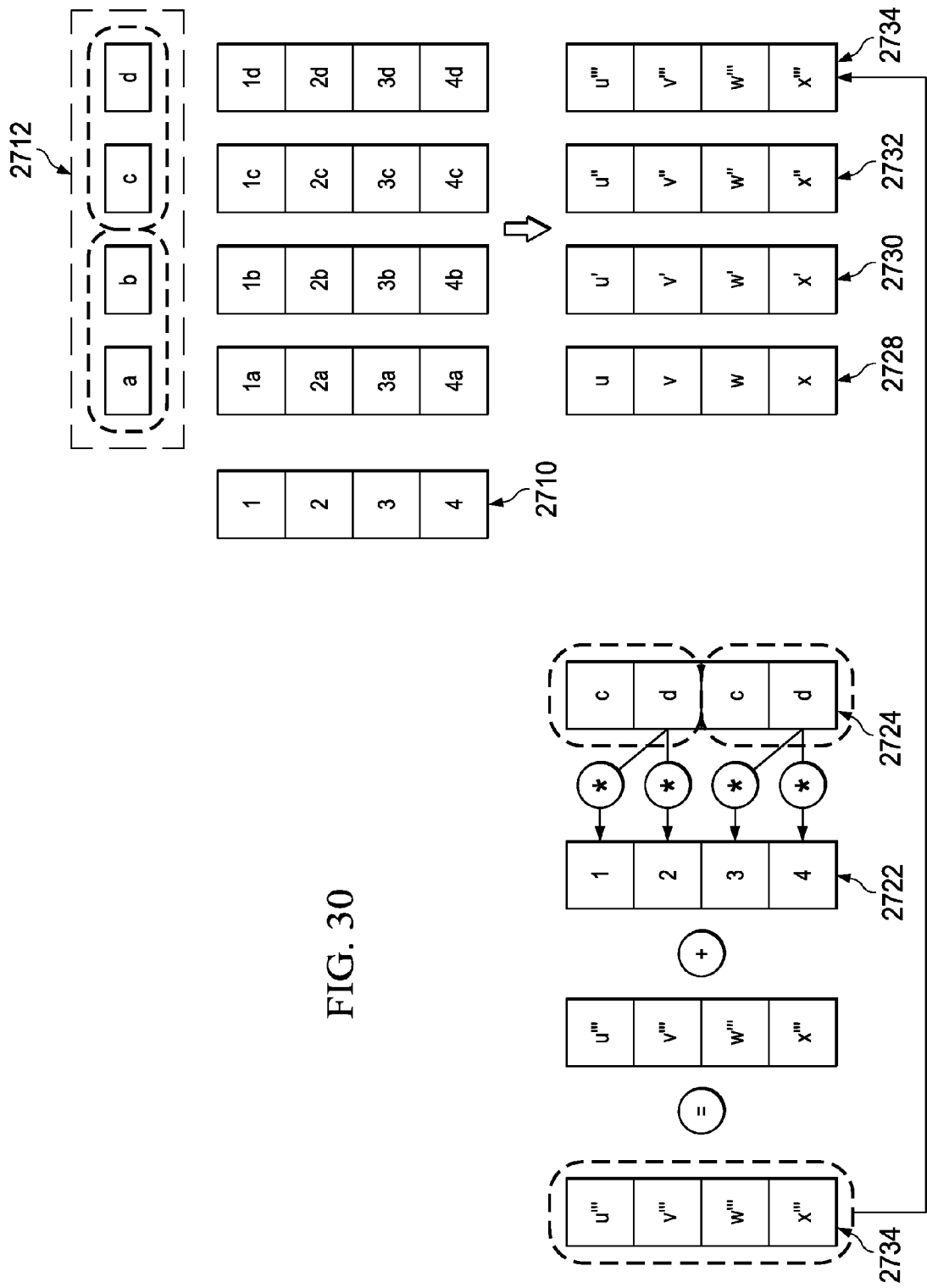

FIGS. 29 and 30 illustrate that the same set of operations that were performed for the multiplication of the vector values "a" and "b" with the vector values "1", "2", "3", and "4" may also be performed for the multiplication of the vector values "c" and "d" with the vector values "1", "2", "3", and "4". It should be noted that while a second "load vector" instruction/operation is shown in FIG. 29, it may not be necessary to perform such a "load vector" instruction/operation to load the first operand values 2710 into the vector register 2722 since they may already be present in the vector register 2722 due to the first and second steps of the operation shown in FIGS. 27 and 28. Thus, in order to perform the operations shown in FIGS. 29 and 30, only an additional "load pair and splat" instruction/operation may be required to load the third and fourth values from the second operand 2712 into the vector register 2724.

Once loaded, the values "c" and "d" are multiplied and cross multiplied in a manner similar to that described above with regard to FIGS. 27 and 28, respectively. The result is a third and fourth partial product that are stored in vector register 2732 and 2734. These vectors may be accumulated to generate the resulting matrix C representing the outer product of the matrix multiplication operation. Thus, with the mechanisms of the illustrative embodiments, in addition to performing simple scalar matrix multiplications and complex matrix multiplications, functionality is provided for performing efficient pair-wise scalar matrix multiplication that operates on pairs of scalar values from an operand rather than a single scalar value of an operand.

It should be noted that the above example illustrative embodiments describe a destructive approach to performing the cross-multiply-add operations in that the partial products are added to the result register which is also the destination for the final result of the matrix multiplication operation. However, the illustrative embodiments are not limited to such. Rather, a non-destructive approach may be utilized in which additional registers may be used for storing the partial products themselves, and separate registers may be used to store the accumulations of partial products or even the final result of the matrix multiplication. For example, in one illustrative embodiment, a first register may be used to store the source of the term to add while a second register may be used to store the new result that is generated.

It should be further noted that the example illustrative embodiments described above replicate the value pairs only once within a register when performing the matrix multiplication operation, but the illustrative embodiments are not limited to such. Rather, in other implementations having larger vector registers or vector registers having more slots than the four shown in the example illustrative embodiments, the value pairs may be replicated more than once. Similarly, the cross multiply add operation may be expanded to use the same pattern of load and splat operations more than twice.

FIGS. 31 and 32 illustrate examples of cross-multiply-add instructions for performing the cross multiplication operations between elements of the vector registers 2722 and 2724 when performing pair-wise scalar operations for performing the matrix multiplication. These cross-multiply-add instructions are similar to the complex cross-multiply-add instructions with the exception that a sign change is not necessary since imaginary portions of values are not being utilized.

The FP only SIMD ISA described above is utilized by a compiler to optimize original source code into optimized executable code that utilizes the functionality of the FP only SIMD ISA logic present in the quad-processing unit (QPU) and the vector register file of the processor architecture implementing the FP only SIMD ISA. The compiler may transform original code into optimized code that utilizes one or more of the matrix multiplication instructions described previously using the FP only SIMD ISA. Thus, the compiler may optimize matrix multiplication operations to utilize the vector load, complex vector load, load and splat, complex load and splat, vector multiply-add, and complex cross-multiply-add instructions described above.

Figure 33:
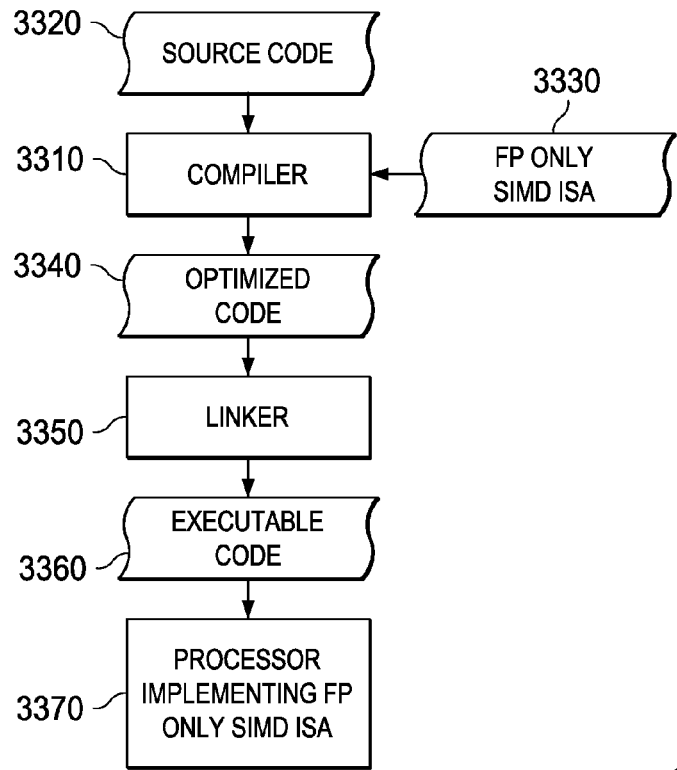
FIG. 33 is a block diagram illustrating a compiler optimization in accordance with one illustrative embodiment.

FIG. 33 is a block diagram illustrating a compiler optimization in accordance with one illustrative embodiment. As shown in FIG. 33, the compiler 3310 receives original source code 3320 which is analyzed in accordance with source code patterns associated with the FP only SIMD ISA 3330 for which the compiler 3310 is configured. The compiler 3310 identifies portions of the source code 3320 that meet the source code patterns corresponding to FP only SIMD ISA instructions 3330.

The compiler then transforms the source code to utilize the FP only SIMD ISA 3330. This may involve performing data-parallel if conversion using FP only vector compare instructions, FP only vector Boolean instructions/data values, logic instructions, select instructions, and the like, as illustrated above. Moreover, this may involve converting source code to utilize the vector load and vector multiply-add instructions, as well as complex vector load, complex vector load, load and splat, complex load and splat, vector multiply-add, and complex cross-multiply-add instructions, to perform matrix multiplication operations. Moreover, the transformation may involve incorporating dynamic data-driven alignment instructions into the executable code as illustrated above. The result is optimized code 3340 that implements the FP only SIMD ISA of the illustrative embodiments which is then provided to linker 3350 that performs linker operations, as are generally known in the art, to thereby generate executable code 3360. The executable code 3360 may then be executed by the processor architecture of FIG. 3, for example, that implements the FP only SIMD ISA.

Figure 34:
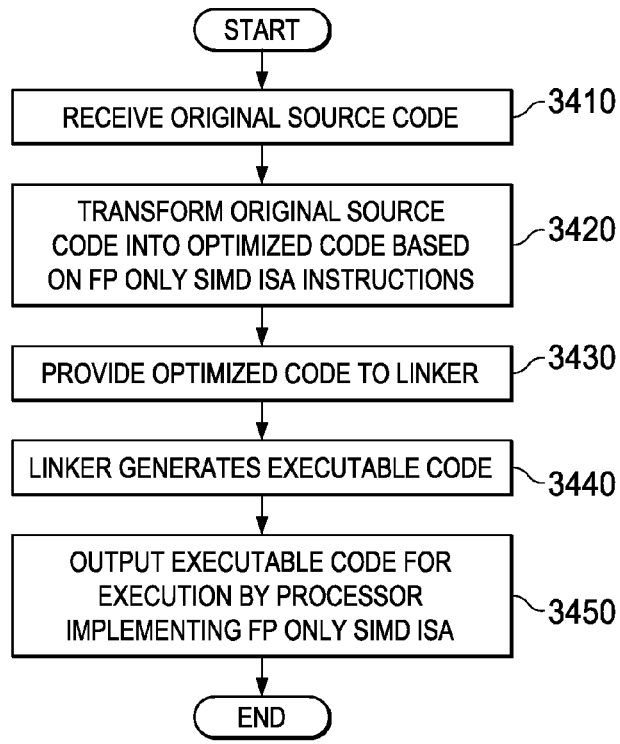
FIG. 34 is a flowchart outlining an exemplary operation for compiling source code into executable code in accordance with one illustrative embodiment.

FIG. 34 is a flowchart outlining an exemplary operation for compiling source code into executable code in accordance with one illustrative embodiment. As shown in FIG. 34, the operation starts by receiving original source code (step 3410). The compiler transforms the original source code into optimized code based on the FP only SIMD ISA compare, Boolean, logic, select, and dynamic alignment vector instructions (step 3420). The optimized code is provided to a linker (step 3430). The linker links the optimized code modules, libraries, etc. and generates executable code (step 3440). The executable code is output for execution by a processor implementing the FP only SIMD ISA (step 3450). The operation then terminates.

Thus, the illustrative embodiments provide mechanisms for implementing a floating point only single instruction multiple data instruction set architecture. The illustrative embodiments provide FP only SIMD instructions for performing compare operations, Boolean operations, logic operations, select operations, and dynamic data-driven alignment instructions. To support such FP only SIMD ISA instructions, a single vector register file is utilized in which all data, scalar and vector values, are stored in vector registers having four vector elements. Each vector element, in a preferred embodiment stores floating point values having a double precision format. Single precision data values are automatically converted to double precision by load operations through precision expansion.

FIG. 35 is an example of code generated by a compiler that utilizes the quad vector load and multiply add instructions according to an illustrative embodiment such as that illustrated in FIGS. 16-17. As shown in FIG. 35, the code, which is assembly code for a vector multiplication operation and accumulation, performs the operations necessary to perform such a multiplication operation and accumulation in a manner similar to that described above with regard to the example in FIGS. 16-17. In contrast, FIG. 36 is an example of code generated by a compiler that utilizes the complex quad vector load and cross multiply add instructions according to an illustrative embodiment such as that illustrated in FIGS. 21-24. As shown in FIG. 36, the code, which again is assembly code, performs a complex multiplication and accumulation and utilizes the instructions shown in FIGS. 25 and 26. The instructions perform an operation such as that shown in FIG. 21-24. Similar code to that of FIG. 36 may be generated for performing the load pair and splat operations of FIGS. 27-30, for example, in which the load pair and splat instruction may replace the complex load and splat instruction and a cross multiplication without sign change may be utilized.

In one illustrative embodiment, there is provided a storage medium containing a computer program for implementing one or more of the compiler optimizations described above. In another illustrative embodiment, there is provided a computer program containing at least one FP SIMD instruction. In one embodiment, the at least one FP SIMD instruction comprises one of a floating point permute instruction in accordance with the teachings contained herein, a floating point Boolean instruction in accordance with the teachings contained herein, a floating point compare instruction generating a floating point Boolean result, a sequence of instructions for aligning vectors of at least one precision, a load pair and splat instruction, any of the instructions contained in Appendix A, or any combination of these various types of instructions. The computer storage medium containing one or more of these computer programs may be a tangible computer storage medium. The computer program, in accordance with some embodiments of the present invention, supports and/or implements the performance of any of the operations detailed above with regard to the illustrative embodiments and, in some embodiments, the generation, use, and storage of one or more instructions of a FP only SIMD ISA as described above and in Appendix A.

As noted above, it should be appreciated that the illustrative embodiments may take the form of an entirely hardware embodiment, an entirely software embodiment or an embodiment containing both hardware and software elements. In one example embodiment, the mechanisms described above may be practiced by software (sometimes referred to Licensed Internal Code (LIC), firmware, microcode, milli-code, pico-code and the like, any of which would be consistent with the illustrative embodiments of the present invention). Software program code which embodies the mechanisms of the illustrative embodiments is typically accessed by the processor, also known as a CPU (Central Processing Unit), of a computer system from long term storage media, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from the computer memory or storage of one computer system over a network to other computer systems for use by users of such other systems.

Alternatively, the program code may be embodied in a memory, and accessed by a processor using a processor bus. Such program code includes an operating system which controls the function and interaction of the various computer components and one or more application programs. Program code is normally paged from dense storage media to high speed memory where it is available for processing by the processor. The techniques and methods for embodying software program code in memory, on physical media, and/or distributing software code via networks are well known and will not be further discussed herein. Program code, when created and stored on a tangible medium (including but not limited to electronic memory modules (RAM), flash memory, compact discs (CDs), DVDs, magnetic tape and the like is often referred to as a "computer program product".

The computer program product medium is typically readable by a processing circuit preferably in a computer system for execution by the processing circuit.

One or more aspects of the present invention are equally applicable to, for instance, virtual machine emulation, in which one or more pageable entities (e.g., guests) execute on one or more processors. As one example, pageable guests are defined by the Start Interpretive Execution (SIE) architecture described in "IBM® System/370 Extended Architecture", IBM® Pub. No. SA22-7095 (1985).

In emulation mode, the specific instruction being emulated is decoded, and a subroutine is executed to implement the individual instruction, as in a subroutine or driver, or some other technique is used for providing a driver for the specific hardware, as is within the skill of those in the art after understanding the description hereof. Various software and hardware emulation techniques are described in numerous U.S. Pat. Nos. 5,551,013, 5,574,873, 5,790,825, 6,009,261, 6,308,255, and 6,463,582. Many other teachings further illustrate a variety of ways to achieve emulation of an instruction format architected for a target machine. In one illustrative embodiment, the mechanisms of one or more of the other illustrative embodiments described above may be emulated using known or later developed software and/or hardware emulation techniques.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor, for performing a matrix multiplication operation, comprising:

performing, by the processor, a vector load operation to load a first vector operand of the matrix multiplication operation to a first target vector register of the data processing system, the first vector operand comprising one or more values;

performing, by the processor, a load pair and splat operation by executing a single load pair and splat instruction which loads a pair of values of a second vector operand into a second target vector register of the data processing system and replicates the pair of values within the second target vector register such that the second target vector register stores at least a first instance of the pair of values of the second vector operand and a second instance of the pair of values of the second vector operand;

performing, by the processor, an operation on elements of the first target vector register and elements of the second target vector register to generate a partial product of the matrix multiplication operation;

accumulating, by the processor, the partial product of the matrix multiplication operation with other partial products of the matrix multiplication operation to generate a result of the matrix multiplication operation.

2. The method of claim 1, wherein the load pair and splat instruction executes to perform the following functions of the load pair and splat operation:

loading a first scalar value of the second vector operand into a first vector element of the second target vector register;

loading a second scalar value of the second vector operand into a second vector element of the second target vector register;

replicating the first scalar value to a third vector element of the second target vector register; and replicating the second scalar value to a fourth vector element of the second target vector register.

3. The method of claim 2, wherein performing the operation on the elements of the first target vector register and elements of the second target vector register comprises performing a cross multiply add operation.

4. The method of claim 3, wherein performing the cross multiply add operation comprises performing a first multiplication operation in which:

the first vector element of the second target vector register is multiplied with a first vector element of the first target vector register to generate a first result value that is both accumulated with a first vector element of a vector register storing a first partial result and stored in the first vector element of the result vector register;

the first vector element of the second target vector register is multiplied with a second vector element of the first target vector register to generate a second result value that is both accumulated with a second vector element of the vector register storing the first partial result, and stored in the second vector element of the result vector register;

the third vector element of the second target vector register is multiplied with a third vector element of the first target vector register to generate a third result value that is both accumulated with a third vector element of the vector register storing the first partial result, and stored in the third vector element of the result vector register; and the third vector element of the second target vector register is multiplied with a fourth vector element of the first target vector register to generate a fourth result value that is both accumulated with a fourth vector element of the vector register storing the first partial result, and stored in the fourth vector element of the result vector register.

5. The method of claim 4, wherein performing the cross multiply add operation comprises performing a second multiplication operation in which:

a second vector element of the second target vector register is multiplied with the first vector element of the first target vector register to generate a fifth result value that is both accumulated with a value stored in a first vector element of a second vector register storing a second partial result, and stored in the first vector element of the second result vector register;

the second vector element of the second target vector register is multiplied with the second vector element of the first target vector register to generate a sixth result value that is both accumulated with a value stored in a second vector element of a second vector register storing the second partial result, and stored in the second vector element of the second result vector register;

the fourth vector element of the second target vector register is multiplied with the third vector element of the first target vector register to generate a seventh result value that is both accumulated with a value stored in a third vector element of the second vector register storing the second partial result, and stored in the third vector element of the second result vector register; and the fourth vector element of the second target vector register is multiplied with the fourth vector element of the first target vector register to generate an eighth result value that is both accumulated with a fourth vector element of the second vector register storing the second partial result, and stored in the fourth vector element of the second result vector register.

6. The method of claim 5, wherein the first partial result corresponds to one of the first and second target vector register, and wherein the second partial result corresponds to the other of the first and second target vector register.

7. The method of claim 3, further comprising:

performing, by the processor, a second load pair and splat operation to load a third scalar value of the second vector operand and a fourth scalar value of the second vector operand, and to replicate the third and fourth scalar values within the second target vector register;

performing, by the processor, a second cross multiply add operation on elements of the first target vector register and elements of the second target vector register to generate a second partial product of the matrix multiplication operation;

accumulating, by the processor, the second partial product of the matrix multiplication operation with the first partial product of the matrix multiplication operation; and storing a result of the accumulation of the second partial product and first partial product.

8. The method of claim 1, wherein accumulating the partial product of the matrix multiplication operation with other partial products of the matrix multiplication operation is performed without performing a separate data reorganization operation.

9. The method of claim 1, wherein the load pair and splat operation replicates elements directly from a load unit of the data processing system.

10. A computer program product comprising a non-transitory computer readable storage medium having a computer readable program recorded thereon, wherein the computer readable program, when executed on a computing device, causes the computing device to:

perform a vector load operation to load a first vector operand of the matrix multiplication operation to a first target vector register of the data processing system, the first vector operand comprising one or more values;

perform a load pair and splat operation by executing a single load pair and splat instruction which loads a pair of values of a second vector operand into a second target vector register of the computing device and replicates the pair of values within the second target vector register such that the second target vector register stores at least a first instance of the pair of values of the second vector operand and a second instance of the pair of values of the second vector operand;

perform an operation on elements of the first target vector register and elements of the second target vector register to generate a partial product of the matrix multiplication operation;

accumulate the partial product of the matrix multiplication operation with other partial products of the matrix multiplication operation to generate a result of the matrix multiplication operation.

11. The computer program product of claim 10, wherein the computer readable program causes the computing device to execute the load pair and splat instruction to perform the load pair and splat operation by:
   loading a first scalar value of the second vector operand into a first vector element of the second target vector register;
   loading a second scalar value of the second vector operand into a second vector element of the second target vector register;
   replicating the first scalar value to a third vector element of the second target vector register; and
   replicating the second scalar value to a fourth vector element of the second target vector register.

12. The computer program product of claim 11, wherein the computer readable program causes the computing device to perform the vector load operation to load the first vector operand of the matrix multiplication operation to the first target vector register by:
   loading a first vector value to a first vector element of the first target vector register;
   loading a second vector value to a second vector element of the first target vector register;
   loading a third vector value to a third vector element of the first target vector register; and
   loading a fourth vector value to a fourth vector element of the first target vector register.

13. The computer program product of claim 12, wherein the computer readable program causes the computing device to perform the operation by performing a first multiplication operation in which:
   the first vector element of the second target vector register is multiplied with a first vector element of the first target vector register to generate a first result value that is both accumulated with a first vector element of a vector register storing a first partial result, and stored in the first vector element of the result vector register;
   the first vector element of the second target vector register is multiplied with a second vector element of the first target vector register to generate a second result value that is both accumulated with a second vector element of the vector register storing the first partial result, and stored in the second vector element of the result vector register;
   the third vector element of the second target vector register is multiplied with a third vector element of the first target vector register to generate a third result value that is both accumulated with a third vector element of the vector register storing the first partial result, and stored in the third vector element of the result vector register; and
   the third vector element of the second target vector register is multiplied with a fourth vector element of the first target vector register to generate a fourth result value that is both accumulated with a fourth vector element of the vector register storing the first partial result, and stored in the fourth vector element of the result vector register.

14. The computer program product of claim 13, wherein the computer readable program causes the computing device to perform the operation by performing a second multiplication operation in which:
   a second vector element of the second target vector register is multiplied with the first vector element of the first target vector register to generate a fifth result value that is both accumulated with a value stored in a first vector element of a second vector register storing a second partial result, and stored in the first vector element of the second result vector register;
   the second vector element of the second target vector register is multiplied with the second vector element of the first target vector register to generate a sixth result value that is accumulated with a value stored in a second vector element of a second vector register storing the second partial result, and stored in the second vector element of the second result vector register;
   the fourth vector element of the second target vector register is multiplied with the third vector element of the first target vector register to generate a seventh result value that is both accumulated with a value stored in a third vector element of the second vector register storing the second partial result, and stored in the third vector element of the second result vector register; and
   the fourth vector element of the second target vector register is multiplied with the fourth vector element of the first target vector register to generate an eighth result value that is both accumulated with a fourth vector element of the second vector register storing the second partial result, and stored in the fourth vector element of the second result vector register.

15. The computer program product of claim 12, wherein the computer readable program further causes the computing device to:
   perform a second load pair and splat operation to load a third scalar value of the second vector operand and a fourth scalar value of the second vector operand, and to replicate the third and fourth scalar values within the second target vector register;
   perform a cross multiply add operation on elements of the first target vector register and elements of the second target vector register to generate a second partial product of the matrix multiplication operation;
   accumulate the second partial product of the matrix multiplication operation with the first partial product of the matrix multiplication operation; and
   store a result of the accumulation of the second partial product and first partial product.

16. The computer program product of claim 10, wherein accumulating the partial product of the matrix multiplication operation with other partial products of the matrix multiplication operation is performed without performing a separate data reorganization operation.

17. The computer program product of claim 10, wherein the load pair and splat operation replicates elements directly from a load unit of the data processing system.

18. An apparatus, comprising:
   first circuit logic configured to perform a vector load operation to load a first vector operand of a matrix multiplication operation to a first target vector register of the apparatus, the first vector operand comprising one or more values;
   second circuit logic configured to perform a load pair and splat operation by executing a single load pair and splat instruction which loads a pair of values of a second vector operand into a second target vector register of the apparatus and replicates the pair of values within the second target vector register such that the second target vector register stores at least a first instance of the pair of values of the second vector operand and a second instance of the pair of values of the second vector operand;

third circuit logic configured to perform an operation on elements of the first target vector register and elements of the second target vector register to generate a partial product of the matrix multiplication operation; and fourth circuit logic configured to accumulate the partial product of the matrix multiplication operation with other partial products of the matrix multiplication operation to generate a result of the matrix multiplication operation.

19. The apparatus of claim 18, wherein the second circuit logic is configured to execute the load pair and splat instruction to perform the load pair and splat operation by:

loading a first scalar value of the second vector operand into a first vector element of the second target vector register;

loading a second scalar value of the second vector operand into a second vector element of the second target vector register;

replicating the first scalar value to a third vector element of the second target vector register; and replicating the second scalar value to a fourth vector element of the second target vector register.

20. The apparatus of claim 19, wherein the first circuit logic is configured to perform the vector load operation to load the first vector operand of the matrix multiplication operation to the first target vector register by:

loading a first vector value to a first vector element of the first target vector register;

loading a second vector value to a second vector element of the first target vector register;

loading a third vector value to a third vector element of the first target vector register; and loading a fourth vector value to a fourth vector element of the first target vector register.

21. The apparatus of claim 20, wherein the third circuit logic is configured to perform the operation by performing a first multiplication operation in which:

the first vector element of the second target vector register is multiplied with a first vector element of the first target vector register to generate a first result value that is both accumulated with a first vector element of a vector register storing a first partial result, and stored in the first vector element of the result vector register;

the first vector element of the second target vector register is multiplied with a second vector element of the first target vector register to generate a second result value that is both accumulated with a second vector element of the vector register storing the first partial result, and stored in the second vector element of the result vector register;

the third vector element of the second target vector register is multiplied with a third vector element of the first target vector register to generate a third result value that is accumulated with a third vector element of the vector register storing the first partial result, and stored in the third vector element of the result vector register; and the third vector element of the second target vector register is multiplied with a fourth vector element of the first target vector register to generate a fourth result value that is both accumulated with a fourth vector element of the vector register storing the first partial result, and stored in the fourth vector element of the result vector register.

22. The apparatus of claim 21, wherein the third circuit logic is further configured to perform the operation by performing a second multiplication operation in which:

a second vector element of the second target vector register is multiplied with the first vector element of the first target vector register to generate a fifth result value that is both accumulated with a value stored in a first vector element of a second vector register storing a second partial result, and stored in the first vector element of the second result vector register;

the second vector element of the second target vector register is multiplied with the second vector element of the first target vector register to generate a sixth result value that is both accumulated with a value stored in a second vector element of a second vector register storing the second partial result, and stored in the second vector element of the second result vector register;

the fourth vector element of the second target vector register is multiplied with the third vector element of the first target vector register to generate a seventh result value that is both accumulated with a value stored in a third vector element of the second vector register storing the second partial result, and stored in the third vector element of the second result vector register; and the fourth vector element of the second target vector register is multiplied with the fourth vector element of the first target vector register to generate an eighth result value that is both accumulated with a fourth vector element of the second vector register storing the second partial result, and stored in the fourth vector element of the second result vector register.

23. The apparatus of claim 19, further comprising:

fifth circuit logic configured to perform a second load pair and splat operation to load a third scalar value of the second vector operand and a fourth scalar value of the second vector operand, and to replicate the third and fourth scalar values within the second target vector register;

sixth circuit logic configured to perform a cross multiply add operation on elements of the first target vector register and elements of the second target vector register to generate a second partial product of the matrix multiplication operation;

seventh circuit logic configured to accumulate the second partial product of the matrix multiplication operation with the first partial product of the matrix multiplication operation; and eighth circuit logic configured to store a result of the accumulation of the second partial product and first partial product.

24. The apparatus of claim 19, wherein accumulating the partial product of the matrix multiplication operation with other partial products of the matrix multiplication operation is performed without performing a separate data reorganization operation.

25. The apparatus of claim 19, wherein the load pair and splat operation replicates elements directly from a load unit of the apparatus.

* * * * *